June 2, 1964 J. B. BISHOP ETAL 3,135,862

DIGITAL TARGET INFORMATION TRANSMISSION SYSTEM WITH PARALLAX CORRECTION

Filed Sept. 29, 1953 33 Sheets-Sheet 1

INVENTORS J. B. BISHOP
G. D. JOHNSON
F. C. ONG
H. A. REISE

BY [signature]
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY [signature]
ATTORNEY June 2, 1964 J. B. BISHOP ETAL 3,135,862

DIGITAL TARGET INFORMATION TRANSMISSION SYSTEM WITH PARALLAX CORRECTION

Filed Sept. 29, 1953 33 Sheets-Sheet 4

INVENTORS J. B. BISHOP
G. D. JOHNSON
F. C. ONG
H. A. REISE

BY [signature]
ATTORNEY

INVENTORS J. B. BISHOP
G. D. JOHNSON
F. C. ONG
H. A. REISE
BY
ATTORNEY

June 2, 1964 J. B. BISHOP ET AL 3,135,862
DIGITAL TARGET INFORMATION TRANSMISSION
SYSTEM WITH PARALLAX CORRECTION
Filed Sept. 29, 1953 33 Sheets-Sheet 6

INVENTORS J. B. BISHOP
G. D. JOHNSON
F. C. ONG
H. A. REISE
BY [signature]
ATTORNEY

INVENTORS J. B. BISHOP
G. D. JOHNSON
F. C. ONG
H. A. REISE
BY
ATTORNEY

June 2, 1964 J. B. BISHOP ET AL 3,135,862

DIGITAL TARGET INFORMATION TRANSMISSION SYSTEM WITH PARALLAX CORRECTION

Filed Sept. 29, 1953 33 Sheets-Sheet 8

INVENTORS J. B. BISHOP
G. D. JOHNSON
F. C. ONG
H. A. REISE

BY

ATTORNEY

June 2, 1964 | J. B. BISHOP ETAL | 3,135,862
DIGITAL TARGET INFORMATION TRANSMISSION
SYSTEM WITH PARALLAX CORRECTION Filed Sept. 29, 1953 | 33 Sheets-Sheet 9

TYPICAL CYCLE OF TRANSMITTED DATA IDEALIZED WAVE FORMS

INVENTORS J. B. BISHOP
G. D. JOHNSON
F. C. ONG
H. A. REISE

BY [signature]
ATTORNEY

INVENTORS J. B. BISHOP
G. D. JOHNSON
F. C. ONG
H. A. REISE
BY
ATTORNEY

INVENTORS
J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J.B. BISHOP
G.D. JOHNSON
F.C. ONG
H.A. REISE
BY
ATTORNEY

INVENTORS J.B. BISHOP
G.D. JOHNSON
F.C. ONG
H.A. REISE
BY
ATTORNEY

INVENTORS
J. B. BISHOP
G. D. JOHNSON
F. C. ONG
H. A. REISE
BY
ATTORNEY

INVENTORS
J. B. BISHOP
G. D. JOHNSON
F. C. ONG
H. A. REISE
BY
ATTORNEY

June 2, 1964

J. B. BISHOP ETAL

DIGITAL TARGET INFORMATION TRANSMISSION SYSTEM WITH PARALLAX CORRECTION 3,135,862

Filed Sept. 29, 1953

33 Sheets-Sheet 17

INVENTORS
J. B. BISHOP
G. D. JOHNSON
F. C. ONG
H. A. REISE

BY

ATTORNEY

June 2, 1964 J. B. BISHOP ETAL 3,135,862
DIGITAL TARGET INFORMATION TRANSMISSION
SYSTEM WITH PARALLAX CORRECTION
Filed Sept. 29, 1953 33 Sheets-Sheet 18

INVENTORS
J. B. BISHOP
G. D. JOHNSON
F. C. ONG
H. A. REISE
BY
ATTORNEY

June 2, 1964 J. B. BISHOP ETAL 3,135,862

DIGITAL TARGET INFORMATION TRANSMISSION SYSTEM WITH PARALLAX CORRECTION

Filed Sept. 29, 1953 33 Sheets-Sheet 19

INVENTORS J. B. BISHOP
G. D. JOHNSON
F. C. ONG
H. A. REISE

BY [signature]
ATTORNEY

DIGITAL TARGET INFORMATION TRANSMISSION SYSTEM WITH PARALLAX CORRECTION

Filed Sept. 29, 1953

INVENTORS J.B. BISHOP
G.D. JOHNSON
F.C. ONG
H.A. REISE
BY
ATTORNEY

INVENTORS
J. B. BISHOP
G. D. JOHNSON
F. C. ONG
H. A. REISE
BY
ATTORNEY

INVENTORS
J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE

BY [signature]
ATTORNEY

June 2, 1964 J. B. BISHOP ETAL 3,135,862

DIGITAL TARGET INFORMATION TRANSMISSION SYSTEM WITH PARALLAX CORRECTION

Filed Sept. 29, 1953 33 Sheets-Sheet 24

INVENTORS J. B. BISHOP
G. D. JOHNSON
F. C. ONG
H. A. REISE

BY [signature]

ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY
ATTORNEY

INVENTORS J. B. BISHOP
G. D. JOHNSON
F. C. ONG
H. A. REISE
BY [signature]
ATTORNEY June 2, 1964 J. B. BISHOP ETAL 3,135,862

DIGITAL TARGET INFORMATION TRANSMISSION SYSTEM WITH PARALLAX CORRECTION

Filed Sept. 29, 1953 33 Sheets-Sheet 33

INVENTORS J. B. BISHOP G. D. JOHNSON F. C. ONG H. A. REISE

BY

ATTORNEY 3,135,862
Patented June 2, 1964

3,135,862

DIGITAL TARGET INFORMATION TRANSMISSION SYSTEM WITH PARALLAX CORRECTION

John B. Bishop, Livingston, Glover D. Johnson, Morristown, Floyd C. Ong, Morris Township, Morris County, and Herman A. Reise, West Orange, N.J., assignors to Bell Telephone Laboratories, Incorporated, New York, N.Y., a corporation of New York Filed Sept. 29, 1953, Ser. No. 383,002
29 Claims. (Cl. 235—176)

The present invention relates to transmission systems and more particularly to transmission systems for transmitting and receiving information in binary digital form regarding the location of a target.

Due to the speed of present day aircraft, it is necessary to pre-position radar and gun control equipment in areas remote from the aircraft before they themselves can detect the aircraft. Three independent coordinate data, which represent the Cartesian coordinates of the target position, are presented to the transmission system as three independently varying direct-current or analog voltages from a target tracking device or anticraft fire control system. Two of the independent coordinate data give the position of the target in the horizontal plane and the third coordinate gives the vertical height. The analog potentials cannot be transmitted over substantial distances with the required degree of accuracy or fidelity. A function of the transmission system of the present invention is to transfer the information representing the cartesian coordinates in space of the aircraft from a transmitting site to a remote receiving site without significant loss of fidelity. To accomplish this function the direct-current or analog voltages are converted or encoded into coded digital form at the transmitting site, transmitted over telephone wires and then reconverted or decoded to direct-current voltages at the receiving site.

The analog potentials from the receiving site should represent the instantaneous present target position, or the position of the target at the time the data is received and not when it is sent. The transmission system therefore includes apparatus and circuits for adding a correction of prediction to the target position data so that the voltages as decoded by the receiver represent the present target position. The operations required to perform this predicting function are completed in a sufficiently short interval so that only first order predictions are necessary to compensate for the delay due to the equipment and transmission medium.

The transmission system also includes circuits for providing parallax corrections to the predicted target position at both transmitter and receiver so that the target position is expressed relative to a point which is common to both. In general, the transmitter parallax corrections change the three coordinates from a local to a larger regional grid, which includes many grid or station sites, by adding the corrections. The receiver parallax corrections convert the three coordinates from regional to the local grid used by the receiver by subtracting the corrections. The parallax corrections can be provided either in the form of voltages which are added to the target position voltages at the input to the transmitter and output from the receiver or in the form of coded numbers which are arithmetically added to the coded numbers representing the target position. For a particular station the parallax corrections are constant quantities and are therefore automatically applied to the transmitted and received data.

The output of the receiver which is fed into gun data computers or other tracking devices comprises therefore three independent voltages each determined by the corresponding input voltage to the transmitter and the corresponding parallax corrections. The information is transmitted repeatedly so that substantially continuous outputs are obtained at the receiving site for adjusting the position of the tracking equipment associated therewith.

For transmission between the transmitter and receiver, binary digits are utilized with the binary digits represented by pulses; the presence of a pulse signifying a "1" and the absence of a pulse signifying a "0." Such a pulse method of transmission may employ telephone lines, telegraph lines, carrier telephone or telegraph channels, radio including ultra-high frequency and combinations thereof wherein said paths may include repeater stations, terminal and regulative equipment. The types and degrees of distortion or attenuation encountered in ordinary telephone, telegraph, pulse transmission, etc. circuits do not affect the fidelity with which the data may be received. In view of the relative immunity of the system to outside interference the receiver can operate satisfactorily with input power as low as −45 decibels with reference to 1-milliwatt.

In the specific embodiment of the present invention the data or information which is transmitted at the rate of ten times per second includes in each transmission cycle a ready signal of 1700 cycles per second which lasts for 5 milliseconds, a syncronizing signal of 1200 cycles per second which also lasts 5 milliseconds and the coordinate data in sequence with sixteen binary digits assigned for each coordinate with the time allotted for each digit being 1⅔ of a millisecond. Only thirteen of the digits assigned to each coordinate are ordinarily used for the coordinate information which allows approximately 8000 different codes or a range of 80,000 yards with the least significant digit representing about 10 yards. The extra three digits are provided to give surplus digital capacity which in the specific embodiment of the present invention is utilized for digital parallax correction. With the three auxiliary digits used for parallax correction, the target coordinate data may be expressed in terms of a reference regional square which is eight times as large as the local squares of the target-observing stations. Since the local squares have a dimension of 80,000 by 80,000 yards, the large regional square has the dimensions of 640,000 by 640,000 yards. Parallax corrections for the third or vertical height coordinate correct for difference in altitude between the transmitting and the receiving stations.

It is therefore an object of the present invention to provide for a novel transmission system having input intelligence at the transmitting end and output intelligence at the receiving end in the form of analog voltages and the transmitted intelligence therebetween in the form of digital voltages.

Another object of the present invention is the provision of a novel transmission system utilizing telephone circuits such that the types and degrees of distortion do not affect the fidelity of the received information.

Still another object of the present invention is the provision of a novel transmission shift register which simultaneously enters information to be registered at one end while pulsing out registered information in the other.

Still another object is to provide a novel transmission system wherein signals representing the physical location of the transmitting site are automatically combined with the target position signals and the combined signals transmitted to the receiving site where signals representing the physical location of the receiving site are automatically combined with the received signal to correct or compensate the target position signals in accordance with the relative positions of the two sites.

Further objects and advantages will be apparent to those skilled in the art upon consideration of the following description taken in conjunction with the drawings wherein:

FIGS. 1 through 7, when arranged in accordance with FIG. 8, are an outline form or block diagram of the transmission system of the present invention;

Figure 36:
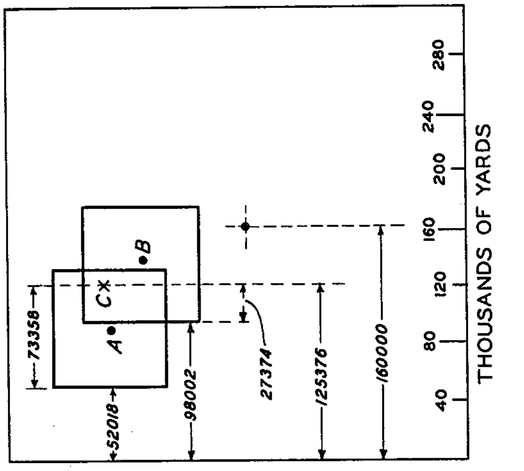
Figure 35:
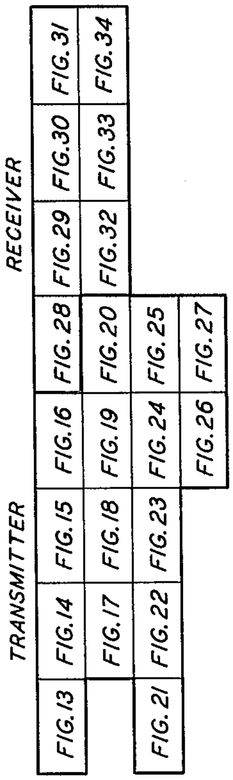

FIGS. 13 through 34, when arranged in accordance with FIG. 35, are a detailed circuit representation of the transmission system of the present invention;

FIG. 35 illustrates the arrangement of the detailed circuit representations of FIGS. 13 through 34; and FIG. 36 is a diagram utilized to explain parallax corrections.

The transmission system of the present invention is hereinafter described in two sections; a block or functional description and a detailed circuit description. The functional description, with reference to the block diagram shown in FIGS. 1 through 7, when arranged in accordance with FIG. 8, includes all the main or general functions and the nature and purpose of the equipment. The detailed circuit description with reference to the circuit diagram shown in FIGS. 13 through 34, when arranged in accordance with FIG. 35, includes a complete operational description of each circuit component.

Figure 1:
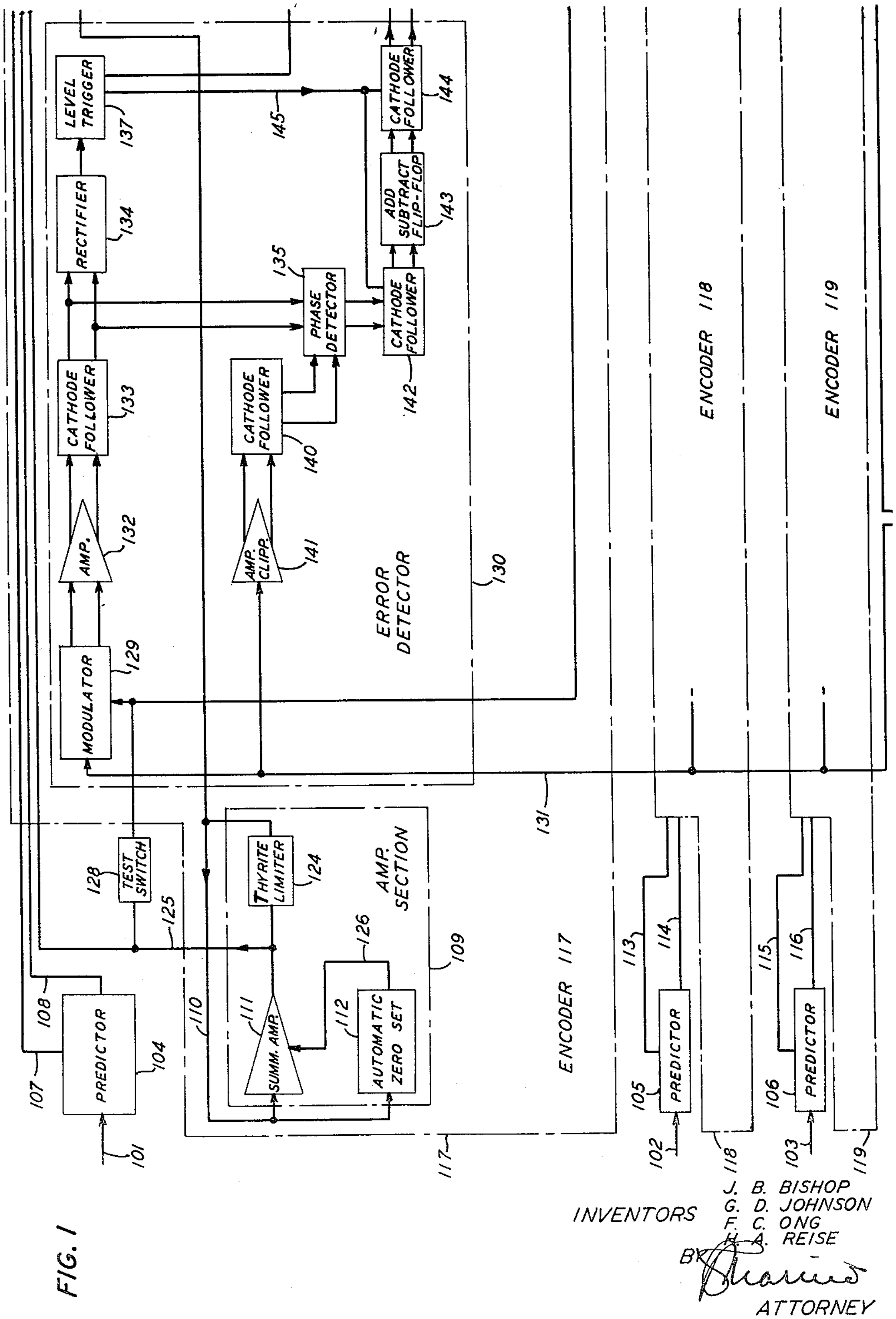
Figure 2:
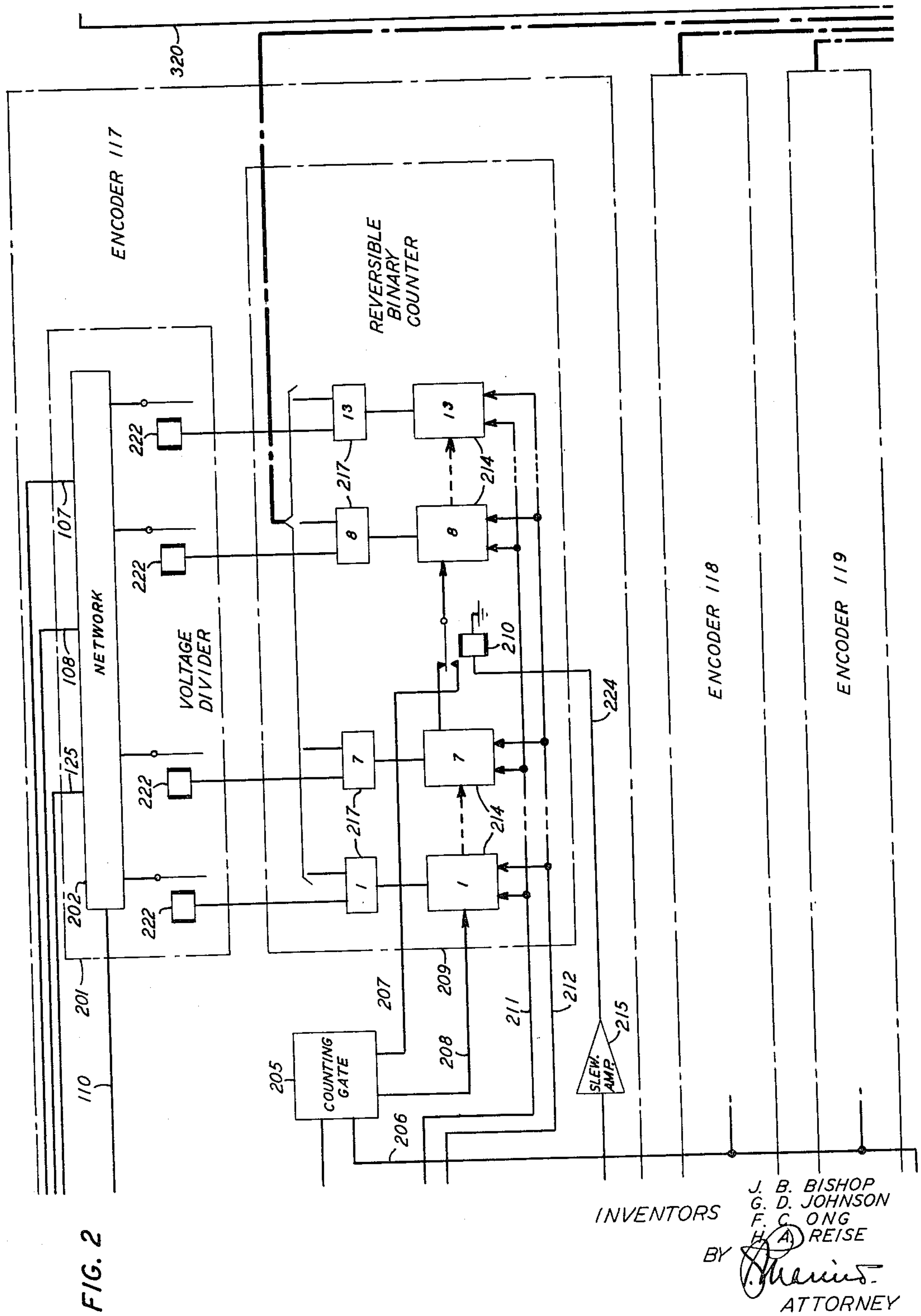

In general, the various components and functionally represented circuits or rectangles in the two sets of diagrams are designated by a numeral having a first digit or digits which is the same as the figure number in which the component is shown. For example, a component which appears in FIG. 15 may be designated 1503. The designation, however, of a component that appears in the box diagram, FIGS. 1 through 7, is the same in the detailed circuit, FIGS. 13 through 34, as the same numeral is used for the same component in the two sets of diagrams. For example, the input lead designated 101 in FIG. 1 is also designated 101 in FIG. 13.

Due to the speed of present day aircraft, it is necessary to pre-position radar and gun control equipment in areas remote from the aircraft before they themselves can detect the aircraft. A function of the transmission system of the present invention is to transfer the information representing the Cartesian coordinates in space of the aircraft from a transmitting site to a remote receiving site without significant loss of fidelity.

Figure 6:
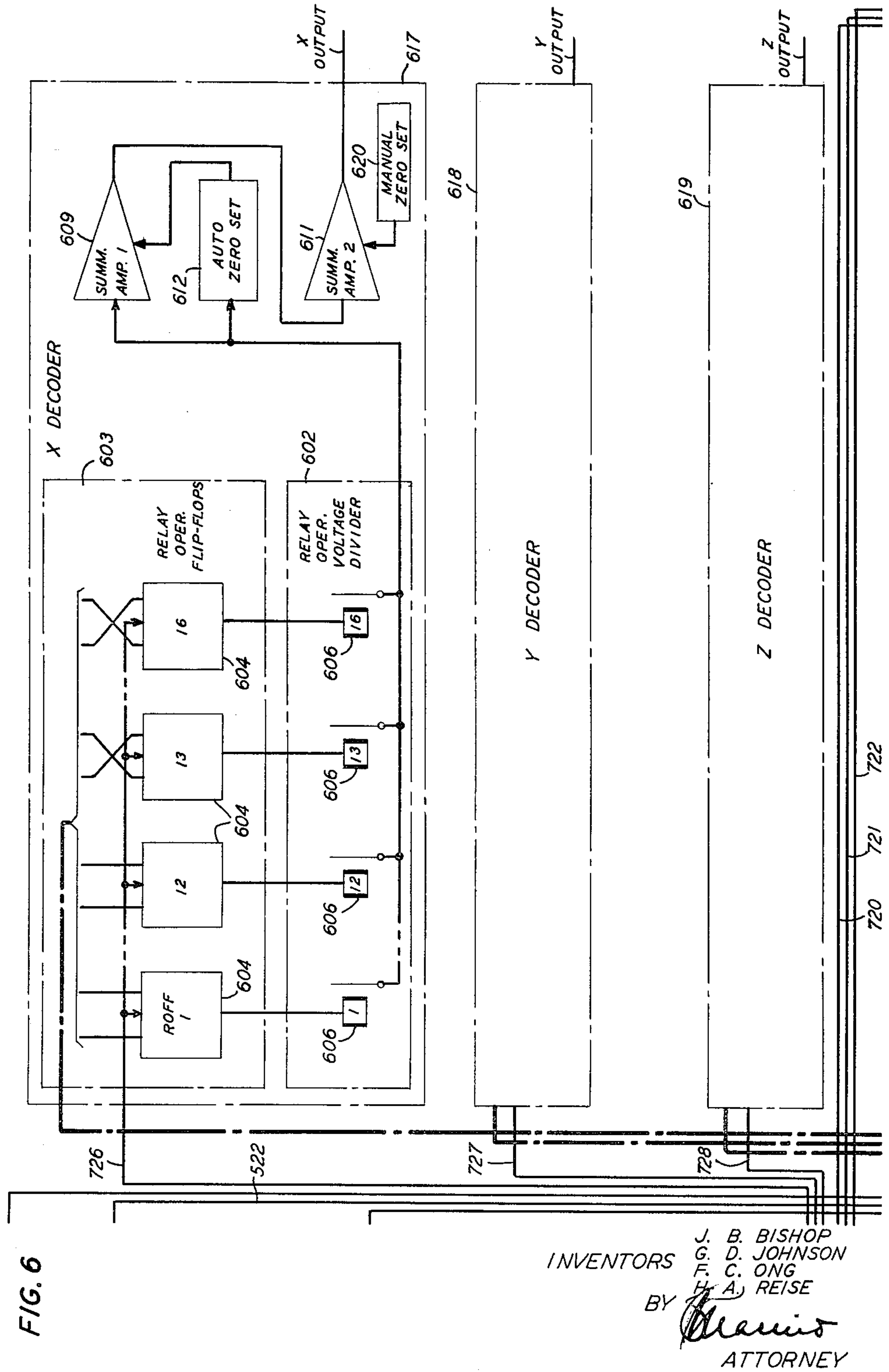
Figure 7:
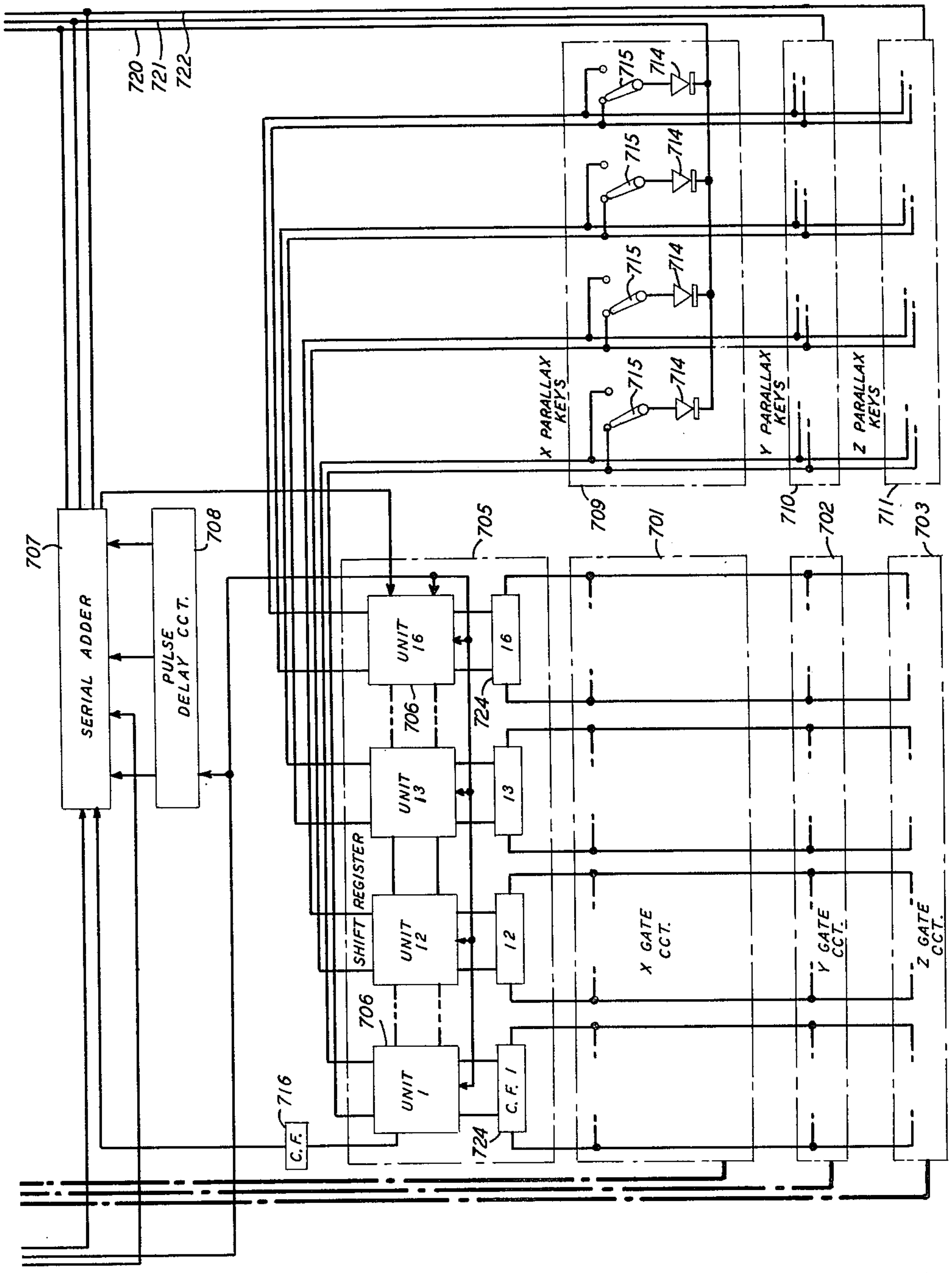
Figure 8:
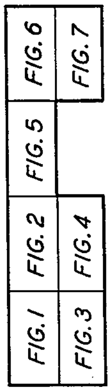
FIG. 8 illustrates the arrangement of the block diagram of FIGS. 1 through 7.

Referring now to FIGS. 1 through 7, when arranged in accordance with FIG. 8, the inputs 101, 102 and 103 supply voltages which represent the Cartesian coordinates in space of the present position of a moving target, such as a fighter plane or bomber, to the transmitter station shown in FIGS. 1 through 4. Apparatus for supplying voltages representing the Cartesian coordinates of a moving target is described in the application to E. Lakatos, Serial No. 570,284, Patent No. 2,670,134, which was filed December 29, 1944, and in the Patents 2,493,183 which issued to Boghosian-Darlington-Och on June 23, 1949, and 2,408,081 which issued to Lovell-Parkinson-Swartzel-Weber on January 9, 1946. The voltages at inputs 101 and 102 represent the position of the target in the horizontal plane and the voltage at input 103 represents the vertical height of the target over the transmitter station. Each of the supplied input voltages at inputs 101, 102 and 103 is an independently varying direct-current voltage from some kind of tracking device, not shown. The inputs 101, 102 and 103 are connected respectively to the predictor circuits 104, 105 and 106 which add increments derived from the position voltage at the inputs 101 through 103 to compensate for the delay involved in the processes hereinafter described of encoding, transmiting and decoding the data.

It is convenient to describe the input and output voltages as being absolute; actually, the target input voltage is really an accurate fraction of a reference voltage in the tracking device, not shown. This reference voltage is accurately maintained, but the inherent accuracy of the computing devices, also not shown, in which these coordinate voltages will ultimately be used lies in the fractionating process rather than in the absolute values. This accuracy is maintained in the transmitter and receiver of the present invention by operating on a similar fractionating principle, utilizing reference voltages supplied by the ultimate sources and receptors of the target coordinate voltages.

At the receiver output of the system the reconstructed target voltages represent as accurately as possible the instantaneous present target position. The system therefore must predict from the varying target input voltages to the transmitter what the target voltages will be at the end of the encoding, transmission and decoding processes. This function is performed at the transmitter as described above by the predictor circuits 104, 105 and 106 which add to the input voltages from leads 101, 102 and 103 appropriate correction voltages. Actually the predictor circuits 104, 105 and 106 derive the first time derivative of the target voltage which corresponds to target velocity. When an increment proportional to this velocity is added to the target position the sum constitutes a predicted target position in which allowance has been made for the delay in encoding, decoding and transmitting the data.

The predictor circuits 104 through 106 are each connected by two leads 107—108, 113—114 and 115—116, respectively, to the encoders 117, 118 and 119. One lead 107, 113 and 115 of each pair supplies a voltage representing the position of the target and the other lead 108, 114 and 116 of the pair supplies a voltage representing the predicted change in position. The encoder 117 is shown in further detail but the encoders 118 and 119 comprising similar components are not shown in further detail in order to avoid duplication. The purpose of the encoders 117, 118 and 119 is to accurately convert the three coordinate voltages into voltages representing the binary numbers of the magnitudes of the predicted position of the coordinate voltages.

The binary numbers registered in the encoders 117, 118 and 119 representing the predicted target position are corrected as is hereinafter described to compensate for the difference in location of the transmitter and receiver. Such a correction is referred to herein as a parallax correction.

In the common representation of numbers, successive digits stand for coefficients of successive powers of 10. In the binary system the coefficients are either "0" or "1" and are coefficients of successive powers of 2. In both cases, the value of the number is given by the sum of the series of terms involved, as shown in the following illustrations:

| | Scale of 10 (Decimal) | Scale of 2 (Binary) |
|---|---|---|
| Number | 1011 | 1011 |
| Equivalent | $1\times10^3+0\times10^2+1\times10+1\times10^0$ | $1\times2^3+0\times2^2+1\times2^1+1\times2^0$ |
| Decimal value | 1011 | 11 |

As indicated in the example above each digit "1" indicates that the particular power of 2 appropriate to that digit position is to be included in the summation which gives the decimal number. Each digit "0" indicates that the corresponding power of 2 is replaced by "0" in the summation. "0's" on the extreme left are not significant in themselves but may be required to complete a signal pattern where the same number of binary digits is sent for each number transmitted. They may also be needed in connection with parallax correction hereinafter described.

Samples of binary numbers corresponding to decimal numbers which are simple powers of 2 are as follows:

| Ordinary Number in Decimal System | Power of 2 | Binary Number |
|---|---|---|
| 1 | $2^0$ | 1 |
| 2 | $2^1$ | 10 |
| 4 | $2^2$ | 100 |
| 8 | $2^3$ | 1 000 |
| 16 | $2^4$ | 10 000 |
| 32 | $2^5$ | 100 000 |
| 64 | $2^6$ | 1 000 000 |

Intermediate numbers are obtained by addition. For example:

| | Binary number |
|---|---|
| 5=4+1 | 1 0 1 |
| 13=8+4+1 | 1 1 0 1 |
| 22=16+4+2 | 1 0 1 1 0 |
| 43=32+8+2+1 | 1 0 1 0 1 1 |

To determine the binary number from a decimal number divide the number successively by 2, ignoring the remainder in the case of odd numbers, as illustrated in the left column of the following table:

| Successive division: | Binary equivalent |
|---|---|
| 5326 | 0 |
| 2663 | 1 |
| 1331 | 1 |
| 665 | 1 |
| 332 | 0 |
| 166 | 0 |
| 83 | 1 |
| 41 | 1 |
| 20 | 0 |
| 10 | 0 |
| 5 | 1 |
| 2 | 0 |
| 1 | 1 |

When the division is complete, the binary equivalent of the whole number is obtained by starting at the bottom and writing, from right to left, a "1" for each odd number in the column and a "0" for each even number. The top of the column is the least significant digit, the bottom, the most significant. The binary number from the above is written as follows:

1010011001110

↑ most significant digit ↑ least significant digit

To determine a decimal number from a binary number 1 0 1 0 0 1 1 0 0 1 1 1 0 start with the least significant digit at the right, expressing the digits as powers of 2, and add:

*Binary Code*

$1\times2^{12}=4096$
$0\times2^{11}=0$
$1\times2^{10}=1024$
$0\times2^9=0$
$0\times2^8=0$
$1\times2^7=128$
$1\times2^6=64$
$0\times2^5=0$
$0\times2^4=0$
$1\times2^3=8$
$1\times2^2=4$
$1\times2^1=2$
$0\times2^0=0$

5326

The leads 107 and 108 described above from the predictor circuit 104 are connected to the resistive section or network 202 in the relay-operated voltage divider 201 in the encoder 117 which supplies a third voltage referred to as the neutralizing voltage to the lead 110. The neutralizing voltage is an analog representation of the binary digits registered in the encoder 117 and is essentially a voltage equal in magnitude to the sum of the voltages upon leads 107 and 108 but opposite in sign and is provided by the voltage divider 201 as is hereinafter described. The encoders 117, 118 and 119 in general convert the three coordinate voltages into voltages representing the binary numbers of the magnitudes of the coordinate voltages.

The three voltages or currents from the relay-operated voltage divider 201 are connected to the amplifier section 109 through lead 110. The input to the amplifier section 109 when the system is functioning normally, which is when the neutralizing potential is exactly equal in magnitude to the sum of the position and predicted increment voltages, is therefore zero. The operation of the encoders 117, 118 and 119 depends upon the maintenance of this zero condition as the transmitted information, as is hereinafter described, represents in binary digital form the magnitude of the neutralizing voltage supplied from the voltage divider 201.

The amplifier section 109 comprises a summing amplifier 111 which is controlled by an automatic zero set 112 and a Thyrite limiter 124. The summing amplifier 111 is a high gain direct-connected amplifier with which is associated a large amount of negative feedback. The output is connected through a lead 125 to the resistance network 202 which also acts as a feedback circuit for the summing amplifier 111. Under such conditions the effective input and output imepdances of the amplifier 111 are sufficiently small so as to be neglected in comparison with the impedance thereto and the load impedance. Each input voltage produces a current to the summing amplifier 111 which is therefore not a function of the summing amplifier 111. Since the input impedance of the summing amplifier 111 is approximately zero it is in reality a current-measuring device. The summing amplifier 111, in effect, sums all the currents appearing in the input lead 110 although, as described above, the net current is approximately zero. The summing amplifier 111 has an odd number of stages to provide for a phase reversal so that a positive input voltage results in a negative output voltage and vice versa providing for a reversal of the sign of the sum.

If the sum of all the input currents to the summing amplifier 111 is exactly zero, the output voltage should also be zero. When the output voltage or error voltage from section 109 departs momentarily from zero, as a result of a change in the target input voltage, an automatic process is started to restore the voltage to zero. The automatic process as is hereinafter described starts in the error detector 130 and provides for a compensating change in the neutralizing current from the voltage divider 201 to return the sum of the currents to section 109 to zero.

The input lead 110 is also connected to the automatic zero set 112 which monitors the input voltage to the summing amplifier 111, amplifies it and supplies a voltage over lead 126 of the opposite sign to the summing amplifier 111. The automatic zero set 112 is provided to compensate for drift or changes in the output level of the summing amplifier 111. The automatic zero set 112 in this manner provides for a zero output from the summing amplifier when the sum of the input currents is zero. The Thyrite limiter 124 is connected between the leads 110 and 125 or directly across the summing amplifier 111 and functions to avoid excessive fluctuations or overloads by maintaining a current or voltage condition to the summing amplifier 111.

The amplified output from the amplifier section 109 is impressed upon the error detector 130 in the encoder 117 through lead 125 and the test switch 128. The function of the error detector 130 is to detect the magnitude and the sign of the error voltage from the section 109, if any, and to condition other apparatus and circuitry, hereinafter described, in accordance therewith. When the error voltage exceeds a predetermined threshold value upon lead 125, the error detector 130 enables a counting gate 205.

The output lead 125 from the summing section 109 is connected to a modulator 129 in detector 130 through the test switch 128. The function of the modulator 129 is to operate on a 5000-cycle signal or tone received through lead 131 from the program generator 300, hereinafter described, to provide an output tone having an amplitude proportional to the magnitude of the error voltage from section 109, and a phase dependent upon the polarity of the error voltage. When the error voltage is positive, the output of the modulator 129 will always have a certain particular phase; when the error voltage decreases to zero the modulator output will decrease correspondingly to zero; and when the error voltage becomes negative the modulator output will increase again, but have a 180-degree phase reversal. The reason for changing the direct-current voltage into an alternating-current voltage in this manner by the modulator 129 is to permit the required high amplification wtih rapid response.

The modulator output is connected through an alternating-current amplifier 132 and a cathode follower 133 to the rectifier 134. The amplifier 132 is a balanced alternating-current amplifier which steps up or amplifies the 5000-cycle signal to a value suitable for use in the phase detector 135. The phase detector 135 and the rectifier 134 are connected to the cathode follower 133 which is interposed for isloation purposes and to reduce the load upon amplifier 132. The output from modulator 129 is in this manner supplied to two circuits; the rectifier 134 which is connected to a level trigger 137, and the phase detector 135. The rectifier 134 is a full wave rectifier and supplies a negative direct-current voltage proportional to the input thereto, to the level trigger 137. The level trigger 137 operates when the negative potential from the rectifier 134 exceeds a predetermined value to provide a signal to the counting gate 205 briefly described above. The level trigger 137 is a threshold device which is triggered into operation when the error voltage exceeds one-half quantum, and returns to the untriggered state when the error becomes less than one-half quantum. A quantum is a potential equivalent to a registration of the least significant digit in the reversible binary counter 209 hereinafter described. The signal from the level trigger 137 enables the counting gate 205 so that pulses from the program generator 300 through lead 206 can pass therethrough to the reversible binary counter 209 through the lead 208. Before the counting gate is enabled, however, the phase of the output from the modulator 129 is determined by the phase detector 135 which operates a flip-flop circuit 143 to one or the other of two conditions. One constitutes a signal to the reversible binary counter 209 to count forward or "add," the other to count backwards or "subtract." The reversible binary counter 209 is thus steered to count the pulses through the enabled counting gate 205 in the proper direction. This decision as to direction as always made before the counting gate 205 is enabled due to the delay in the rectifier 134.

The phase detector 135 has two inputs: (1) the output from the modulator 129, through the amplifier 132 and cathode follower 133 the phase of which depends on the polarity of the error voltage from section 109; and (2) the output of the amplifier clipper 141 which provides a 5000-cycle square-topped wave of constant and reference phase. The lead 131 from the program generator 300 is connected to the amplifier clipper 141 as well as to the modulator 129 supplying thereto the 5000-cycle tone. The amplifier clipper 141 is an over-driven push-pull amplifier which produces a substantially square wave output through the isolation, cathode follower 140 to the detector 135. The phase detector 135 compares the phases of these two inputs. When the two signals are alike, the detector 135 provides for an unvarying direct-current "add" signal to the counter 209 and when the signals are opposite, the detector 135 provides for an unvarying direct-current "subtract" signal. The phase detector 135 is connected through the impedance isolating cathode follower 142 to the flip-flop 143. The magnitude of the control voltage supplied by the phase detector 135 varies with the magnitude of the error voltage from the summing section 109 so that a device is needed providing a constant voltage output, to steer the count pulses before the level trigger 137 operates to enable the counting gate 205. The flip-flop 143 performs this function and provides a steady direct-current "add" or "subtract" control voltage to the thirteen stages 214 in the reversible binary counter 209. The flip-flop 143 is connected to the add and subtract leads 211 and 212 through the impedance transformation cathode follower 144.

The counter 209 is of the type described in the Holden Patent 2,853,102, dated January 22, 1952 and consists of thirteen flip-flop or binary counter units 214, one corresponding to each digit of a thirteen-digit binary number. A detailed explanation of binary digital notation, and the operations of counting, are described above. Pulses are sent into the first or last significant unit 214 from the gate 205, and each pulse causes this first unit 214 to change its state either from "1" to "0" or from "0" to "1," depending on whether it was in state "1" or state "0" just prior to being pulsed. Every time the first unit 214 changes from "1" to "0" but not from "0" to "1," it sends a pulse into the second stage 214 causing the second stage 214 to change state, and so on from unit to unit 214. Each successive stage 214 in this manner changes state less frequently by a factor of 2. This operation results in the thirteen units forming a configuration of "1's" and "0's" representing in binary notation the total number of pulses which have been sent into the first stage 214. The reversible binary counter 209 can be made to subtract pulses by electrically rearranging the interconnections between stages 214. This rearrangement is accomplished by the voltages through the "add" and "subtract" control leads 277 and 212 which are controlled through the cathode followers 144 and 142 and flip-flop circuit 143 described above.

Binary addition is accomplished in accordance with the following rules;

$$1+0=1$$
$$0+1=1$$
$$1+1=10$$
$$0+0=0$$

The following is a table giving the binary numbers for the decimal numbers 0 through 9 and their representation in the first four stages of units 214:

| Decimal Number | Binary Number | RBC stages 214 | | | |
|---|---|---|---|---|---|
| | | 1 | 2 | 3 | 4 |
| 0 | 0000 | 0 | 0 | 0 | 0 |
| 1 | 0001 | 1 | 0 | 0 | 0 |
| 2 | 0010 | 0 | 1 | 0 | 0 |
| 3 | 0011 | 1 | 1 | 0 | 0 |
| 4 | 0100 | 0 | 0 | 1 | 0 |
| 5 | 0101 | 1 | 0 | 1 | 0 |
| 6 | 0110 | 0 | 1 | 1 | 0 |
| 7 | 0111 | 1 | 1 | 1 | 0 |
| 8 | 1000 | 0 | 0 | 0 | 1 |
| 9 | 1001 | 1 | 0 | 0 | 1 |

The binary numbers are written in the normal order with the least significant digit at the right. In the column headed "RBC Stages 214" the order is reversed. The reversal is provided in order to correspond with the schematic diagrams which provide the binary counter stages with the least significant digit at the left.

Assuming that the reversible counter 209 is set at zero, the decimal number represents the number of pulses from the counter 205 through lead 208. The first pulse changes the first stage 214 to its "1" condition and the second pulse changes it back to "0" causing the second stage 214 to register a "1." Each stage, as is hereinafter described, is so arranged that it sends a pulse into the next stage 214 every time it changes from "1" to "0" but not when it changes from "0" to "1." After the first pulse the first stage 214 is in its "1" condition and the rest of the stages 214 are in "0" condition. After the second pulse the second stage is in the "1" condition and the rest of the stages 214 are in "0" condition. After the third pulse the first and second stages are in the "1" condition and the rest of the stages are in the "0" condition, etc. A similar table can be provided in which the decimal count is successively decreased corresponding to a backwards count starting with nine pulses being registered in the counter 209 or with the first and fourth stages 214 registering a "1" and the rest of the stages 214 registering a "0" condition. The subtraction of a pulse would cause the first stage 214 to go from the "1" to "0" condition leaving only the fourth stage in the "1" condition to represent a registration of eight pulses. In subtraction as described above each stage generates a new pulse whenever it changes from "0" to "1." The subtraction, of course, may start with any number, not necessarily nine.

Therefore in order to add or subtract it is only necessary to change the rules for transmitting pulses between stages 214. To add, a pulse is transmitted between stages 214 when a stage changes from its "1" to "0" condition and to subtract, a pulse is transmitted from a stage 214 when it changes from its "0" to "1" condition.

The binary counter stages 214 are connected to the thirteen units 217. The units 217 each comprises an amplifier and a cathode-follower section. The amplifier section connects the respective unit 214 with the winding of a relay 222 in the relay-operated voltage divider 201. A positive pulse from the stage or unit 214 is amplified through the unit 217 to operate the relay 222 associated therewith. The operation of the relay 222 controls the neutralizing voltage supplied from the resistance network 202 briefly described above.

In the exemplary embodiment incorporated herein the counting pulses occur at the rate of seventy-five pulses per second, which determine the maximum rate at which the reversible binary counter 209 can count. Normally, this rate is more than sufficient but, under "slewing" conditions, when a new target is being acquired, and the error voltage is large, the binary counter 209 could not count sufficiently rapidly to compensate the error voltage. A slewing relay 210 is interposed between the seventh and eighth stages 214 of the binary counter 209. The relay 210 is operated through lead 224 by a direct-current amplifier 215 which is connected to the error voltage lead 125 through the test switch 126. When the error voltage becomes sufficiently large, the relay 210 is operated and counting pulses from the gate 205 are fed into the eighth stage 214 of the binary counter 209 through lead 207 and the operated contact of relay 210 as well as into the first stage 214 through lead 208. The pulses to the eighth stage 214 by-pass the first seven stages 214 and cause the binary counter 209 to count in steps $2^8$ or 128 times greater than normal. The reversible binary counter 209 soon adjusts in this manner to rapidly change the neutralizing voltage, decreasing the error voltage and thereby causing the slewing relay 210 to release and the binary counter 209 once again to resume counting at the normal rate.

The registration or the number stored in the reversible binary counter 209 is changed in this manner in accordance with the error voltage, to control the relay-operated voltage divider 201 and the neutralizing voltage therefrom. As long as the neutralizing voltage is equal in magnitude to the sum of the position and predicted increment voltages, the error voltage is zero. Since the neutralizing voltage is the analog representation of the binary number registered in the reversible binary counter 209, the binary number is a representation of the predicted target position. As the target position changes, the error voltage changes from zero and in turn causes the binary counter 209 to count forward or backward to cause the relay-operated voltage divider 201 to produce a compensated neutralizing potential to reduce the error voltage to zero. The predicted target position voltage is therefore represented as a binary number in the binary counter 209.

In the exemplary embodiment with a possible registration of thirteen digits in the thirteen units 214, the largest possible registration is $2^{13}$ or 8192. The total range of input voltages can therefore be divided into 8192 parts. Normally, the input voltage range is between plus or minus 100 volts and represents plus or minus 40,000 yards. The least significant digit therefore represents about 25 millivolts of input voltage which in turn represents approximately 10 yards.

Figure 5:
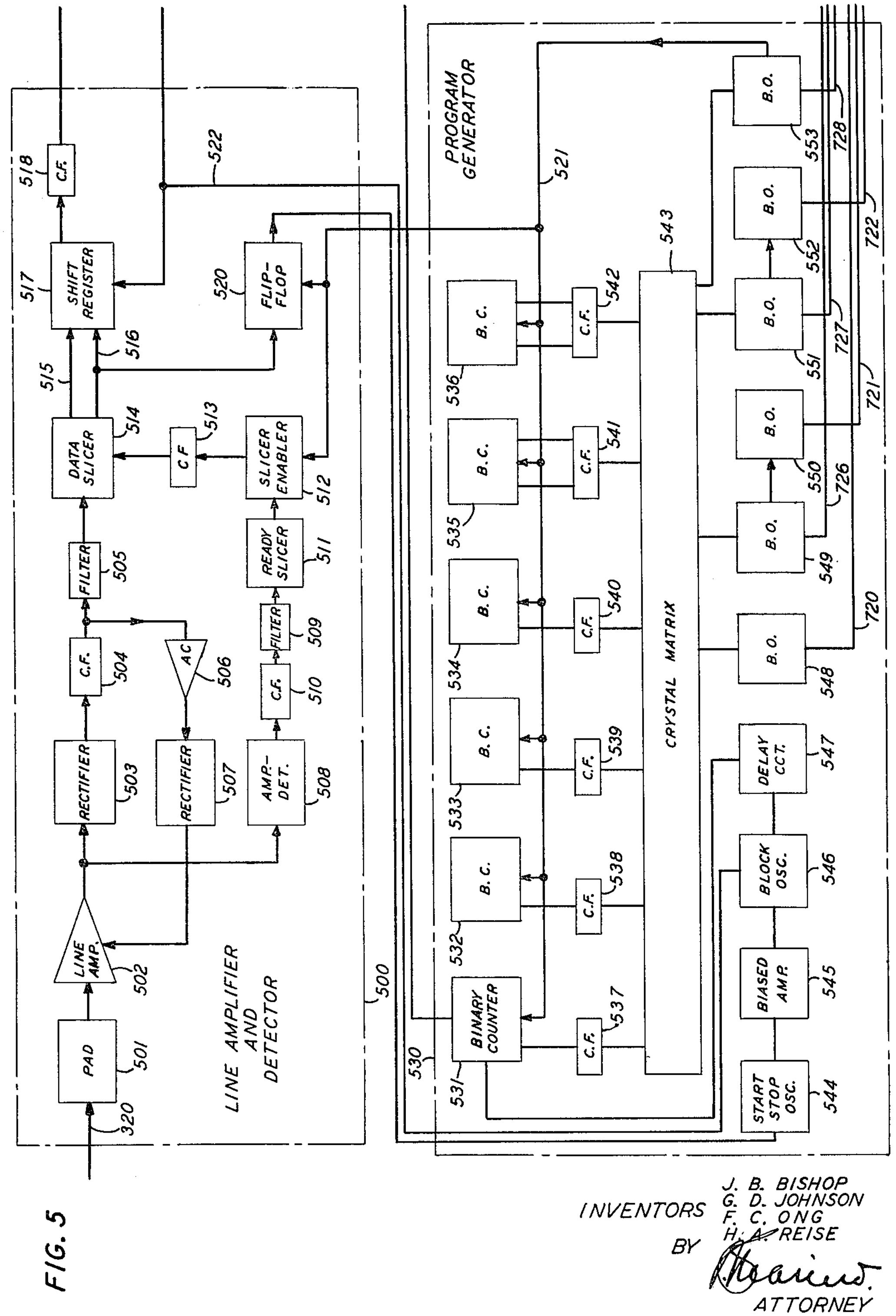

The digital information registered in the reversible binary counter 209 is the information indicating the predicted target position that is necessary for transmission to the remote receiver which is shown in FIGS. 5 through 7. After the digits are registered in the binary counter 209 two main steps remain to be effected: to add a parallax number to the coordinate number before transmission through the line and to transmit the binary number to the line in the form of spurts of tone.

The parallax correction is automatically provided, as is hereinafter described, to a parallax shift register 412. The parallax shift register pulses the corrections simultaneously with the pulsing of the coordinate numbers from a coordinate shift register 405. The coordinate shift register 405 is connected to the reversible binary counters 209 in the encoders 117, 118 and 119 through the units 217. The cathode-follower section of the units 217 described above couples the units 214 in the reversible binary counter 209 to the read-out gate 401. There are three read-out gates 401, 402 and 403 which are associated respectively with the encoders 117, 118 and 119. Each of the read-out gates 401, 402 and 403 comprises thirteen gate circuits, one corresponding to each of the binary counter units 214. If parallax digital corrections hereinafter described are not provided, three auxiliary digits may be used to transmit auxiliary information. In the specific embodiment disclosed herein the binary digital parallax corrections utilize the three additional digits as is hereinafter described.

At an appropriate time a signal called the read-out pulse is sent from the program generator 300 through a lead 327 enabling the read-out gate 401 and allowing the information registered in the reversible binary counter 209 in the encoder 117 to enter the coordinate shift register 405. Subsequently read-out pulses are also provided to the read-out gates 402 and 403 through the leads 328 and 329, respectively, from the program generator 300. Only one coordinate shift register 405 is required as the three read-out pulses are sufficiently spaced to allow for the clearance of the coordinate shift register 405, as is hereinafter described, before the succeeding read-out pulse is entered.

The shift register 405 comprises sixteen combined flip-flop and gate units 406, one for each digit of a binary number that can be registered therein. The gate units have a short term memory which give the coordinate shift register 405 the ability to store the digital information and then upon the receipt of certain pulses hereinafter described to shift the information from each unit 406 into the next unit 406. The information in the last unit 406 at one end is in this manner released for transmission to the line or elsewhere. In the course of this shifting process the other end of the coordinate shift register 405 is cleared one digit at a time so that when the last digit has left the register 405 the register contains all "0's."

When a read-out pulse is entered to one of the read-out gates 401, 402 and 403, the first thirteen units 406 are set in accordance with the information registered in the associated one of the reversible binary counters 209. The last three units 406 are always set to zero when digital parallax corrections are utilized as in the present specific embodiment. The last three units 406 are provided to make a sixteen-digit number as the parallax binary number, hereinafter decribed, which is to be added to the number registered in shift register 405, comprises sixteen digits. The adding operation also hereinafter described would, however, function in a similar manner if there were only thirteen units 406. The information registered in register 405 is pulsed to a serial adder 407 by a digit pulse which is supplied to the left-hand or first unit 406 from the modulator section 303. The digit pulse in effect reads out the condition of the first unit 406 indicating the registration to a serial adder 407 through the impedance transformation cathode follower 416. The serial adder 407 performs a binary addition, as is hereinafter described, one digit at a time to incorporate the parallax correction. The digit pulse which is supplied, as described above, to the first unit 406 in the coordinate shift register 405, is also supplied to the first unit 426 in a parallax shift register 412 and to a pulse delay circuit 408.

Parallax, as applied herein, refers to the differences in the coordinates of a target position as measured from two (or more) stations using different base lines as zero axes. Parallax correction is the correction applied to the coordinates measured at one station to refer them to the base line used by another measurement station, or control point. In the uses of the present system illustrated by the example below, the parallax correction at the transmitter is always by addition and at the receiver always by subtraction. Referring to FIG. 36 the measurement of the X coordinate of the target position from station A is expressed as the distance, in yards, from the left edge of an 80,000-yard square of which A is the center. The left edge is used rather than the center to avoid the use of negative values. The 80,000 yards are selected because the full-scale range of the system, corresponding to the plus or minus 100-volt target data supplied to the transmitter, is plus or minus 40,000 yards.

In the specific embodiment incorporated herein the parallax correction to be made is for the parallax between the transmitter at station A and the receiver at station B, so that the target position for the receiver will be expressed in the coordinates of B's 80,000-yard square. This is done in two steps:

(1) A parallax correction is made for the difference in position between station A and the large or main grid coordinate square which includes the local squares of both stations A and B. This first correction, made at the transmitter at station A, expresses the target position in terms of the main or basic coordinate system. As an illustration, consider the specific values shown in FIG. 36. To the measured value of the X coordinate in A's system (73,358 yards) is added a parallax correction which is the distance (52,018 yards) between the left edge of A's square and the left edge of the 320,000-yard square. Thus a new X coordinate of the target, 125,376 yards, is expressed in terms of the main or over-all system. This figure in binary form is sent to the receiver at station B.

(2) At the receiver the parallax correction is to be made for the parallax between the coordinates of the over-all system and the coordinates of the receiver. From the example shown in FIG. 36, the correction consists in subtracting the distance, 98,002 yards, from the left edge of the large square to the left edge of station B's square. The result is in the X coordinate of the target (27,374 yards) expressed in B's coordinate system.

Provision can be made in the equipment for making parallax corrections by the analog method. This means that the correction is introduced in the form of an input voltage, corresponding to the parallax distance in yards, which is added to the target voltage. To use the analog method would require an auxiliary applique unit to produce the necessary parallax correction voltages. Both analog and digital parallax corrections cannot be used at the same time.

When digital parallax corrections are used the parallax digits for each coordinate are set up on three sets of sixteen parallax keys 414, one for each digit. The setting of each of the keys 414 determines the registration of a "0" or "1" digit. There are three parallax key sets or circuits 409, 410 and 411 which provide the correction to the three coordinates stored in the binary counters 209. The leads 327, 328 and 329 described above are connected through the negatively poled diodes 415 to the keys 414. The read-out pulses through leads 327, 328 and 329 from the program generator 300 are therefore entered simultaneously to one of the read-out gates 401 through 403 and one of the parallax key circuits 409 through 411. Depending upon the setting of the keys 414 the read-out pulses determine a "1" or a "0" indication.

There are sixteen units 426 in the parallax shift register 412, each having associated therewith one of the switches or keys 414 in each of the parallax key circuits 409, 410 and 411. The units 426 are similar to the units 406, described above, so that the register 412 functions in a manner similar to the functioning of the register 405. The digits which are extracted one at a time from both registers 405 and 412 simultaneously by the digit pulse are provided to the serial adder 407 where they are combined. An impedance transformation cathode follower 417 is connected between the first unit 426 in the parallax shift register 412 and the serial adder 407.

The digit pulse therefore causes the digits registered in the first units 406 and 426, respectively, in registers 405 and 412 to simultaneously emerge to the serial adder 407. By emerge is meant that if the digit registered in the first unit 406 or 426 is a "1," the digit pulse is transmitted through the enabled unit 406 or 426 to the serial adder 407 and, if the digit registered therein is a "0," the unit 406 or 426 is disabled and the digit pulse does not get through so that a zero indication is provided. A second function of the digit pulse is to start a chain of operations in the pulse delay circuit 408 which is associated with the serial adder 407. The pulse delay circuit 408 generates another or second pulse called the shift pulse which occurs 100 microseconds after the digit pulse. The pulse delay circuit 408 also generates a third pulse called the carry pulse which occurs 100 microseconds after the shift pulse. The shift pulse is connected to all the units 406 and 426 in shift registers 405 and 412 except the first units 406 and 426 and causes the digits registered therein to shift one place to the left. The shift pulse is also connected to the serial adder 407 causing the sum pulse registered therein to emerge to the modulator section 303. The carry pulse provided by the pulse delay circuit 408 is connected only to the serial adder 407 to cause the carry digit, if any, to be stored for use in the next digit sum. The serial adder 407 in this manner adds the sequences of pulses from the registers 405 and 412.

The read-out leads 327, 328 and 329, described above, are also connected to the serial adder 407. The read-out pulses reset the serial adder 407 before the next coordinate set of pulses is provided thereto from the shift registers 406 and 426.

The output of the serial adder 407 is a very short pulse which is unsuitable for transmission on a telephone line. The pulse must be converted into a relatively long spurt of tone approximately 1⅔ of a millisecond duration. To accomplish this conversion the sum pulses are connected through the lead 420 to the flip-flop or unit 302 in modulator section 303. The pulse through lead 420 is sent when a shift pulse is supplied to the serial adder 407 from the pulse delay circuit 408. The digit pulse described above is also sent to the unit 302 so that when the next digit pulse is supplied, the unit 302 is cleared or reset. If no pulse was supplied through lead 420 corresponding to a "0" digit indication, the unit 302 remains in its "0" condition and the digit pulse entered therein does not perform a function. If the next pulse from the serial adder 407 is a "1" the unit 302 changes its registration to a "1." The unit 302 converts the short sum pulses to square-topped steady direct-current signals corresponding to either a "0" or a "1" digit.

When digital parallax is not used, the output of the shift register 405 will be connected directly to the unit 302 through the right contact of switch 430 instead of to the serial adder 407. In such a case a pulse will be needed ahead of the digit pulse to reset the unit 302 to "0" before the succeeding data arrives.

The square-topped signals from the unit 302 are connected through the cathode follower 330, lead 324 and the filter or shaper 305 to the modulator 306. The filter 305 reshapes the pulses so that they build up and die down slowly to improve the transmission characteristics of the line signals. The shaped pulses from the filter 305 cause the modulator 306 to effectively act as a valve or gate to release spurts of 1200-cycle tone to the alternating-current amplifier 307 and thence to the output line 320. The time allotted to a digit by the unit 302 allows for two full cycles of the 1200-cycle tone but, due to the shaping process in the filter 305, a single pulse is preceded and followed by a cycle of lower amplitude. If several "1" digits arrive in succession the 1200-cycle tone builds up to a steady maximum value in one cycle, remains at the maximum value and then after the last "1" digit dies down again in one cycle to zero. The 1200-cycle tone is supplied to the modulator 306 from the 1200-cycle crystal oscillator 356 in the program generator 300 through the lead 322. The oscillator 356 provides a very stable frequency which is also utilized, as is hereinafter described, for the timing of the sequence of operations of the various components in the transmitter. A curve illustrating a sample output frame is shown in FIG. 9.

Figure 9:
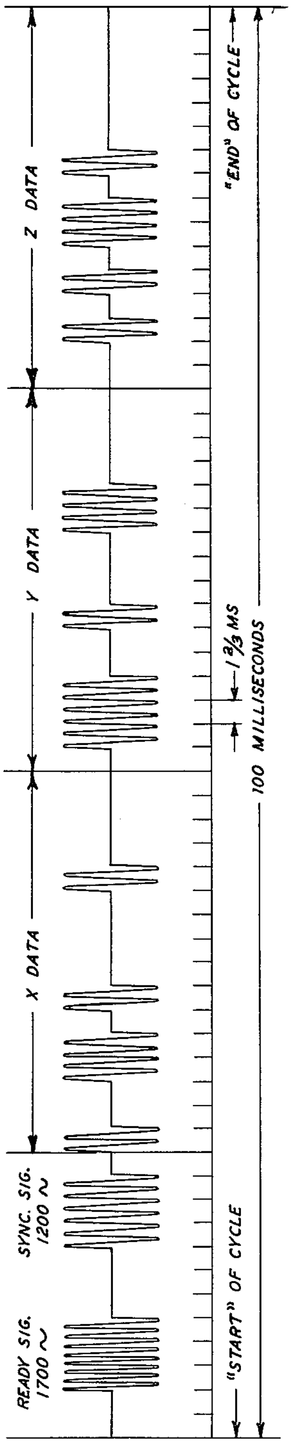
FIG. 9 is an idealized curve illustrating a typical cycle of transmitted data.

In addition to the digit spurts or pulses, the modulator 306 releases a synchronizing signal which is a spurt of 1200-cycle tone, three digits or three time slots in duration as shown in FIG. 9. The synchronizing signal is released under control of start and stop pulses from the flip-flop 334 in the program generator 300 as is hereinafter described. Another modulator 313 is utilized to release a spurt of 1700-cycle tone three digits long, which constitutes the ready signal also as shown in FIG. 9. The modulator 313 receives the 1700-cycle tone from the 1700-cycle oscillator 332 in the program generator 300 through the lead 326. The 1700-cycle oscillator 332 need not be as stable as the 1200-cycle oscillator 356 since the 1700-cycle tone is not utilized for the various timing functions. The modulator 313 is controlled through the shaper 312 which is similar to the shaper 305, through lead 325 and cathode follower 331 from the flip-flop 335. The flip-flop 335 and the flip-flop 334 control the starting and stopping of the ready and synchronizing signals as is hereinafter described. The ready signal from modulator 313, and the synchronizing signal and the digit spurts from the modulator 306 are supplied to the common alternating-current amplifier 307 and thence to the line 320. An adjustment is provided in the amplifier 307 so that the output power may be as high as +10 decibels above one milliwatt for use on facilities where crosstalk into other circuits will not be a major consideration. For ordinary telephone circuits where interference with other circuits may occur, the output power should not exceed −10 decibels below one milliwatt.

The program generator 300 in the transmitter has a frame timing section which includes the binary counters 348 through 353 and a diode or crystal matrix 340 which generates the timing pulses controlling the order of events in the modulator section 303 and in the other section or output section of the program generator 300. The output section which includes the blocking oscillators 336 through 339 and 333 and the oscillators 355, 356 and 332 generate the pulses and tones which are supplied to other parts of the transmitter for control purposes.

The crystal oscillator 356 is connected through lead 321 to the blocking oscillator 308 which effectively halves the frequency therefrom. The blocking oscillator 308 provides 600 pulses per second through lead 323 to the first binary counter 348. The binary counters 348 through 353 provide for a six-stage counter which can count up to $2^6$ or 64. Each binary counter 348 through 353 effectively halves the signal applied thereto so that the binary counter 349 is driven by a signal 300 pulses per second, the binary counter 350 by a signal of 150 pulses per second, etc. The counter comprising the binary counters 348 through 353 is reset at the count of sixty by a pulse through lead 354 as is hereinafter described. With 600 pulses per second applied to the input of the counter, a count of sixty represents one-tenth of a second or a complete data frame, and each count represents one time slot or the time allotted to each digit of the binary data.

The binary counters 348 through 353 are essentially flip-flop units with each section thereof being connected to the cathode followers 341 through 346, respectively. The cathode folowers 341 through 346 actuate a network of crystal diodes in the crystal matrix 340. The crystal matrix 340 functions responsive to the controlling potentials from the cathode followers 341 through 346 to provide a sequence of controlling potentials to the flip-flops 334 and 335 described above and the blocking oscillators 336 through 338 hereinafter described. At the count of seventeen, a start pulse is provided to the flip-flop 335 which enables the modulator 313 to supply the 1700-cycle ready signal; at the count of twenty, a stop pulse is provided to the flip-flop 335 to disable the modulator 313; at the count of twenty-three, a start pulse is provided to the flip-flop 334 to enable the modulator 306 to provide the synchronizing signal; at the count of twenty-six, a stop pulse is provided to the flip-flop 304 to disable the modulator 306; at the count of twenty-eight, a pulse is provided to the blocking oscillator 306 which transmits a pulse through lead 327 to the read-out gate 401 and parallax key circuit 409; at the count of forty-four, a read-out pulse is provided through the blocking oscillator 337 and lead 328 to the read-out gate 402 and the parallax key circuit 410; and finally at the count of sixty, a pulse is provided to the blocking oscillator 338. The third read-out pulse through lead 329 is provided by the blocking oscillator 333 as is hereinafter described. The pulses provided by the crystal matrix 340 are square-topped signals which are separately differentiated. The trailing edges of the first four signals as described above are used to time the ready and the synchronizing signals and the leading edges of the other three are used to time the three coordinate read-out pulses. This provides the proper number of time slots for each portion of the transmitted signal.

As described above the start of the data frame occurs after the count of sixteen in the program generator cycle. The start of the data frame is, of course, an arbitrary designation in a continuous sequence of frames and it permits the use of the third read-out pulse as is hereinafter described for resetting the counter comprising the binary counters 348 through 353.

The third read-out pulse which is connected through lead 329 to the read-out gate 403 and the parallax key circuit 411 is supplied through the oscillators 338 and 333. The output of the blocking oscillator 338 besides actuating the third read-out generator or blocking oscillator 333 is connected through lead 354 described above to the binary counters 348 through 353 to reset them at the count of sixty to zero. The reset pulse provided through lead 354 is sufficiently long to override any interaction between the binary counters 348 through 353. The act of resetting all the binary counters 348 through 353, however, tends to generate a pulse at an unwanted time from the cathode follower 343. A reset pulse therefor is also supplied through lead 359 to the blocking oscillator 339 wherein it exercises an inhibiting function. The output of the cathode follower 343 which is connected to the blocking oscillator 339 over lead 347 is a square wave having a frequency of 75 cycles per second. The positive excursion of this wave is differentiated and utilized to actuate the blocking oscillator 339. The blocking oscillator 339 generates the counting pulses which actuate the reversible binary counter 209 in the encoders 117, 118 and 119. The blocking oscillator 339 is connected through the lead 206 to the counting gates 205 in the encoders 117, 118 and 119 which are actuated by the error voltages in a manner described above. The third read-out pulse which occurs at the count of sixty inhibits the operation of a blocking oscillator 339 since it would be undesirable to have a counting pulse entering the reversible binary counter 209 at the very moment the data is being read out.

The program generator 300 has three oscillators; the 1200-cycle oscillator 356, the 1700-cycle oscillator 332, and a 5000-cycle oscillator 355. The function of the oscillators 356 and 332 has been described above and the oscillator 355 provides the 5000-cycle tone through lead 131 to the modulator 129 and amplifier clipper 141 as described above. The 1200-cycle oscillator 356 in addition to the functions described performs the function of providing for the digit pulses, described above, which control the operation of the shift registers 405 and 412 and the serial adder 407. The oscillator 356 is connected to the blocking oscillator 308 through the lead 321 which is triggered by every second input pulse thereto to act as a frequency halver. The 600 pulses per second from the blocking oscillator 308 are coupled to the blocking oscillator 310 through the delay flip-flop circuit 309. The delay flip-flop circuit 309 is a single cycle multivibrator having a period of 100 microseconds which produces positive triggering pulses. The positive pulses trigger the blocking oscillator 310 which in turn generates the digit pulses which are used in the digital operations described above. The digit pulses are also connected to the binary counter 302 through switch 361 to reset the unit 302 to zero before each of the sum output pulses arrive through lead 420 from the serial adder 407. When digital parallax corrections are not utilized the switch 361 is positioned to the left.

Figure 11:
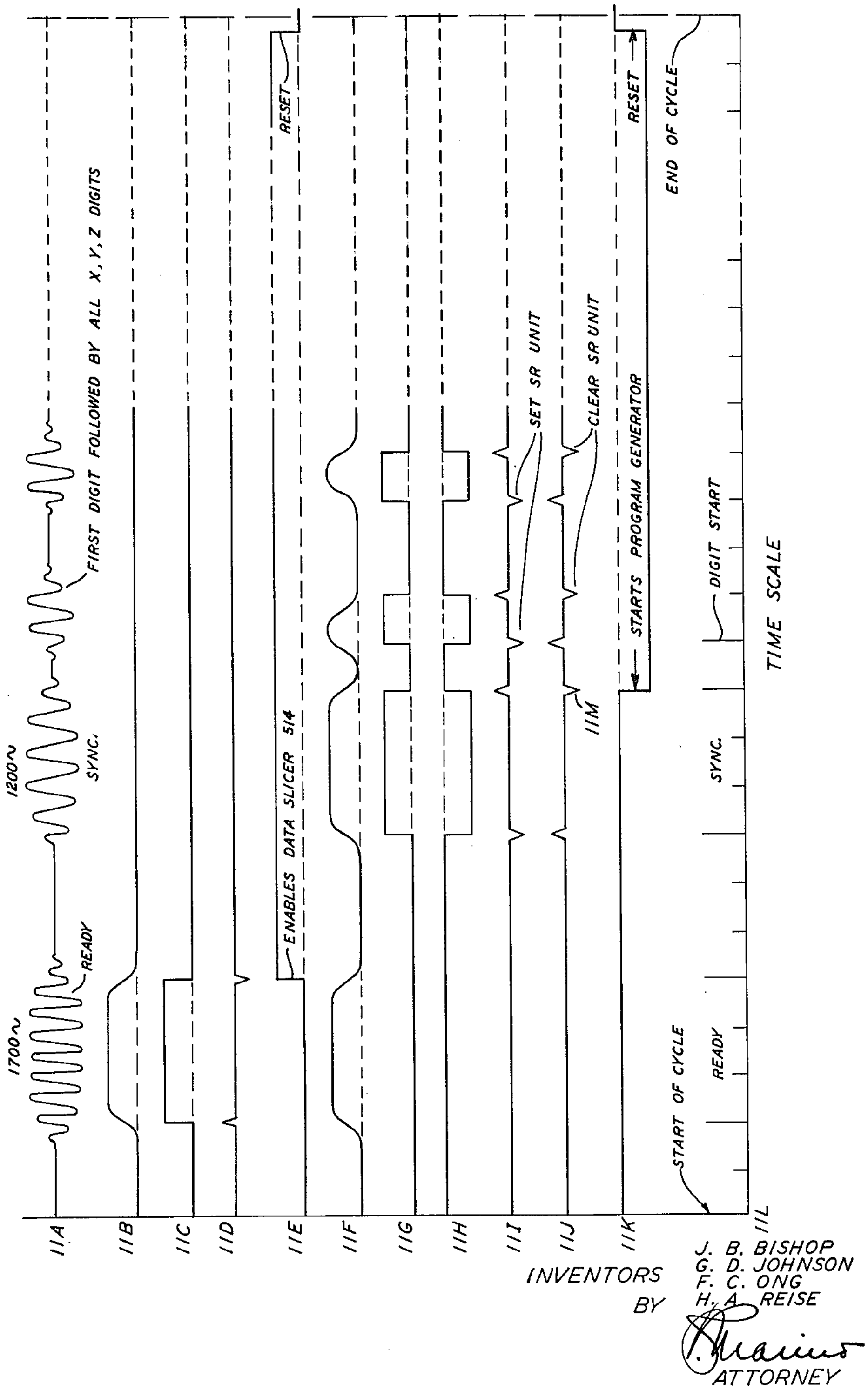
FIG. 11 is a series of curves illustrating the operation of the receiver of the present invention.

The signal which is produced or transmitted to the line 320 is shown in its idealized form in FIG. 9 and is shaped by the action of the shapers 305 and 312 as curve 11*a* in FIG. 11.

The line 320 is connected to the line amplifier and detector section 500 in the receiver. The function of the section 500 is to accept all the tone spurts from line 320 including the ready and synchronizing signals, and convert them into square-topped direct-current pulses. The input from the line 320 is connected to a 15-decibel pad 501 which can be short-circuited if the signal is low. The pad 501 is connected to the line amplifier 502 which has an automatic gain control associated therewith, as is hereinafter described, so that the signal is brought up to a fixed level regardless of line losses. The amplifier 502 is a push-pull amplifier having a wide range of automatic gain control. The gain control is provided by a control path through the rectifier 503, cathode follower 504, amplifier 506 and rectifier 507. The output of the line amplifier 502 is rectified on a full wave basis by rectifier 503 and connected to the cathode follower 504. The alternating-current component of the rectified signal is amplified by amplifier 506, rectified again and smoothed by the rectifier 507 and applied to the line amplifier 502. The voltage applied to the line amplifier 502 by the rectifier 507 provides the gain control. The degree of control is such that the signals emerge from the amplifier 502 at substantially constant level regardless of normal line losses. The automatic adjustment of the amplifier 502 is accomplished by the ready signal so that the gain is substantially set for the synchronizing and data pulses.

The output of the line amplifier 502, which is similar in wave form to the line input, consists of spurts of alternating current shown as curve 11*a* in FIG. 11. The line amplifier 502 is connected to the amplifier detector 508 which is tuned to 1700 cycles. The 1700-cycle tone is separated from the output of the line amplifier 502, amplified and rectified by the amplifier detector 508. The rectified signal from the amplifier detector 508 is coupled through the impedance transformation cathode follower 510 and resistor-capacitor type smoother or filter 509 to the ready slicer 511. The wave form at the input of the ready slicer 511 is shown as curve 11*b* in FIG. 11, having a gradual build-up and decay. The ready slicer 511 is a level trigger circuit which triggers when the signal has reached approximately half its maximum amplitude. The slicer 511 also triggers back when the pulse returns below one-half its maximum amplitude to provide a square-shaped pulse shown as curve 11*c* in FIG. 11. The square-shaped pulse is differentiated in the ready slicer 511, resulting in two output pulses shown as curve 11*d* in FIG. 11. The ready slicer 511 is connected to a slicer enabler 512 which comprises a flip-flop bistable circuit. The negative pulse from the ready slicer 511 triggers the enabler 512 to one of its stable states. The enabler 512 remains in this condition until reset by a pulse through lead 521 from the program generator 530 and provides a steady positive direct-current potential, shown as curve 11*e* in FIG. 11, through the cathode follower 513 to enable the data slicer 514. The ready signal provides for the adjustment of the gain control amplifier 502 as described above and for the enabling of slicer 514 so that any noises or disturbances occurring before the synchronizing signal do not provide signals through slicer 514.

The data slicer 514 is a trigger unit identical to the ready slicer 511. The 1200 and 1700-cycle pulses are connected to the data slicer 514 through the smoothing filter 505 from the cathode follower 504 described above. The filtered input to the data slicer 514 is shown as curve 11*f* in FIG. 11. After the data slicer 514 is enabled by the enabling potential from the enabler 512 responsive to the ready signal, it functions to square the waves at approximately the half amplitude points as shown on curve 11*g* in FIG. 11. The ready signal does not appear on curve 11*g* since it is the trailing edge of the ready signal that initiates the enabling potential. Complementary wave forms as shown on curves 11*g* and 11*h* are provided and then differentiated in the data slicer 514. The complementary differentiated pulses shown on curves 11*i* and 11*j* in FIG. 11 are supplied respectively through leads 515 and 516 to the shift register unit 517. The lead 516 is also connected to the flip-flop 520. The negative pulse 11*m* on curve 11*j* at the trailing edge of the synchronizing signal is utilized to set the flip-flop 520 which thereupon provides a positive direct-current potential to the program generator 530. The positive potential from flip-flop 520 shown as curve 11*k* in FIG. 11 starts the program generator 530 to generate or count the pulses necessary for the subsequent digital operations as is hereinafter described. The flip-flop 520 is reset in a similar manner as the enabler 512 at the end of the operating cycle by a reset pulse through lead 521 from the program generator 530.

The pulses shown on curves **11*i* and 11*j* in FIG. 11 set and clear the register 517. A negative pulse through lead 515 representing the leading edge of each "1" or series of "1's" sets the register 517 to its "1" condition and a negative pulse through lead 516 representing the trailing edge of a "1" clears the register 517 to its "0" condition. The positive pulses through leads 515 and 516 to register 517 perform no function. The mere setting of the shift register 517 to register a "1" or a "0" digit does not by itself provide for subsequent operation in the receiver. The program generator 530, however, which commences generating digit pulses responsive to the synchronizing signal, as described above, provides the digit pulses through lead 522 to the register 517. The digit pulses occur at a time corresponding approximately to the middle of each time slot or when the line or signal pulses are at their maximum amplitude. Whenever the register 517 is set to a "1" the register 517 is effectively enabled and the digit pulse from the program generator 530 can pass therethrough and through the cathode follower 518 to the serial adder 707. When the register 517 is set to "0" the digit pulse cannot pass therethrough to the adder 707**.

The serial adder 707 is similar to the serial adder 407 in the transmitter. Two sequences of digit pulses are provided to the serial adder 707, one as described above from the line amplifier and detector 500, and the other from the shift register 705 through the cathode follower 716. By taking advantage of the fact that the digits arrive through line 320 to the receiver in a serial manner rather than simultaneously, a single shift register 705 is utilized to serve for both the parallax and coordinate data as is hereinafter described.

Parallax corrections in the receiver involve subtracting the parallax number. The subtraction is performed by the use of the "2's" complement, hereinafter described, so that the required subtraction is carried out in the equipment by a process involving only addition and the dropping of a surplus digit. Subtraction utilizing the "2's" complement is utilized so that an adder of the type used in the transmitter may be utilized.

To illustrate what the complement is, an example will be given first of a "10's" complement in decimal numbers. The analogy will then be made with the "2's" complement used with binary numbers.

The complement of any decimal number is the difference obtained when that number is subtracted from a larger number which is an integral power of 10, such as 100, 1000, etc. (For easier subtraction obtain first the "9's" complement; subtract the number from a number made up of all "9's" and then add "1" to the result. This gives the "10's" complement.) It may be seen from the example below that adding the complement of a number and then dropping the digit "1" on the extreme left gives the same result as subtracting the original number:

(*a*) To subtract 92 from 5326:
5326−92=5234 by direct subtraction
(*b*) By the use of the complement:
The complement is 10,000−92=9908

$$5326+9908=15,234$$

Drop the digit "1" on the left, and the answer is 5234.
(*c*) The individual steps in the process are as follows:

$$5326+10,000-92-10,000=5234$$

In the case of binary numbers the operation of subtraction by the complement method is analogous except that here the larger number which is selected to form the "2's" complement is a number which is an integral power of 2. In the binary number system this is represented by a digit "1" in the extreme left-hand position so that the final operation of dropping this digit is comparable to dropping the "1" in the decimal case. The significance of the operations which will be carried out only with the binary numbers in the specific embodiment of the present invention is illustrated below both for the binary numbers and their corresponding decimal numbers.

The rule for subtraction by the use of the "2's" complement is as follows:

To subtract a binary number B from a binary number A:

(1) Write the number B in binary form.
(2) Write its complement obtained as follows:
 (*a*) Build out the binary number B by adding "0's" at the left until it has the same number of digits as the binary number A.
 (*b*) Note the first "1" counting from the right. Bring down this "1" and all "0's" to the right of it unchanged.
 (*c*) Reverse all the other digits, including any "0's" added in step (1).

Another method of obtaining the "2's" complement which gives the same answer is to obtain what is called the "1's" complement by subtracting the given number from another binary number consisting entirely of "1's" and then adding "1" to the result.

(3) Write the number A in binary form below this complement. (The order suggested is merely to make the next operation easier by keeping together the two lines to be added.)
(4) Add the complement of B to A.
(5) Drop the digit, "1," which appears at the extreme left of the sum. The remaining binary digits give the number which is the desired difference.

A sample operation illustrating the steps (1) to (5) is tabulated below:

| | Decimal | Binary | | | | |
|---|---|---|---|---|---|---|
| (1) Number B | 92 | 0 | 000 | 001 | 011 | 100 |
| (2) "2s" Complement of B (8192–92) | 8100 | 1 | 111 | 110 | 100 | 100 |
| (3) Number A | 5326 | 1 | 010 | 011 | 001 | 110 |
| (4) Add A to Complement B | 13426 | 11 | 010 | 001 | 110 | 010 |
| Discard the 8192 | −8192 | (Drop the left-hand "1") | | | | |
| (5) Result | 5234 | 1 | 010 | 001 | 110 | 010 |

Note that $8192=2^{13}$. In the decimal case using the "2's" complement the last discarding operation has to be by direct subtraction since the quantity to be discarded is no longer represented, as in the previous decimal example using the "10's" complement, by a single digit "1." In the binary case it is discarded merely by dropping the left-hand "1."

Returning now to the operation of shift register 705, the sequence of events in shift register 705 commences when a read-in pulse is provided through lead 720 from the program generator 530 through the varistors 714 to the parallax keys 715 in the parallax key section 709. The keys 715 are set in accordance with the complement of the parallax information to be subtracted. The read-in pulse is connected through the keys 715 to the sixteen units 706 in the shift register 705 setting each in accordance with the setting of the associated of keys 715. The shift register 705 is similar to the registers 405 and 412 described above. The parallax data of one coordinate is in this manner stored or registered in register 705.

At the same time that the digit pulses provide the coordinate data from the line amplifier and detector 500 to the serial adder 707 they also extract the parallax data, one digit at a time, from the register 705 in a manner similar to that described above in reference to the transmitter registers 405 and 412. The lead 522, described above, which is connected to register 517, is also connected to each of the units 706. Whenever the least significant or first unit 706 has registered therein a "1" digit, the digit pulse passes therethrough and through the cathode follower 716 to the serial adder 707. Every time a digit is extracted from the first unit 706 all the digits are shifted to the left by the digit pulses which are applied to all the units 706 as shift pulses.

The two sets of digits, one from the line amplifier and detector 500 from line 320 and the other from register 705, are added by the serial adder 707. The sum pulses emerge 100 microseconds after the simultaneous entry of the coordinate data from the amplifier detector 500 and the parallax data from the shift register 705. The serial adder 707 has associated therewith a pulse delay circuit 708 which is similar to the pulse delay circuit 408 in the transmitter. The delay circuit 708 provides a shift pulse and carry pulse to the serial adder 707. The shift pulse causes the adder 707 to emit the sum pulses to the sixteenth unit 706 in register 705. As the digits are shifted to the left in register 705 by the digit pulses the corrected data is entered to the right after a 100-microsecond delay for each digit by the shift pulses. At the end of sixteen such operations, the register 705 is full of the parallax-corrected data which is available for the decoder 617.

The output of the serial adder 707 is connected to the register 705 by only one lead as described above. When the sum digit is a "0" it is necessary to set the sixteenth unit 706 to a "0." This is accomplished by applying the digit pulse to the "0" input of the sixteenth unit 706 so that there are two connections thereto from lead 522. The adder 707 is reset by the next read-in pulse from the leads 720, 721 or 722.

Each of the register units 706 is connected by two leads through a cathode-follower unit 724 to the read-out gates 701, 702 and 703; one of the two leads is for a "1" digit and the other for a "0" digit. The cathode followers 724 provide a low impedance path to the read-out gates 701, 702 and 703. The read-out gates 701, 702 and 703 comprise diodes so arranged that those which are biased by the cathode followers 724 in accordance with the condition of the units 706, permit the read-out pulses from the program generator 530 through leads 726, 727 and 728 to set the flip-flops 604. The outputs of the read-out gates 701, 702 and 703 are used to condition a set of sixteen flip-flops 604 in the section 603. The flip-flops 604 serve two purposes; they provide the power to operate the relays 606 in the relay-operated voltage divider 602 and they act as memory devices which retain their settings either "1" or "0" until directed to change. The read-out pulse therefore sets the sixteen flip-flops 604 in accordance with the information registered in the shift register 706.

Each flip-flop 604 is connected to a relay 606 in the voltage divider 602 which is similar to the voltage divider 401 in the transmitter. The operation of selected relays 606 in the voltage divider 602 in accordance with the operation of the section 603 provides a direct-current voltage which is the analog representation of the binary number registered in the flip-flops 604. The output voltage from the voltage divider 602 changes only once per cycle so that the output is a staircase or series of step functions. The relay-operated voltage divider 602 in decoder 617 provides the X or first coordinate direct-current voltage; another voltage divider 602 in the decoder 618 provides the Y coordinate voltage and the third voltage divider 602 in the decoder 619 provides the Z coordinate voltage.

The output of the relay-operated voltage divider 602 in each of the decoders 617, 618 and 619 is connected to a summing amplifier 609 in each of the decoders 617, 618 and 619 which is similar to the summing amplifier 111 in the transmitter. The summing amplifier 609 has associated therewith an automatic zero set 612 which is similar to the automatic zero set 112 in the transmitter. The output from the summing amplifier 609 is connected to another summing amplifier 611 which is similar thereto and which has associated therewith a manual zero set 620. The output from the summing amplifier 611 is the direct-current potential which is applied to the tracking devices, not shown, and which are associated with the receiver. The output from the summing amplifiers 611 in the decoders 617, 618 and 619 corresponds to the input target position voltages to the transmitter at leads 101, 102 and 103 with corrections incorporated to make the outputs from the receiver the present target position with reference to the receiver grid.

The program generator 530 in the receiver has a six-stage binary counter consisting of the binary counter units 531 through 536. The counters 531 through 536 actuate a diode matrix 543 through the cathode followers 537 through 542. The sequence of operations in the program generator 530 commences when a starting signal is provided by the flip-flop 520 described above. The output from the flip-flop 520, which is shown as curve 11*k* in FIG. 11, is a steady negative potential which is applied to the start-stop oscillator 544 just before the digits are received. The signal from the flip-flop 520 is also shown as curve 12*a* in FIG. 12 in which the time scale is identical with that used in describing the program generator 300 in the transmitter. The starting signal or the signal from the flip-flop 520 occurs at the count of twenty-seven in the counting sequence of the transmitter program generator 300 neglecting transmission time. This voltage or start signal enables the start-stop oscillator 544 which commences to generate a 600-cycle sine wave shown as curve 12*b* in FIG. 12. The oscillator 544 is not crystal-controlled since it must be stopped for a time in each frame and restarted at exactly the proper instant in response to the signal from flip-flop 520 at the count of twenty-seven. In order to maintain the necessary stability, the frequency-determining elements of the oscillator 544 are enclosed in an oven. The oscillator 544 due to stopping and starting in each frame cannot cumulatively drift out of phase with the incoming digits from line 320. The output of the oscillator 544 is impressed upon a biased amplifier 545 which suppresses the positive half cycles and converts the negative half cycles to positive pulses having steep sides, as illustrated by curve 12*c* in FIG. 12. These positive pulses are differentiated with the negative pips being suppressed by a diode. The positive pips shown as curve 12*d* in FIG. 12 trigger the blocking oscillator 546 and the associated delay circuit 547 which supplies the pulses to the input of the binary counting system comprising the binary counters 531 through 536. The oscillator 546 supplies the digit timing pulses through lead 522 to the shift register 517, shift register 705 and pulse delay circuit 708 as described above.

The program generator 530 was completely idle during the first eleven counts between the count of sixteen and twenty-seven in the data frame of the transmitter program generator 300. Since the first half cycle of the output of the start-stop oscillator 544 is suppressed, an output is provided to start the binary counters 531 through 536 to operate at the count of twenty-seven and one-half. The counters 531 through 536 therefore count on the half counts of the transmitter binary counter in the program generator 300. The binary counter comprising the counters 531 through 536 counts to forty-eight whereupon it is reset to zero at the count of 15.5 in the cycle of the transmitter program generator 300. The counter comprising counters 531 through 536 counts at the same rate as the counter comprising the counters 348 through 353 in the transmitter. The wave forms from the six cathode followers 537 through 542 are shown as curves 12*e* through 12*j*, respectively, in FIG. 12. Curve 12*e* is the complement of the actual potentials provided from the cathode follower 537 and is shown in this manner for consistency with the other curves. Responsive to the timed potentials or pulses from the cathode followers 537 through 542 the crystal diode matrix 543 provides four timed pulses with the first pulse being provided one-half time slot before the coordinate data digits arrive from line 320. The first pulse is connected from the crystal diode matrix 543 through the blocking oscillator 548 to the read-in lead 720 described above which is connected to the parallax key section 709. This pulse is used to read the first coordinate parallax data registered by the parallax keys 715 in section 709 into the shift register 705. The parallax data is thereafter added to the first coordinate position data arriving on line 320 as described above. The adding operation for the first coordinate consumes sixteen time slots also as described above. At the end of the sixteen time slots the second pulse is provided by the crystal diode matrix 543 to the blocking oscillator 549 which produces the first coordinate read-out pulse. The read-out pulses provided by the blocking oscillator 549 are 10 microseconds long which is of longer duration than is necessary to actuate the flip-flops 604 described above. The trailing edge of the read-out pulse provided by the blocking oscillator 549 is used to trip the blocking oscillator 550 which generates the second coordinate read-in pulse to lead 721. The 10-microsecond delay thus introduced is sufficient to avoid interference between the read-out and read-in operations.

Similar sequence of timing pulses are provided from the blocking oscillators 551 through 553 responsive to the third and fourth pulses from the matrix 543 to produce the Y or second coordinate read-out and Z or third coordinate read-in and read-out pulses. The blocking oscillator 551 provides the Y read-out pulse through lead 726 and actuates the blocking oscillator 552 which provides the Z or third coordinate read-in pulse through lead 722. Finally, the third coordinate read-out pulse is generated through the blocking oscillator 553 which also signals through lead 521 to reset the counters 531 through 536 and flip-flops 512 through 520 that the frame is ended. When the flip-flop 520 is reset it stops the start-stop oscillator 544.

In this manner as briefly described above the program generator 530 controls the timing of the receiver to reconstruct or recode the predicted target position with reference to the receiver location.

In the following description taken in conjunction with FIGS. 13 through 34 arranged in accordance with FIG. 35, values of potential of circuit elements, such as resistors and capacitors, will be given. It is not intended to limit the invention to the embodiment described herein nor to limit the circuit values to those specified. The embodiment and values are only illustrative, as various modifications can be provided to maintain the proper relation between the various parts of the circuit.

Referring now to the detailed circuits shown in FIGS. 13 through 34, arranged in accordance with FIG. 35, the varying target input upon leads 101, 102 and 103 is entered respectively to predictor circuits 104, 105 and 106 as described above in reference to the diagrams in FIGS. 1 through 7. Only the predictor circuit 104 is shown in detail. The voltages at inputs 101 and 102 represent the position of the target in the horizontal plane and the voltage at input 103 represents the vertical height of the target over the transmitter station. Each of the supplied input voltages at inputs 101, 102 and 103 is an independently varying direct-current voltage from some kind of tracking device, not shown. The lead 101 is connected to lead 107 which is in turn connected to the relay-operated voltage divider 201, briefly described above, and shown in detail in FIG. 16 in the encoder 117. The lead 107 therefore supplies an input voltage or current to the voltage divider 201 which is exactly the same as the varying target input upon lead 101. Similarly the leads 113 and 115 supply varying target inputs to the encoders 118 and 119.

At the receiver output of the system the reconstructed target voltages represent as accurately as possible the instantaneous present target position. The system therefor must predict from the varying target input voltages to the transmitter what the target voltages will be at the end of the encoding, transmission and decoding processes. This function is performed at the transmitter as described above by the predictor circuits 104, 105 and 106 which add to the input voltages from leads 101, 102 and 103 appropriate correction voltages. Actually the predictor circuits 104, 105 and 106 derive the first time derivative of the target voltage which corresponds to target velocity. When an increment proportional to this velocity is added to the target position the sum constitutes a predicted target position in which allowance has been made for the delay in encoding, decoding and transmitting the data.

The lead 101 is also connected to a smoothing network consisting of the 510,000-ohm resistor 1301 and the .5 microfarad capacitor 1302 which removes granularity or small perturbations from the input voltage. The junction of capacitor 1302 and resistor 1301 is connected to the grids of the double triode vacuum tube 1303 through the 1000-ohm limiting resistors 1304 and 1305. The plates of tube 1303 are connected to the +250 volt source 1306 and the cathodes are connected through the 200,000-ohm cathode resistor 1307 to the −250 volt source 1308. The double triode 1303 provides for two cathode followers coupled together to increase the output to the selector switch 1309 and to reduce the input impedance from lead 101.

The selector switch 1309 has three branches 1310, 1311 and 1312 which provide for changing the scale factor of the output by switching in an appropriate resistive branch, of 0 ohms, 51,000 ohms and 130,000 ohms, respectively. The branches 1310, 1311 and 1312 are connected together and then through the 8200-ohm resistor 1313 to the 25,000-ohm potentiometer 1314 which is in turn connected to ground through the 91,000-ohm resistor 1315. The variable arm of the potentiometer 1314 is connected through the .1 microfarad capacitor 1316 to the output lead 108.

The time constant of the predictor circuit 104 is small compared to the period of any time variation expected in the target voltage upon lead 101 so that the current flowing through the capacitor 1316 and output lead 108 is proportional to the time derivative of the varying input voltage. In effect, the predictor circuit 104 provides for a circuit having a source of potential from lead 101 and a series circuit consisting of resistive and capacitive elements so that the output current is proportional to the time derivative of the input voltage. Since the input voltage represents the target position and the current represents the time derivative of this voltage, the current represents the velocity of the target. It is assumed that the velocity of the target remains constant during the sampling interval so that the velocity multiplied by the total delay hereinafter described is equal to the motion of the target during the transmission interval. Adding the output on lead 108 from the predictor circuit 104 to the present position voltage upon lead 107, as is hereinafter described, will provide for the predicted target position at the end of the transmission interval. It is, of course, essential that the magnitude of the velocity component derived by the predictor circuit 104 is properly proportioned relative to the target voltage. This proportion is dependent upon the scale factor or distance represented by one quantum of voltage; the line delay encountered between the transmitter and receiver; and the fixed delay encountered in the encoding and decoding processes which were briefly described above and hereinafter described in detail. The selector switch 1309 provides for changing the scale factor by switching in one of the appropriate resistive branches 1310 through 1312. The line delay encountered between the transmitter and receiver is however a variable quantity dependent upon the type of telephone facilities used, the geographical distance between the transmitter and receiver, etc. The magnitude of the velocity correction provided by the predictor circuit 104 can be changed to take care of these variable conditions by varying the setting of potentiometer 1314 described above. The resistor 1315 connected thereto provides a resistance to take care of the fixed encoding and decoding delay. The resistive elements 1310 through 1315 therefore are provided in the predictor circuit 104 to provide for an output having a predetermined fractionated value in reference to the input upon lead 101.

The predictor circuits 104 through 106 are each connected by two leads 107—108, 113—114 and 115—116, respectively, to the encoders 117, 118 and 119. One lead 107, 113 and 115 of each pair supplies a voltage representing the position of the target and the other lead 108, 114 and 116 of the pair supplies a voltage representing the predicted change in position. The encoder 117 is shown in further detail but the encoders 118 and 119 comprising similar components are not shown in further detail in order to avoid duplication. The purpose of the encoders 117, 118 and 119 is to accurately convert the three coordinate voltages into voltages representing the binary numbers of the magnitudes of the predicted position of the coordinate voltages.

The leads 107 and 108 as described above are connected to the relay-operated voltage divider 201. The relay-operated voltage divider 201 is a sealed unit approximately 15 by 3 by 5 inches in size which functions to provide a voltage which precisely corresponds to a binary number of thirteen digits. Actually it provides a current instead of a voltage but, as described above, it is convenient to describe the encoding and decoding operations in terms of voltages. The lead 107 is connected to the 1-megohm resistor 1602 and the lead 108 is connected to the 1-megohm resistor 1603. The resistors 1602 and 1603 are connected to the lead 110 to the amplifier section 109. The lead 110 is also connected to a 2.85-megohm feedback resistor 1604 which is associated with the summing amplifier 111 of the amplifier section 109. The resistors 1602 through 1604 are carbon-deposited glass-sealed resistors precisely measured as to value and as to temperature coefficient. The resistors 1602 through 1604 are mounted in close contact with a copper mounting plate, not shown, which maintains them at the same temperature. All the critical impedance elements in the transmitter are included in the package comprising the relay-operated voltage divider 201 which provides as is hereinafter described for a neutralizing current to the lead 110. The neutralizing voltage is an analog representation of the binary digits registered in the encoder 117 and is essentially a voltage equal in magnitude to the sum of the voltages upon leads 107 and 108 but opposite in sign and is provided by the voltage divider 201 as is hereinafter described. If analog parallax corrections were provided instead of the digital parallax corrections hereinafter described, an additional summing resistor would be provided adjacent the resistors 1602 through 1604.

The three voltages or currents from the relay-operated voltage divider 201 are connected to the amplifier section 109 through lead 110. The input to the amplifier section 109 when the system is functioning normally, which is when the neutralizing potential is exactly equal in magnitude to the sum of the position and predicted increment voltages, is therefore zero. The operation of the encoders 117, 118 and 119 depends upon the maintenance of this zero condition as the transmitted information, as is hereinafter described, represents in binary digital form the magnitude of the neutralizing voltage supplied from the voltage divider 201.

The amplifier section 109 comprises a summing amplifier 111 which is controlled by an automatic zero set 112 and a thyrite limiter 124. The input impedance of the summing amplifier 111, as is hereinafter described, is approximately zero so that it is in reality a current-measuring device. The summing amplifier 111 is a high gain amplifier which utilizes a large amount of negative feedback, as is hereinafter described, so that the net gain is substantially unity. Under such conditions the effective input and output impedances are sufficiently small so as to be neglected in comparison with the input and load impedances. In effect, the amplifier 111 is a current-measuring device and the summing resistors 1602 and 1603 merely proportion the currents from the various sources. The current through the summing resistors 1602 and 1603 is therefore a function only of the resistors 1602 and 1603 and not of the amplifier 111 in the section 109. The summing amplifier 111 sums all the currents appearing in the input lead 110 although, as described above, the net current is approximately zero. For target voltages varying between 0 and 100 volts each of the summing resistors 1602 and 1603 passes a current varying between 0 and 100 microamperes.

The lead 110 is connected to the left grid of tube 1317 which is in the first stage of amplification of three stages in the summing amplifier 111. Since there are three stages, an odd number, there is a phase reversal between the lead 110 and the output upon lead 125 so that a positive input voltage results in a negative output voltage and vice versa. The right grid of tube 1317 is connected to lead 126 from the automatic zero set 112 which is hereinafter described. The double triode 1317 has a common cathode resistor 1318 of 1.25 megohms which is connected to the —250 volt source 1319. The left plate of tube 1317 which is essentially the output of the first stage is connected to ground through the 24,000-ohm resistor 1320 and the .0027 microfarad capacitor 1321. The left plate of tube 1317 is also connected to the +250 volt potential source 1322 through the .62 megohm plate resistor 1323. The potential source 1322 is also connected to the right plate of tube 1317 through the .18 megohm plate resistor 1324 and to ground through the resistor 1324 and the .274 megohm resistor 1325.

Due to the common cathode resistor 1318 a potential upon lead 126 from the automatic zero set 112 will control the conduction through the right-hand section of tube 1317 by changing the cathode potential and controlling the conduction through the left-hand section of tube 1317. The purpose of the potential upon lead 126 from the automatic zero set 112 is to provide an adjustment so that the output voltage upon lead 125 is zero when the input upon lead 110 is zero. This procedure keeps the summing amplifier 111 in adjustment in spite of changes in temperature or other factors tending to cause drift and eliminates the necessity for frequent manual adjustments. The output from the first stage or the left plate of tube 1317 is connected to the control grid of the pentode tube 1326 through the parallel coupling circuit consisting of the 1.91-megohm resistor 1327 and the 240-micro-microfarad capacitor 1328. The control grid of the pentode 1326 is also connected to the —250 volt potential source 1329 through the 3.3-megohm grid resistor 1330. The suppressor grid of tube 1326 is connected to ground and the screen grid is connected to the +75 volt potential source 1331 through the 10,000-ohm limiter resistor 1332. The output from the second stage or the plate of tube 1326 is connected through the parallel coupling circuit consisting of the 240-micro-microfarad capacitor 1333 and the 1.8-megohm resistor 1334 and the serially connected 1000-ohm grid resistor 1335 to the grid of the triode 1336. The plate of tube 1326 is also connected to the —250 volt supply 1337 through the .24 megohm plate resistor 1338. The junction of resistors 1334 and 1335 is connected to the —320 volt potential source 1339 through the .62 megohm resistor 1340 and also to the —200 volt potential source 1341 through the series circuit consisting of the 10,000-ohm resistor 1342 and the 620-micro-microfarad capacitor 1343 which is also connected to the cathode of the triode 1336. The output of the triode 1336 which is also the output of the summing amplifier 111 is connected to the output lead 125 described above and also to ground through the .25 microfarad capacitor 1344 and to the Thyrite limiter 124.

The lead 125 is connected to the summing resistors 1602 and 1603 described above and also to the 2.85-megohm feedback resistor 1604 in the voltage divider 201. The feedback resistor 1604 is in this manner connected across the amplifier 111 or between input lead 110 and output lead 125. The currents through resistors 1602 and 1603 and the neutralizing current hereinafter described, supplied by the voltage divider 201, can be said to flow through the feedback resistor 1604. The large amount of negative feedback provided by resistor 1604 effects, as described above, a substantially zero input impedance to amplifier 111 from lead 110.

As described above, the input lead 110 is connected to the left grid of the double triode 1317 and also to the automatic zero set 112. The automatic zero set 112 monitors the input voltage to the summing amplifier 111, amplifies it and supplies a voltage of the opposite sign over lead 126 to the summing amplifier 111. The gain through the zero set 112 is so chosen that an error voltage upon lead 110 is reduced to zero but not so great that the correction would exceed the error and cause an unstable system. The voltage applied to the right grid of tube 1317 readjusts its cathode voltage in such a manner as to cause the signal grid or the left grid of tube 1317 to move towards zero voltage. Obviously any attempt to perform the necessary amplification in the automatic zero set 112 at direct current will be subject to the same kind of drifts and would not therefore be effective. The amplification in the automatic zero set 112 is therefore performed at alternating current by first interrupting the error voltage upon lead 110 at a 120-cycle rate. The lead 110 to the automatic zero set 112 is connected to the armature 1350 associated with relay 1351 through the .47 megohm resistor 1352. The relay 1351 is actuated by a 60-cycle, 115-volt alternating-current source 1353 which is connected thereto through the 5000-ohm resistor 1354. The armature 1350 engages a make-before-break contact which grounds the input from lead 110 while removing ground from a back contact. The back contact is connected to the output of the second of two stages in the automatic zero set 112 through the 1-megohm resisor 1355 and the 4300-micro-microfarad capacitor 1356 so that either the input or the output of the automatic zero set 112 is grounded. If there is a voltage upon lead 110, the operation of the relay or vibrating reed 1351 will produce an alternating-current component which is applied through the .1 microfarad coupling capacitor 1357 to the control grid of the amplifying triode 1358. The control grid of triode 1358 is connected to the grounded front contact of relay 1351 through the 2.2-megohm resistor 1364. The cathode of triode 1358 is also connected to ground through the 2200-ohm cathode resistor 1359 and the plate of triode 1358 is connected to the +320 volt plate supply 1360 through the .47 megohm plate resistor 1361 and the 39,000-ohm resistor 1362. The output of the first stage or from the plate of the triode 1358 is coupled through the .1 microfarad coupling capacitor 1365 to the control grid of the triode 1368. The control grid of triode 1368 is connected to ground through the 1-megohm resistor 1367 and the 150-micro-microfarad capacitor 1369. The cathode of triode 1368 is connected to ground through the parallel circuit of the 3600-ohm cathode resistor 1370 and the 16-microfarad capacitor 1366 and the plate of triode 1368 is connected to the potential source 1360, described above, through the .47 megohm plate resistor 1371. As described above, the output from triode 1368 is coupled through the capacitor 1356 and resistor 1355 to the back contact of relay 1351. The back contact of relay 1351 is also connected to the output lead 126 through the 10-megohm resistor 1373 and to the grounded 4-microfarad capacitor 1374 through the resistor 1373. The plate of triode 1358, described above, is connected to ground through the resistor 1361 and the 16-micro farad capacitor 1375.

The alternating-current component to the grid of triode 1358 is amplified by the triodes 1358 and 1368. The output from triode 1368 is also interrupted by the relay 1351 effectively resulting in a rectifying action with the polarity of the output being reversed from that of the input. If the input voltage is positive at the moment the armature 1350 lifts from the ground connection on the front contact of relay 1351, the output of the second stage will also be in the positive phase. The output of the second stage is, however, grounded when the input lead 110 is effectively connected to the first stage. The voltage will be in the opposite phase or negative when ground is removed from the output due to the effect of capacitor 1356. The capacitor 1374 and resistor 1373 provide a delay to the amplifier 111 smoothing the offset voltage thereto. The gain around the loop in the automatic zero set 112 is so chosen that an error voltage is rapidly reduced to zero but not so great that correction would exceed the error which would lead to an unstable system.

The Thyrite limiter 124 which is connected across the summing amplifier 111 reduces the effect of surges from disturbing the operation of the summing amplifier 111. The Thyrite limiter 124 contains three varistors or bi-directional variable resistors 1380, 1381 and 1382, the junctions of which are connected to ground through the 33,000-ohm resistors 1383 and 1384. The three varistors 1380 through 1382 are paralleled by a 51-micro-micro-farad capacitor 1385.

The output of the amplifier section 109 is a voltage which is proportional to the sum of the input currents. If the neutralizing current provided in the resistive network 202 of the voltage divider 201 differs from the sum of the input currents through resistors 1602 and 1603, there is a corresponding summed error voltage at the summing amplifier output or lead 125. Whenever the output voltage of the amplifier 111 departs momentarily from zero, as a result of a change in the target input voltage an automatic process, hereinafter described, is started to restore the voltage to zero, or more precisely, so close to zero that the error is less than half the value represented by the least significant binary digit.

Figure 13:
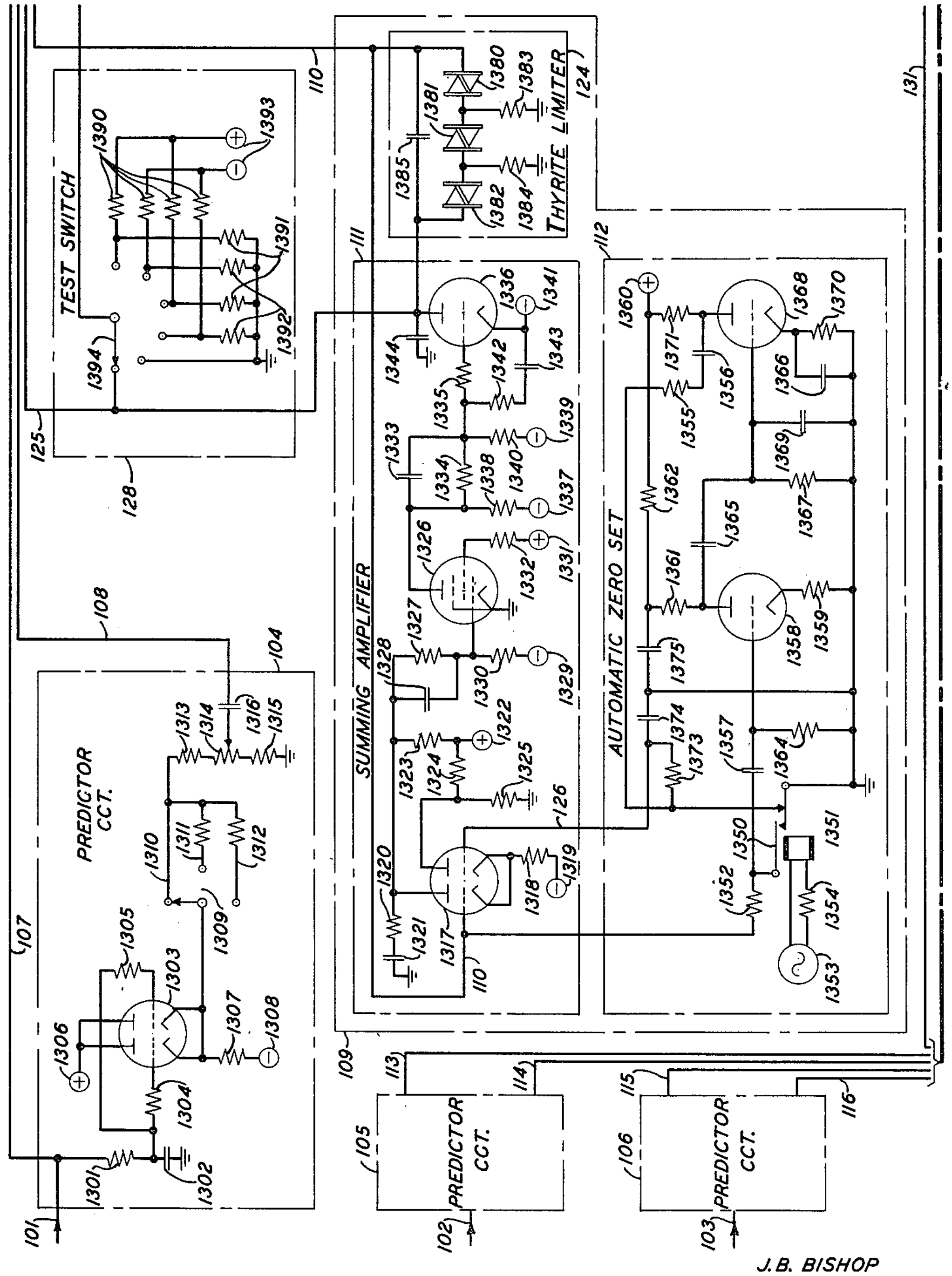
Figure 14:
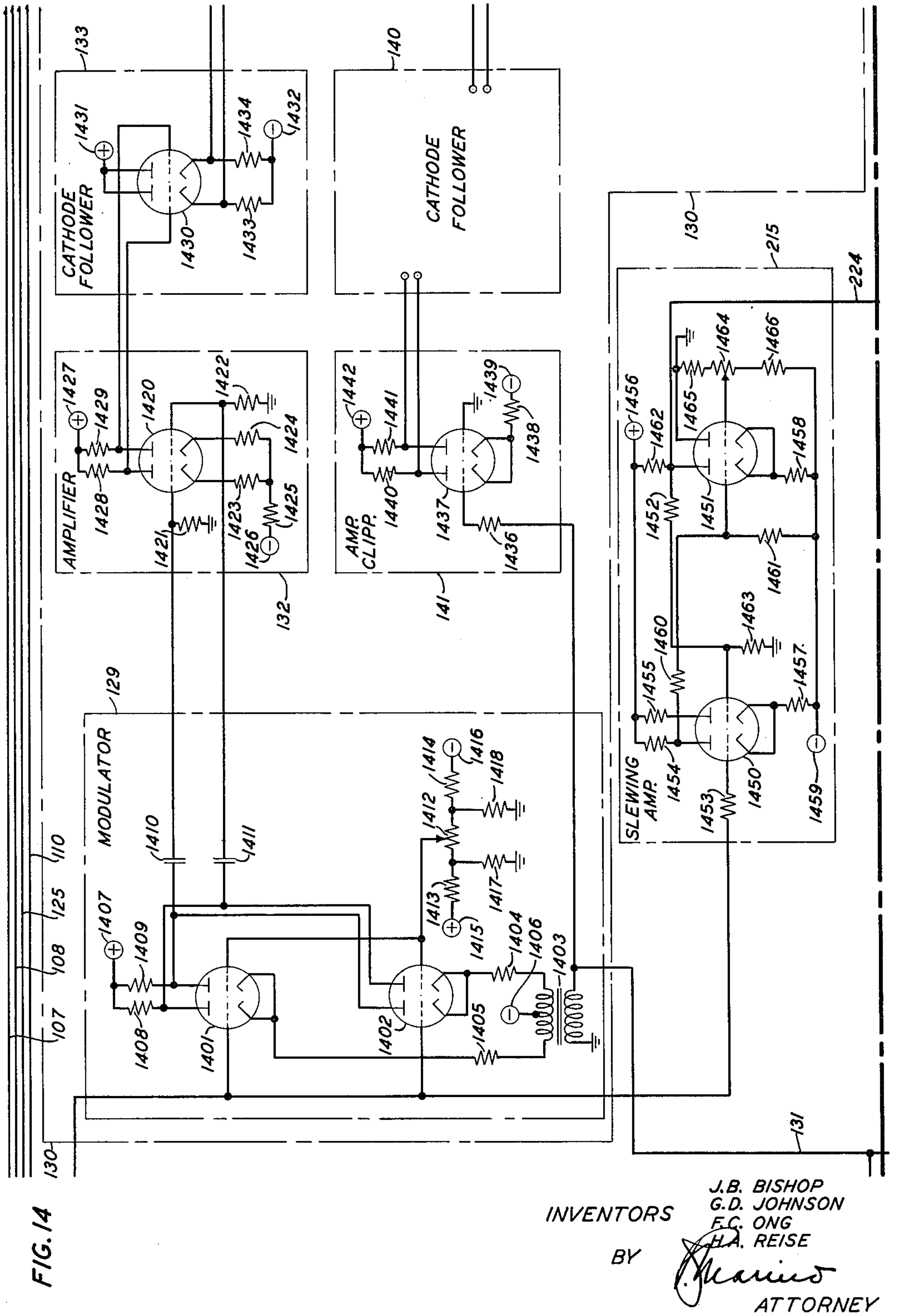
Figure 15:
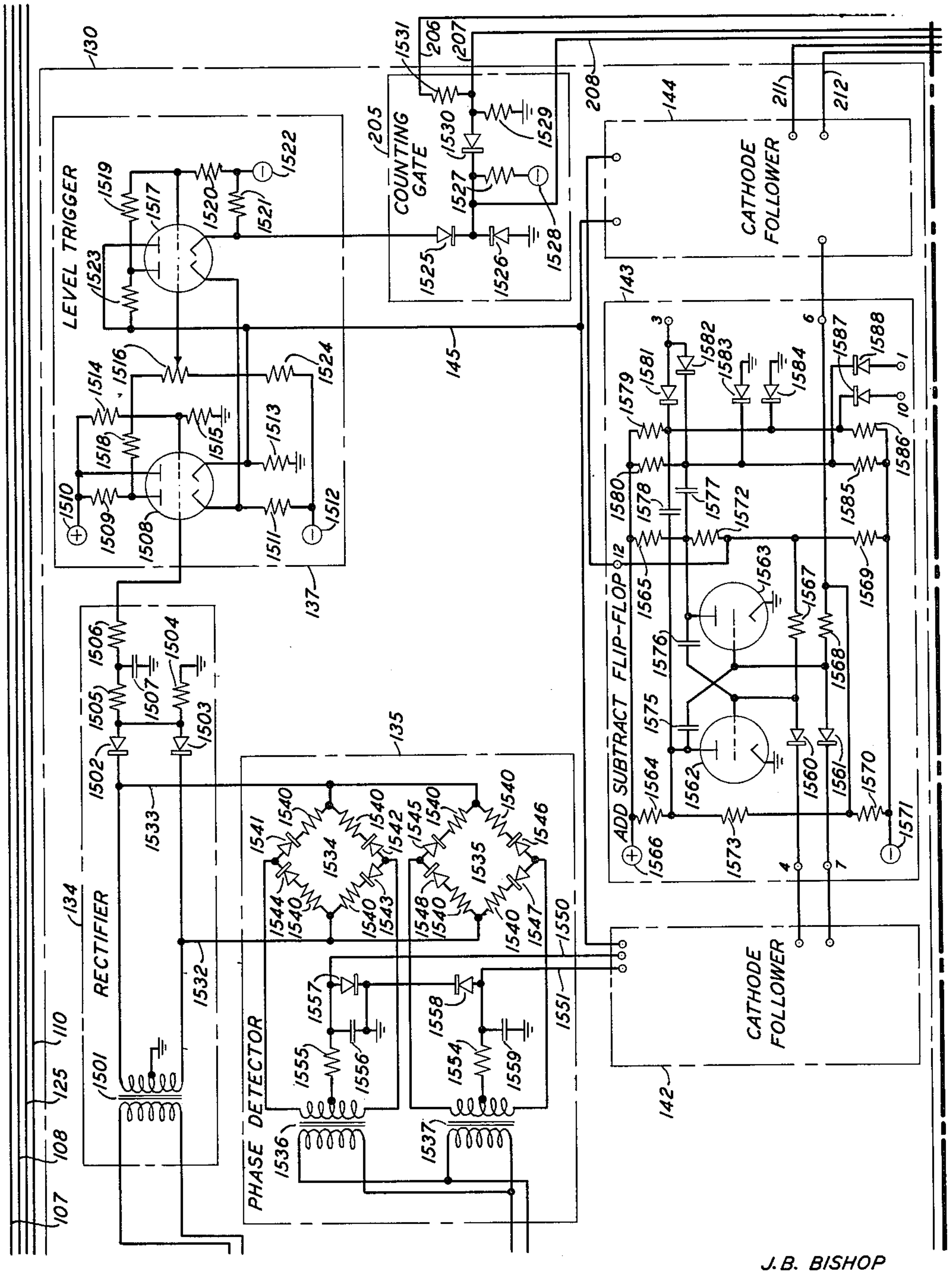
Figure 16:
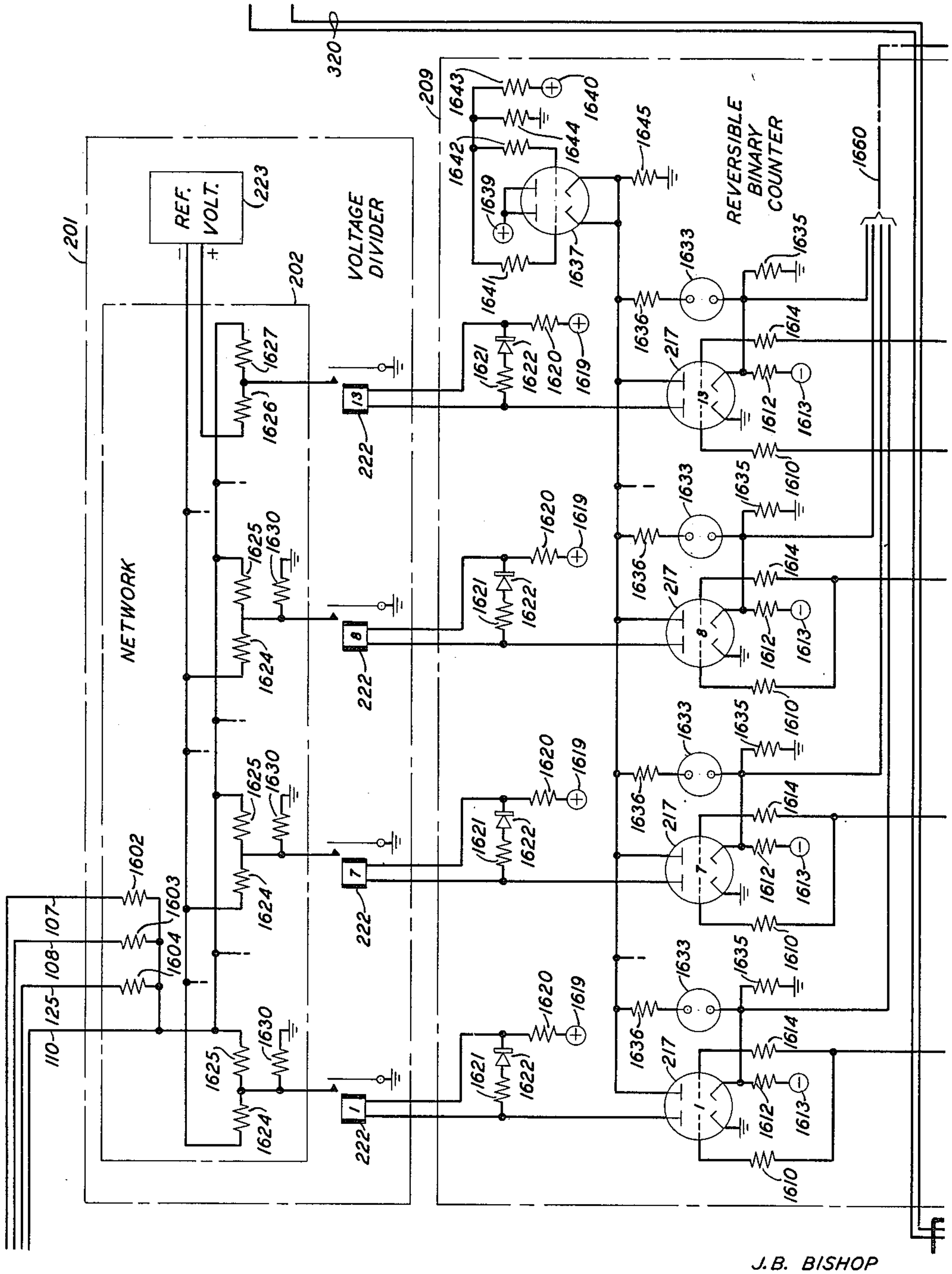

The output lead 125 from the section 109 is connected to a test switch 128 which has five test positions and one operating position. The test switch 128 provides for a means to test the effect of various error voltages upon the components hereinafter described in the encoder 117. One of the test positions of switch 128 is connected to ground and the other four are connected to the junctions of the 1-megohm resistors 1390, the 360-ohm resistors 1391 and the 33,000-ohm resistors 1392. The resistors 1390 are connected either to the plus or the minus 250-volt sources 1393 and the resistors 1391 and 1392 are connected to ground. The armature 1394 of the test switch 128, as shown in FIG. 13, is connected to the operating position providing a connection from the summing amplifier 111 to the modulator 129 in FIG. 14 which is part of the error detector 130 shown on both FIGS. 14 and 15. The function of the error detector 130 is to detect the magnitude and sign of the error voltage from amplifier 111 and enable other components, hereinafter described, in response thereto.

The function of the modulator 129 in detector 130 is to provide an alternating current having a magnitude proportional to the magnitude of the error voltage from the summing amplifier 111 and a phase depending upon the polarity of the error voltage. If the error voltage is positive, the output of the modulator 129 has a certain definite phase and, if the error voltage is negative, the phase varies 180 degrees from the positive error voltage phase.

The modulator 129 therefore changes the direct-current error voltage from the summing amplifier 111 to an alternating-current error voltage so as to permit, as is hereinafter described, high amplification with rapid response.

The test switch 128 is connected to the left grids of double triodes 1401 and 1402 in the modulator 129. The cathodes of the tubes 1401 and 1402 are connected to the opposite sides of the secondary of transformer 1403 through the 1-megohm resistors 1404 and 1405. A lead 131 is connected to the primary of the transformer 1403 supplying a 5000-cycle signal from oscillator 355 in the program generator 300, hereinafter described, to drive the cathodes of tubes 1401 and 1402 alternately positive and negative.

The program generator 300 comprises three oscillators for providing various controlling tones; a 5000-cycle per second oscillator 355, a 1200-cycle per second oscillator 356 and a 1700-cycle per second oscillator 332.

The oscillator 355 is connected through lead 131 to the modulator 129, as described above, and to a clipper 141. The oscillator 355 comprises a double triode 2104 and the cathode-follower tube 2158. The left plate of tube 2104 is connected to the +210 volt potential source 2109 and the left cathode of tube 2104 is connected to ground through the 24,000-ohm resistor 2107. The left section of tube 2104 is a cathode follower with the output therefrom connected from the left cathode to the grid of tube 2158. The right plate and grid of tube 2104 are connected together and to the shaper 2114 which determines the frequency of oscillation. The shaper 2114 comprises the serially-connected inductors 2112 and 2113 shunted by the capacitor 2111. The inductor 2113 is connected to ground and the junction of inductors 2112 and 2113 is connected to the left cathode of tube 2104 through the 51,000-ohm resistor 2108. The right cathode of tube 2104 is connected to ground through the 15,000-ohm resistor 2126 and to the +320 volt potential source 2101 through the 10,000-ohm resistor 2105 and the .11 megohm resistor 2102. The junction of resistors 2105 and 2102 is connected through the 1-megohm resistor 2103 to the left grid of tube 2104 which is also connected to the shaper 2114 through the .5 microfarad capacitor 2110.

When the right section of tube 2104 conducts its cathode potential increases, increasing the potential at the left grid of tube 2104 causing the left section to conduct. Conduction in the left section of tube 2104 causes the right section to reduce conduction therethrough. The cycle is repetitive at 5000 times per second as determined by the shaper 2114. The left cathode of tube 2104 is connected to the grid of tube 2158 which is a cathode-follower tube. The plate of tube 2158 is connected to the +210 volt potential source 2157 and the cathode thereof through the 10,000-ohm resistor 2160 to ground and through the .5 microfarad capacitor 2161 and lead 131, to the primary of transformer 1403 in the modulator 129, briefly described above. The center tap of the secondary of transformer 1403 is connected to the −250 volt source 1406 so that when the cathodes of tube 1401 are driven positive with respect to the source 1406, the cathodes of tube 1402 are driven negative and vice versa. The left plate of tube 1401 and the right plate of tube 1402 are connected to the +250 volt source 1407 through the .1 megohm resistor 1408 and the right plate of tube 1401 and the left plate of tube 1402 are connected to the source 1407 through the .1 meghom resistor 1409. When the left cathode of one of the tubes 1408 or 1409 becomes relatively positive and the right cathode of the other of tubes 1408 and 1409 becomes relatively negative, the various circuit parameters described above which are associated with tubes 1401 and 1402 cause the tubes 1401 and 1402 to operate upon the linear portion of their transfer characteristics. When there is no error voltage from the summing amplifier 111, the left grids of tubes 1401 and 1402 are at zero or ground potential and there is no net change in current through the plate resistors 1408 or 1409.

The 25,000-ohm potentiometer 1412 which is connected to the right grids of tubes 1401 and 1402 is provided to adjust the output of modulator 129 to zero when the error voltage to the left grids of tubes 1401 and 1402 is zero. The potentiometer 1412 is connected to the .301 megohm resistors 1413 and 1414 which are connected to the plus and minus 250-volt sources 1415 and 1416, respectively. The potentiometer 1412 is also connected to ground through the 604-ohm resistors 1417 and 1418. The potentiometer 1412 is adjusted so that when there is no error voltage from the summing amplifier 111 there is no net change in current through the resistors 1408 and 1409. For example, as the cathodes of tube 1401 are driven positive and the plate current through tube 1401 decreases, the cathodes of tube 1402 are driven negative by the same amount and the plate current through tube 1402 increases. There is no net change in current through the resistors 1408 and 1409 and hence no net change in voltage at the common plate connection or the output from the modulator 129. When however the error voltage to the left grids of tubes 1401 and 1402 is not zero, as for example, when it is positive, an output indication is provided through the 240-micro-microfarad coupling capacitors 1410 and 1411 through the plates of tubes 1401 and 1402. At the instant of time when the cathodes of tube 1402 are at the maximum positive polarity due to the 5000-cycle input from lead 131 and the cathodes of tube 1402 are at their maximum negative polarity, plate current through the left section of tube 1401 decreases but not by the same amount as when the error voltage was zero. The grid voltage of the right-hand section of tubes 1401 and 1402 has not changed and hence the plate current through the right section of tube 1402 increases by exactly the same amount as when the error voltage was zero. The result is a net increase in current through the resistor 1408 and a consequent lower voltage at the common plate connection to the capacitor 1411. Similarly the left section of tube 1402 and the right section of tube 1401 cause a higher voltage at the common plate connection to the capacitor 1410. The output voltage therefor through the coupling capacitors 1410 and 1411 is a 5000-cycle sine wave, the magnitude of which is dependent upon the error voltage. When the error voltage is negative the reverse voltage conditions exist upon the common plate connections to the capacitors 1410 and 1411. The output phase therefor from modulator 129 is either coincident with the input voltage phase from lead 131 or reversed depending upon the polarity of the error voltage. The use of two triodes 1401 and 1402 provides for a push-pull arrangement which essentially eliminates the second harmonics in the modulator output.

The output from the modulator is connected to a balanced alternating-current amplifier 132 which increases the voltage of the signal to a value suitable for use by the phase detector 135 hereinafter described. The coupling capacitor 1410 is connected to the left grid of the amplifier tube 1420 in the amplifier 132 and to ground through the grid-leak 1-megohm resistor 1421. The coupling capacitor 1411 is connected to the right grid of tube 1420 which is connected to ground through the 1-megohm grid-leak resistor 1422. The cathodes of tubes 1420 are connected through the 1000-ohm resistors 1423 and 1424 and thence through the .3 megohm resistor 1425 to the −250 volt source 1426 and the plates are connected to the +250 volt source 1427 through the .39 megohm plate resistors 1428 and 1429, respectively. The amplified output from the plates of tube 1420 is connected to the cathode follower 133 which comprises a double triode 1430 where each section is essentially a separate cathode follower. The plates of tube 1430 are connected to the +320 volt source 1431 and the cathodes are connected to the −320 volt source 1432 through the .15 megohm cathode resistors 1433 and 1434.

The cathode follower 133 provides for push-pull operation and is interposed for isolation purposes to reduce the load upon the amplifier 132 as the input impedance to the cathode follower 133 is essentially zero. The cathode follower 133 is connected to the rectifier 134 and therethrough also to the phase detector 135. The phase of the amplifier output from the modulator 129 is detected by the phase detector 135, as is hereinafter described, which thereafter conditions circuits in accordance with this determination or detection.

The output from the cathode follower is connected to the primary of transformer 1501 which provides a 2½ to 1 voltage gain in the rectifier 134. The rectifier 134 is a full wave rectifier which supplies a negative direct-current voltage proportional to the input thereto. The secondary of transformer 1501 is center-tapped to ground and the ends are connected to the varistors 1502 and 1503. The varistors 1502 and 1503 which are poled to block positive signals from either side of the secondary of transformer 1501 are connected through the 43,000-ohm resistor 1504 to ground. The alternating current from the secondary of transformer 1501 is in this manner rectified by the varistors 1502 and 1503 to provide a negative direct-current voltage through the filter network consisting of the 43,000-ohm resistor 1505, the 1000-ohm resistor 1506 and the 1200-micro-microfarad capacitor 1507 which is connected between ground and the junction of resistors 1505 and 1506. The rectifier 134 functions therefor to provide a negative direct-current voltage responsive to an alternating-current input of the cathode follower 133. The smooth or filtered direct-current negative potential is connected to the level trigger 137.

The level trigger 137 is a threshold device which is triggered into operation when the error voltage from the rectifier 134 exceeds a predetermined value and returns to the untriggered state when the error becomes less than the predetermined value. The input from the rectifier 134 is proportional as described above to the applied 5000-cycle signal thereto. The filter circuit resistor 1506 described above in rectifier 134 is connected to the left grid of the double triode 1508. Before triggering action commences, the left section of tube 1508 conducts passing approximately 20 milliamperes of plate current. The plate of tube 1508 is connected through the 8000-ohm plate resistor 1509 to the +320 volt potential source 1510 and the left cathode thereof as well as the left cathode of the double triode 1517, hereinafter described, is connected through the 16,000-ohm cathode resistor 1511 to the −320 volt potential source 1512. The output of the left section of tube 1508 is connected through the .11 megohm resistor 1518 and the 25,000-ohm threshold adjusting potentiometer 1516 to the left grid of the double triode 1517 and to source 1512 through the .24 megohm resistor 1524. Before triggering, when the left section of tube 1508 is conducting, the potential upon the left grid of tube 1517 is sufficiently negative to block conduction therethrough. The left plate of tube 1517 is connected through the 82,000-ohm plate resistor 1523 to the right cathode of tube 1508. The right cathode of tube 1508 is also connected to ground through the 20,000-ohm cathode resistor 1513 and the right plate of tube 1508 is connected to the potential source 1510 described above. The right section of tube 1508 provides for a potential of approximately 100 volts upon the left plate of tube 1517. With the left plate of tube 1517 at +100 volts and the potentials upon the left grid and left cathode controlled by the conduction through the left section of tube 1508 as described above, the left section of tube 1517 is non-conductive. Since the plate potential of the left section of tube 1517 is only 100 volts, only a small change in potential upon the left grid is necessary for a change from cut-off to saturation therethrough. The level trigger 137 remains in this condition with the left section of tube 1517 non-conductive as long as the input is less than the predetermined value. The triggering point or potential is determined or controlled by the potentiometer 1516 described above.

When the voltage applied to the left grid of tube 1508 becomes more negative than the predetermined value, the left section of tube 1508 has the current therethrough reduced. The potential upon the left plate of tube 1508 increases causing the less negative potential to be applied to the grid of the left grid of tube 1517 at the same time the common cathode potential of the two left sections decreases. The grid-to-cathode voltage of the left section of tube 1517 in this manner increases toward the conduction region. When the input to the level trigger 137 is more negative than the predetermined value, current begins to flow through the left section of tube 1517. The conduction through the left section with tube 1517 raises the common cathode potential tending to further reduce the conduction through the left section of tube 1508. The further reduction in conduction through tube 1508 further increases its plate potentital and the potential upon the left grid of tube 1517. The operation of the circuit is in this manner accumulative or regenerative so that an input negative potential greater than the predetermined value results in a sudden transition from cut-off to saturation current through the left section of tube 1517. The plate potential of the left section of tube 1517 swings approximately 60 volts when the threshold input voltage corresponding to the predetermined value or one-half quantum is reached. The output from the left section of triode 1517 is connected through the .36 megohm resistor 1519 to the right grid of tube 1517. The resistor 1519 is part of a voltage divider which also comprises the 1.6-megohm resistor 1520. The resistor 1520 is connected to the −320 volt potential source 1522 which is also connected to the right cathode of tube 1517 through the .15 megohm cathode resistor 1521. When the left section of tube 1517 is triggered its plate potential drops approximately 60 volts causing the potential upon the right cathode to change from +2 volts to −40 volts. The right section of tube 1517 is a cathode follower which is used to reduce the circuit impedance from the left section of tube 1517. Once the level trigger 137 is triggered it remains in its new state supplying a −40 volt potential from the right cathode of tube 1517 as long as the negative input voltage from the rectifier 134 remains greater than one-half quantum. When the negative input voltage reduces toward zero and reaches the threshold value the action as described above is reversed with the left section of tube 1508 becoming conductive and the left section of tube 1517 becoming non-conductive.

The right cathode of tube 1517 in the level trigger 137 is connected to the counting gate 205 which is enabled by the triggering action of the level trigger 137 to allow pulses from the program generator 300 to pass therethrough. The connection from the level trigger 137 is to a varistor 1525 which is in turn connected to ground through another varistor 1526. The varistors 1525 and 1526 are poled in their easy current flow or low impedance direction for the +2 volts on the right cathode of tube 1517. The junction of varistors 1525 and 1526 is connected to the varistor 1530 and to the −320 potential source 1528 through the .24 megohm resistor 1527. The varistor or diode 1530 is poled so as to be in its high impedance condition due to the effect of the source 1528 and the +2 volts from the level trigger 137. The junction of the varistors 1525 and 1526 is also connected to the lead 228 which supplies as is hereinafter described the output counting pulses to the reversible binary counter 209. The varistor 1530 is connected to ground through the 1200-ohm resistor 1529 and through the 2700-ohm resistor 1531 to the input lead 206 from the program generator 300. The program generator 300 as is hereinafter described supplies negative count pulses through lead 206 to the digit counter 205. When the level trigger 137 supplies a +2 volt potential to the digit counter 205 the count pulses on lead 206 are blocked from the lead 208 by the varistor 1530. The resistor 1531 however is also connected to the lead 207 to a contact on the slewing relay 210 hereinafter described. With +2 volts therefor from the level trigger 137 the digit counter 205 supplies count pulses to the reversible binary counter 209 only through lead 207. When however the level trigger 137 is triggered to supply −40 volts to the counter 205 the diodes or varistors 1525, 1526 and 1530 reverse their respective impedance conditions and count pulses from lead 206 pass through the varistor 1530 to lead 208. With −40 volts to the input of the counter 205, the left side of the varistor 1530 is negative with respect to the negative count pulses on lead 206. In this manner when the level trigger 137 is triggered, the counter 205 is enabled and supplies count pulses over both leads 207 and 208 to the reversible binary counter 209.

Briefly recapitulating the operations described above in reference to supplying count pulses to the reversible binary counter 209 responsive to an error voltage from the summing amplifier 111, an error voltage upon lead 125 causes the modulator 129 to provide an alternating-current potential to the amplifier 132. The amplified alternating potential is coupled through the isolating cathode follower 133 to the rectifier 134. The rectifier circuit 134 supplies an alternating potential to the phase detector 135 and the negative direct-current potential to the level trigger 137. When the negative potential is greater than one-half a quantum, the level trigger 137 enables the counter 205 which supplies count pulses over lead 208 to the reversible binary counter 209.

Returning now to the operation of thhe phase detector 135 the 5000-cycle sine wave from the rectifier 134 is connected over leads 1532 and 1533 to opposite ends of the diode bridges 1534 and 1535. The phase detector 135 has two inputs; one from the rectifier 134 described above and the other from a cathode follower 140. The cathode follower 140 is exactly the same as the cathode follower 133 and is provided as isolation for the amplifier clipper 141.

The input to the amplifier clipper 141 is the lead 131 described above which supplies a 5000-cycle tone from the program generator 300. The amplifier clipper 141 is essentially an overdriven amplifier which produces a square wave output. The lead 131 is connected through the .24 megohm resistor 1436 to the left grid of tube 1437. The tube 1437 is connected as a self-balancing phase inverter providing a push-pull output. The cathodes of tube 1437 are connected through the .3 megohm resistor 1438 to the −250 volt potential source 1439 and the plates of tube 1437 are connected respectively through the .24 megohm resistors 1440 and 1441 to the +250 volt potential source 1442. The 5000-cycle square wave output from the clipper 141 is coupled through the cathode follower 140 to the primaries of transformers 1536 and 1537 in the phase detector 135. The transformer secondaries are oppositely poled and are connected to opposite ends of the bridges 1534 and 1535. Each arm of the bridges 1534 and 1535 comprises a 20,000-ohm resistor 1540 and one of the varistors 1541 through 1548. A square wave from the secondary of transformers 1536 and 1537 is applied to the upper and lower corners of the bridges 1534 and 1535 to cause the diodes 1541 through 1548 on the right- and left-hand sides to be alternately conducting and non-conducting. When the potential at the top corner of bridge 1534 and the bottom corner of bridge 1535 is positive, the diodes 1541, 1542, 1547 and 1548 are conductive and the diodes 1543, 1544, 1545 and 1546 are non-conductive. In a similar manner if the upper corner of bridge 1534 and the lower corner of bridge 1535 is negative the reference impedance conditions for the diodes 1541 through 1548 exist. The 2000-ohm resistors 1540 are provided in order to mask diode variations in the phase detector varistors or rectifiers 1541 through 1548.

The phase detector compares the phases of the outputs of the rectifier 134 and from the amplifier clipper 141 providing an "add" signal over lead 1550 if they are alike and a "subtract" signal over lead 1551 if they are opposite. The phase of the signal on leads 1532 and 1533 is either in phase with the signal from the clipper 141 or 180 degrees out of phase therewith due to the operation as described above of the modulator 129. When the error voltage to the modulator 129 is positive, the two inputs to the phase detector 135 from clipper 141 and rectifier 134 are similar in phase. With similar phases a plus potential is applied to the right corner of bridges 1534 and 1535 and a negative potential to the left corner thereof. With the upper corner of bridge 1534 and the lower corner of bridge 1535 as described above at a positive potential, the right diodes 1541 and 1542 and the left diodes 1547 and 1548 are conductive. The plus potential from the rectifier 134 raises the operating potential of the bridge 1534 to provide a plus potential to the 3300-ohm resistor 1555 from the center tap of the secondary of transformer 1536. The plus potential over lead 1533 to the right side of bridge 1535 is ineffective as the diodes 1545 and 1546 are non-conductive at this time. The negative potential over lead 1532 to the left side of bridge 1534 is similarly not effective but is effective as applied to the left side of the bridge 1535 to provide a negative potential from the center tap of the secondary of transformer 1537 through the 3300-ohm resistor 1554. The resistors 1554 and 1555 are connected to ground through the varistors 1558 and 1557 which are shunted respectively by the 3300-micro-microfarad capacitors 1559 and 1556. The capacitors are poled to shunt to ground a positive potential or signal from the center tap of the secondaries of transformers 1536 and 1537. The resistor 1554 is also connected to the lead 1551, to the cathode follower 142, and the resistor 1555 is connected through the lead 1550 to the cathode follower 142. Due to the effect of the varistors 1557 and 1558 the lead 1550 is at zero potential at this time and the lead 1551 is at a negative potential.

The sequence of events described above in the phase detector 135 occur during the first half cycle of the two inputs which are similar in phase as well as frequency. During the second half cycle the lower corner of bridge 1534 and the upper corner of bridge 1535 are positive and the lead 1532 from the rectifier 134 is positive. Under these conditions the diodes 1543, 1544, 1545 and 1546 are conductive and the diodes 1541, 1542, 1547 and 1548 are non-conductive. A negative potential from lead 1533 at the right corner of bridge 1535 is effective to provide a negative potential upon lead 1551. A positive potential on lead 1532 is shunted from the varistor 1557 to ground. In this manner when the phase of the two inputs from the rectifier 134 and limiter 141 are alike a negative potential appears throughout both half cycles upon lead 1551 and a zero potential upon lead 1550. The capacitors 1556 and 1559 tend to maintain these potentials constant.

When the two input phases are not similar which occurs when there is a negative error voltage from the summing amplifier 111 the reverse conditions occur with the lead 1550 becoming negative and the lead 1551 being at ground potential.

The leads 1550 and 1551 are connected to the cathode-follower circuit 142 which is similar to the cathode-follower circuit 133 except that the plates are connected to lead 145 instead of to a positive potential source such as 1431. The lead 145 is connected to the right cathode of the double triode 1508 in the trigger circuit 137. The right cathode of tube 1508 is at a constant positive potential determined by the sources 1510 and 1512, the resistor 1513 and the drop across tube 1508.

The cathode follower 142 is connected to an add-subtract flip-flop circuit 143. The flip-flop circuit 143 provides a steady direct-current "add" or "subtract" control voltage to the reversible binary counter 209 hereinafter described responsive to the input thereto which varies with the error voltage from amplifier 111.

The isolation or impedance transformation cathode follower 142 is connected to the terminals 4 and 7 of the flip-flop circuit 143 which are in turn connected through the varistors 1560 and 1561 to the control grids of triodes 1562 and 1563, respectively. The triodes 1562 and 1563 may be sections of a double triode instead of separate triodes. The control grid of tutbe 1563 is connected through the 30-micro-microfarad capacitor 1575 to the plate of triode 1562 and the control grid of triode 1562 is connected through the 30-micro-microfarad capacitor 1576 to the plate of triode 1563. This connection provides, as is hereinafter described, for the well-known flip-flop operation with only one of the two triodes 1562 and 1563 conducting when the circuit is stable. The plates of triodes 1562 and 1563 are connected through the 68,000-ohm resistors 1564 and 1565 to the +320 volt potential source 1566 and the cathodes thereof are connected to ground. The plates of triodes 1562 and 1563 are also connected through the .8-megohm resistors 1573 and 1572 and the .62-megohm resistors 1570 and 1569, respectively, to the −320 volt potential source 1571. The junction of resistors 1573 and 1570 is connected through the 10,000-ohm resistor 1568 to the control grid of tube 1563 and the junction of resistors 1572 and 1569 is connected through the 10,000-ohm resistor 1567 to the control grid of tube 1562. The junction of resistors 1573 and 1570 is also connected to the output terminal 6 and the junction of the resistors 1572 and 1569 is also connected to the output terminal 12. Three other terminals 3, 1 and 10 are provided but are not utilized in the flip-flop circuit 143. The same circuit components as shown in the flip-flop circuit 143 are utilized in the reversible binary counter 209 hereinafter described wherein utilization is made of the terminals 3, 1 and 10. The terminal 3 is connected through the varistors 1581 and 1582 and the 22-micro-microfarad capacitors 1578 and 1577, respectively, to the plates of tubes 1562 and 1563. The varistors 1581 and 1582 are connected to ground through the varistors 1584 and 1583 and to the terminals 10 and 1 through the varistors 1587 and 1588. The varistors 1587 and 1588 are connected to the source 1566 through the .16-megohm resistors 1579 and 1580 and to the source 1571 through the .24-megohm resistors 1585 and 1586.

Before the signal is received from the cathode follower 142 either the tube 1563 or 1562 is conducting. If the tube 1563 is conducting, negative pulses through terminal 7 through the cathode follower 142 passes through the varistor 1561 which is poled to block a positive potential to the control grid of tube 1563. When the tube 1563 is conductive the potential at its plate is +20 volts and the potential at the plate of the tube 1562 is a +220 volts due to the arrangement of the various circuit components described above. The tube 1563 has the conduction therethrough reduced by the negative potential at its control grid and its plate potential therefore increased so that the grid potential of tube 1562 is increased. In this manner as tube 1563 stops conducting, tube 1562 commences, resulting in the characteristic flip-flop operation. The potential upon the plate of tube 1563 increases in this manner to +220 volts and the potential upon the plate of tube 1562 decreases to +20 volts. As described above the plates of tubes 1562 and 1563 are connected through the resistors 1573 and 1572, respectively, to the terminals 6 and 12. The potential upon terminal 6 therefore is relatively low or negative and the potential upon terminal 12 is relatively high or positive.

If the tube 1562 instead of the tube 1563 was conducting before the application of the negative potential at terminal 7, the flip-flop circuit 143 will remain undisturbed with the negative potential upon terminal 6 and a positive potential at terminal 12. The function of the terminals 3, 10 and 1 and their associated circuit components will be hereinafter described in reference to the reversible binary counter 209. The terminals 6 and 12 are connected to the impedance transformation cathode follower 144 which is similar to the cathode follower 142. The cathode follower 144 is connected through leads 211 and 212 to the reversible binary counter 209 and provides an add or subtract indication thereto. When the phases of the two inputs to the phase detector 135 are similar and a negative potential is applied at terminal 17 of the flip-flop circuit 143, a positive potential is applied upon lead 211 and a negative potential upon lead 212. When the two inputs to the phase detector differ in phase the potential conditions are reversed. The potential conditions upon leads 211 and 212 steer the reversible binary counter 209 to add the pulses from the counter 205 described above when the phases are similar, or subtract when the phases differ.

The leads 211 and 212 from the cathode follower 144 are connected to the terminals 1 and 10, respectively, of the thirteen reversible counter units 214. As described above the leads 211 and 212 supply either a −30 volt potential or a +2.5 volt potential depending upon whether the pulses from the counter 205 are to be added or subtracted. The reversible binary counter 209 consists of thirteen flip-flop or reversible binary counter units 214 with one corresponding to each digit of a thirteen-digit binary number. The flip-flop units 214 are interconnected as is hereinafter described so that each unit or stage 214 can activate the next. The count pulses, also as described above, are connected to the reversible binary counter 209 by lead 208 from the counting gate 205. Each pulse sent over lead 208 to the first unit 214 causes it to change its state either from "1" to "0" or from "0" to "1." When the reversible binary counter 209 is set to add, each change from "1" to "0" in the first unit 214 provides a pulse to the second unit 214 causing it to change its state. The operation of counter 209 proceeds in this manner with each unit 214 controlling the next unit 214. A change from "0" to "1" does not provide a pulse to the next unit 214. Thus each successive stage 214 changes state less frequently by a factor of two. When the reversible binary counter 209 is set to subtract, it is a change from "0" to "1" which causes a pulse to be provided to the next stage 214. The use of binary numbers is described above in reference to the functional description of FIGS. 1 through 7 when arranged in accordance with FIG. 8.

In order to add or subtract it is only necessary to change the rules for transmitting pulses between stages 214. To add, a pulse is transmitted between stages 214 when a stage changes from its "1" to "0" condition and to subtract, a pulse is transmitted from a stage 214 when it changes from its "0" to "1" condition. Each stage or unit 214 comprises a flip-flop circuit indentically similar to the flip-flop circuit 143 described above with the various components being designated by numbers in the 1900's instead of the 1500's. The negative pulses from the counter 205 are connected to the terminals 4 and 7 of the first stage 214. These negative pulses are connected through varistors 1960 and 1961 to the grids of tubes 1962 and 1963. The negative pulses cause the conductive of the tubes 1962 and 1963 to become non-conductive, and the non-conductive to become conductive. If the tube 1963 was conducting the potential at its plate now increases providing a positive pulse to the grid of tube 1962 overriding the negative pulse through the varistor 1960. The capacitors 1976 and 1977 provide for storage or a delay so that the positive pulse from the plate of tube 1963 is impressed upon the grid of tube 1962 for a longer duration of time than the duration of the negative pulse at the terminals 4 and 7. In this manner the units 214 change condition or provide for flip-flop operation every time a negative pulse is impressed upon their respective terminals 4 and 7. When the plate of one of the tubes 1962 or 1963 steps from +220 volts to +20 volts a sharp negative step function is provided. The step is differentiated by the capacitor 1978 or 1977 to produce a sharp negative pulse to the terminal 3 which is connected to the terminals 4 and 7 in the next stage 214. The sharp negative pulse from the plates of tubes 1962 and 1963 must pass through the varistors 1981 or 1982 to the terminal 3. The determination of which plate will be effective to provide its negative pulse through the terminal 3 is determined by the potentials upon leads 211 and 212. All positive pulses from the plates of tubes 1962 and 1963 are suppressed by the varistors 1983 and 1984 which couple the pulses to ground. The junction of capacitor 1978 and varistor 1981 and capacitor 1977 and varistor 1982 therefore cannot become positive. The varistors 1981 and 1982 isolate the plates of the tubes 1962 and 1963 to prevent pulses from backing out of one when generated in the other. The control adding or subtracting signal is provided to the terminals 10 and 1 as described above from leads 212 and 211. If the control signal is to add, lead 211 is at −30 volts so that varistor 1988 is effectively an open circuit. Varistor 1987, however, provides a low impedance path to the +2.5 volts at terminal 10 from lead 212. The negative pulse from the plate of tube 1962 is therefore short-circuited through the varistor 1987 and does not provide an output through the terminal 3. Reversing the potential upon the terminals 10 and 1 causes the negative pulse from the plate of tube 1563 to be short-circuited away from terminal 3 to pass through the varistor 1988. In this manner either the plate of tube 1962 or of tube 1963 is effective depending upon the potentials at terminals 10 and 1. The terminals 6 and 12 still provide either +6 volts or −45 volts depending upon which tube 1962 or 1963 is conductive. These terminals are connected as it hereinafter described to provide for subsequent control operations. Terminal 12 is at approximately +6 volts when the digit registered in a unit 214 is "0" and at approximately −45 volts when the digit registered is "1." The +6 volts are provided at terminal 12 when the left tube such as 1962 is conductive.

The counting pulses from counting gate 205 are supplied to the reversible binary counter 209 at a rate of 75 per second which represents the rate at which the counter 209 counts. Normally this counting rate is sufficient to provide for a correcting potential from the relay-operated voltage divider 201, hereinafter described. When, however, a new target is being acquired a more rapid counting procedure is necessary. To provide for a more rapid count when a new target is being acquired a slewing relay 210 is interposed between the seventh and eighth stage 214 of the counter 209. When the relay 210 is operated the counting pulses from the counting gate 205 are connected through lead 207 and the make contact of relay 210 to terminals 4 and 7 of the eighth stage 214 as well as to the first stage 214. The first seven stages are in this manner by-passed to cause the reversible binary counter 209 to count in step ($2^7$) 128 times as large as normal.

The relay 210 is operated by a direct-current slewing amplifier 215 which is connected thereto by lead 222. The amplifier 215 is connected to the output lead 125 from the amplifier section 109 described above through the switch 128 also described above. When the error voltage from the section 109 becomes sufficiently large, the amplifier 215 operates the slewing relay 210 to cause the large-step-counting of the reversible binary counter 209.

The amplifier 215 comprises two double triodes 1450 and 1451 with a feedback connection from the left or output plate of tube 1451 to the right grid of tube 1450 through the .12-megohm feedback resistor 1452. The left grid of tube 1450 is connected to the switch 128 through .1-megohm resistor 1453 which prevents the slewing amplifier 215 from overloading the summing amplifier 111 if large positive error voltages cause tube 1450 to saturate. The left and right anodes of tube 1450 are connected through the .39 and .1-megohm plate resistors 1454 and 1455, respectively, to the +320 volt source 1456. The cathodes of tubes 1450 and 1451 are connected respectively to the −320 volt source 1459 through the .12-megohm cathode resistors 1457 and 1458. The right grid of tube 1450 is connected to ground through the 30,000-ohm resistor 1463 and the output or left plate of tube 1450 is connected through the 1.6 megohm resistor 1460 to the right grid of tube 1451 and to the source 1459 through the 1.1-megohm grid resistor 1461.

A positive error potential causes the left section of tube 1450 to pass more plate current and decrease its anode potential. The decrease of anode potential reduces the current through the left section of tube 1451. The reduction of plate current in the left section of tube 1451 causes the output potential from the left plate thereof to increase. The feedback connection to the right grid of tube 1450 increases the conduction through the right section of tube 1450 increasing thereby the cathode potential and inhibiting the increase of plate current through the left section of tube 1450. The right grid of tube 1451 is connected to a relay balanced 25,000-ohm potentiometer 1464 which is connected between ground and source 1459 by the .1-megohm resistors 1465 and 1466, respectively. The conduction through the right section of tube 1451 is controlled in this manner by the setting of potentiometer 1464 and, due to the common cathode resistor, the conduction through the left section of tube 1451. The output from the left plate of tube 1451 which is connected to source 1456 through the 25,000-ohm resistor 1462 is dependent therefore upon the error voltage from the summing amplifier 111 and the setting of potentiometer 1464.

When the error voltage to amplifier 215 is negative the potential conditions described above are reversed and a negative potential appears at the left plate of tube 1451. For small values of error voltage the output plate of tube 1451 is at or near ground potential so that substantially no voltage appears across the winding of relay 210. For large values of error signal, a positive or negative potential appears on the output plate providing a potential difference across relay 210. When the potential difference is sufficient, relay 210 operates to transfer the counting pulses to the eighth stage 214 as described above. The relay balance potentiometer 1464 is adjusted to provide for ground potential upon the output plate of tube 1451 when the error voltage to the amplifier 215 is zero. After balancing, relay 210 operates on a particular magnitude of error voltage whether positive or negative.

The counter units 214 described above are connected to the amplifier and cathode-follower double triodes 217. The grids of the first twelve tubes 217 are connected to terminal 12 of the first twelve units 214, respectively, and the grids of the thirteenth tube 217 are connected to the terminals 12 and 6 of the thirteenth unit 214. The left section of each tube 217 is an amplifier section and provides a coupling between the stages 214 and the relay-operated voltage divider 201 briefly described above and hereinafter described in detail. The left control grid of the first twelve tubes 217 is connected through an associated .22-megohm resistor 1610 to the terminal 12 of the associated stage 214. The potential at a terminal 12, as described above, is either +6 volts or −45 volts in accordance with the registration in the stage 214 of a "0" or "1" digit, respectively. The left control grid of the thirteenth tube 217 is connected to the terminal 6 of the thirteenth stage 214 through the .22-megohm resistor 1610 instead of to the terminal 12. The terminal 6 is at +6 volts when a "1" digit is registered in a stage 214.

The left cathodes of the thirteen tubes 217 are connected to ground and the left plates are connected to the winding of relays 222 in the relay-operated voltage divider 210. The relays 222 are also connected to the +320 volt sources 1619 through the 47,000-ohm resistors 1620.

The relays 222 operate when the left section of tubes 217 are cut off or are non-conductive, which condition provides for a potential difference across the relays 222. The operation of the relays 222 provide, as is hereinafter described, an analog potential in accordance with the registration of the reversible binary counter 209. This potential was referred to above as the neutralizing or bucking potential being equal in magnitude to the sum of the target position potential and velocity potential but opposite in sign or phase, when the error voltage is zero. If the neutralizing potential is not equal to the sum of the position and velocity potentials an error voltage is provided by the amplifier section 109 which changes the registration in the reversible binary counter 209 to correct the neutralizing position. As the position and velocity potentials change when a target is being tracked the registration in the counter 209 is in this manner adjusted to provide for the registration of a number in binary representation which indicated the predicted target position.

With a registration of thirteen digits in the reversible binary counter 209 the largest possible number is less than the thirteenth power of 2, or 8192−1=8191. The total range of input voltages can be divided into 8192 steps, counting zero as one step. When the source of target data is an antiaircraft fire control system providing target voltages from +100 to −100 volts, each 25 millivolts represents 10 yards or a total range of 80,000 yards with −100 volts being zero range.

There are essentially three operations that are performed with the binary number stored in the reversible binary counter 209. These operations are: (1) convert the binary number back into a direct-current voltage in the relay-operated voltage divider 201 in order to provide a net input to the amplifier section 109 as briefly described above; (2) add the parallax correction number; and (3) transmit the resultant information in the form of spurts of tone.

The relay-operated voltage divider 201 translates the binary number stored in the reversible binary counter 209 into a direct-current voltage. The voltage divider 201 contains a relay 222 for each of the thirteen digits with each relay 222 being operated or unoperated depending on the state of its associated counter unit 214. In general, a network 202 of very precise resistors together with a precise reference voltage source 223 is so switched by the relays 222 as to provide a resultant potential output from the network 202 which corresponds to the binary number. The least significant digit which is the digit stored in the first counter unit 214 contributes a very small amount to the output from the voltage divider 201, with the next digit contributing twice as much, etc. If the target voltage ranges from zero to some maximum value each relay 202 in succession would contribute twice as much as the preceding relay. The target input voltage, however, actually ranges from a positive potential of 100 volts to a negative potential of −100 volts. The last relay or the thirteenth relay 222 has a somewhat different effect as is hereinafter described to provide for this range. The thirteen direct-current amplifiers which comprised the left sections of the double triodes 217 furnish the necessary power for operating the relays 222.

The function as described above of the relay-operated voltage divider 201 is to produce a voltage precisely corresponding in magnitude to a binary number of thirteen digits which is stored in the reversible binary counter 209. Actually the voltage divider 201 produces a current and not a voltage, but it is convenient to think of the encoding and decoding operations also as described above in terms of voltages. The operation of a respective relay 222 grounds the junction point of a T network which comprises for the first ten relays the 2.5-megohm resistors 1624 and 1625 and a graduated series of resistors 1630 which are hereinafter described. Precisely equal voltages from the reference source 223 of 250 volts, one positive and one negative, are connected to the network 202. The negative potential is connected to the resistor 1624. The voltages from the source 223 are fractionated by the series of T networks which are essentially connected thereacross in parallel. The shunt arm which consists of the graduated resistor 1630 in each T network can be shorted to ground by means of the contacts of the associated relay 222. The resistors 1630 are graduated in value from approximately 600 ohms for the first digit, 1200 ohms for the second digit, 2400 ohms for the third digit, etc. through the tenth digit. Due to the graduated resistor 1630 each of the ten digits contributes twice the amount of current to the output as the next lower one. In the case of the eleventh digit the resistor 1624 is 5 megohms, the resistor 1625 is 1.6666 megohms and the resistor 1630 is 2.5 megohms. In the case of the twelfth digit, resistor 1624 is 4.25 megohms, resistor 1625 is .75 megohm and the resistor 1630 is an open circuit. The following is a list of the exact values of the resistor 1630: 1=610; 2=1222; 3=2446; 4=4902; 5=9843; 6=19841; 7=40323; 8=83333; 9=178571; 10=416666; 11=2½ megohms; 12=open circuit; and 13=open circuit. A trimming resistance, not shown, may be utilized for each of the varistors 1630 to adjust it to the required value. The first twelve T networks supply a negative potential or current to the output lead 110. The junction of each T network when the associated relay 222 is not operated is at a negative potential. When the respective relay 222 is operated the junction point is grounded and no current is supplied through the associated resistor 1625 to the output lead 110. The thirteenth T network comprises the resistors 1626 and 1627 of 2.1 and .4 megohms, respectively. The resistor 1626 is connected to the +250 volt terminal of the source 223 so that the thirteenth digit supplies a positive potential or current to the output lead 110 when its associated relay 222 is not operated. The positive current contributed by the thirteenth digit is of a magnitude twice that contributed by the twelfth digit.

The operation of these networks and how they cooperate to produce a continuous graduation of output from maximum positive to maximum negative current is illustrated in the following table:

| Current Output (Microamperes) | Units 214 | | | | | | | Relays 222 | | | | | | |
|---|---|---|---|---|---|---|---|---|---|---|---|---|---|---|
| | 1 | 2 | 3 | ---- | 11 | 12 | 13 | 1 | 2 | 3 | ---- | 11 | 12 | 13 |
| +100.000 | 0 | 0 | 0 | | 0 | 0 | 0 | C | C | C | | C | C | O |
| +99.975 | 1 | 0 | 0 | | 0 | 0 | 0 | O | C | C | | C | C | O |
| +0.025 | 1 | 1 | 1 | | 1 | 1 | 0 | O | O | O | | O | O | O |
| 0.000 | 0 | 0 | 0 | | 0 | 0 | 1 | C | C | C | | C | C | C |
| −0.025 | 1 | 0 | 0 | | 0 | 0 | 1 | O | C | C | | C | C | C |
| −99.975 | 1 | 1 | 1 | | 1 | 1 | 1 | O | O | O | | O | O | C |

The first column entitled "Current Output" provides the current in microamperes which is supplied from the T networks to the lead 110. The columns headed "Units 214" illustrate the condition "0" or "1" of the counter units 214 and the columns headed "Relays 222" illustrate the condition of the relays 222 with a "O" indicating open contacts and a "C" indicating closed contacts. The least significant digit is at the left as in the circuit arrangement of the counter 209. Each relay 222 as described above is operated from its associated reversible binary counter unit 214 according to the digit stored therein at the given moment. The connections are such that a "1" stored in any of the first twelve digits causes the corresponding relay 222 to remain unoperated or open while a "0" causes the relay 222 to be operated or closed. In the case of the thirteenth digit this convention is reversed due to the reversed connections from the terminals 12 and 6 in the thirteenth unit 214. For the binary number consisting of thirteen 0's the first twelve relays 222 are all closed contributing no current to the output from the voltage divider 201 but the thirteenth relay 222 is open and contributes 100 microamperes of positive current. For a binary number consisting of twelve "0's" and a "1" with a "1" in the least significant place, the first relay 222 is open providing a small negative current of .025 microampere which diminishes the positive output of +99.975 microamperes. For the next step which is not illustrated in the table, the second relay 222 is open and the first relay 222 is closed which further diminishes the positive output. This procedure is progressively repeated until almost all of the positive current is neutralized by the negative current. With the thirteen relays 222 open providing for a binary number consisting of twelve digits "1" an output of +.025 microampere is provided. The next step to achieve a zero output is to close all the relays 222 and short out both the positive and negative terminals of the source 223. Thereafter the thirteenth relay 222 remains closed and the other twelve relays 222 are progressively open causing the output to be progressively increased in a negative direction until the maximum of −99.975 microamperes is achieved when all the first twelve relays 222 are open.

The independent effect of each separate T network in network 202 and the prevention of their reaction upon one another is due to the substantial zero impedance of the source of reference voltage 223 and the summing amplifier 111 which is described above. The output current from the relay voltage divider 201 in microamperes is the current that results from a voltage of the same numerical magnitude acting through a resistance of 1 megohm.

The relay-operated voltage divider 201 is a sealed unit approximately 15 by 3 by 5 inches in size. Due to the precision required, the various resistors utilized are carbon-deposited glass-sealed resistors which are precise as to value and temperature coefficient. These resistors are selected only for low temperature coefficients but they are matched so that all resistors in the same voltage divider 201 have substantially the same coefficient. All the critical resistors are mounted in close contact with a copper mounting plate, not shown, to maintain them at the same temperature. The summing resistors 1602 and 1603 and the feedback resistor 1604 are also mounted in the same package.

For the proper dynamic operation of the system it is essential that the operate time and release time of the relay-operated voltage divider relays 222 be substantially the same. This requirement comes from the fact that the summing amplifier 111 will overload unless the voltage increments applied to the input are small. There are transitions in the binary sequence where a one-quantum change in the binary number causes many of the relays 222 to change state. Since without corrective measures the release time of the relays 222 is much shorter than the operate time, a large transient voltage would be applied to the summing amplifier input 110 for relatively long intervals of time, causing the amplifier 111 to overload. Because of the long recovery time required by the amplifier 111, this overloading condition must be prevented. Therefore, a 24,000-ohm resistor 1621 in series with a diode 1622 is connected across the winding of each relay 222. This causes the current in the winding to have a definite discharge time when the left section of tube 217 cuts off, and thus the release time is increased to make it equal to the operate time. When the left section of a tube 217 conducts and the associated relay 222 operates, the diode 1622 is biased in a high impedance condition, and hence the resistor 1621 and diode 1622 across the relay 222 have little effect on the operate time.

The terminals 12 of the first twelve units 214, as described above, are connected to both grids of the tubes 217. The left sections of tubes 217 are as described above an amplifying coupling to the relay-operated voltage divider 201. The right sections of tubes 217 are cathode-follower sections which provide low impedance output paths from the counter 209 to the read-out gates 401, 402 and 403 hereinafter described. Neon indicating lamps 1633 are connected across each of the right sections of tubes 217, from plate to cathode, to provide a visual indication of the binary number being supplied to the shift register 405 hereinafter described. The right cathodes of tubes 217 are connected to the −320 volt sources 1613 through the .33-megohm cathode resistors 1612 and to ground through the .1-megohm resistors 1635. The lamps 1633 are connected through the .1-megohm resistor 1636 and the right anodes directly to the cathodes of the double triodes 1637. When the terminals 12 of the thirteen units 214 are positive, the associated right sections of tubes 217 become conductive and reduce the potential across the lamps 1633 causing them to extinguish. The lamps 1633 are lit therefor when a "1" digit is stored or registered in the associated unit 214.

The tube 1637 is the plate supply tube for the right sections of tubes 217. The plates of tube 1637 are connected to the +320 volt source 1639 and the grids to the +320 volt source 1640 through 1000-ohm resistors 1641 and 1642 and the .51-megohm resistor 1643. The resistor 1643 is also connected to ground through the 91,000-ohm grid leak resistor 1644. The cathodes of tube 1637, which are connected to ground through the 51,000-ohm cathode resistor 1645, supply approximately +50 volts to the right plates of tubes 217.

The thirteen cathode-follower sections of tubes 217 provide transmission paths for the thirteen binary digits stored in the units 214. The right cathodes of the tubes 217 are connected to the gating circuit 401 by the thirteen leads 1660 to provide an indication thereto of the sixteen binary digits registered in the counter 209.

The thirteen leads 1660 are in this manner at a potential determined by the conductive condition of the cathode-follower sections of tubes 217. When one of these cathode-follower sections is conductive due to the registration of the "0" in one of the units 214, its cathode and the associated one of the leads 1660 is at a potential of +9 volts. The non-conduction of one of the cathode followers causes the potential on its associated leads 1660 to be at approximately −37 volts.

The leads 1660 are essentially the output leads from the encoding circuit 117 which comprises the amplifier section 109, the error detector 130, the counting gate 205, amplifier 215, the reversible binary counter 209 and the relay-operated voltage divider 201 all described above. The encoders 118 and 119 comprise essentially similar components and provide a similar output to the thirteen leads 1903 and 1904 which are also connected to the read-out gates 401 through 403. Three sets of binary digits are in this manner presented through the leads 1660, 1903 and 1904 to the read-out gates 401 through 403 which connect them to the shift register 405 hereinafter described.

Each read-out gate 401 through 403 provides an indication to the shift register 405 in accordance with the information from one of the encoders 117, 118 and 119. The shift register 405 comprises sixteen units 406, thirteen for the digits from the encoders 117, 118 and 119 and three additional. Each read-out gate 401, 402 and 403 comprises thirteen gating circuits which are associated individually with the first thirteen units 406 in the shift register 405. The first lead 1660, for example, which is designated by a "1," is connected through the first such gating circuit to the first unit 406. Each of the thirteen gating circuits in each of the read-out gates 401, 402 and 403 comprises the diodes or varistors 2441 and 2442 poled toward each other. The diodes 2441 and 2442 in the first gate circuit of read-out 401 connect the first or "1" lead 1660 with a terminal 4 of the first shift register unit 406. The junctions of the two varistors 2441 and 2442 are connected through a 5600-ohm varistor 2443 to the X, Y and Z coordinate read-out leads 2444, 2445 and 2446 from the program generator 300 shown in FIGS. 21 through 23 and hereinafter described.

At appropriate times, as is hereinafter described, signals called read-out pulses are sent through leads 2444, 2445 and 2446 from the program generator 300 to enable the gating circuits in the read-out gates 401, 402 and 403 depending upon the potential condition of the output leads 1660, 1903 and 1904 from the encoders 117, 118 and 119. For example, if the first output lead 1660 is at a potential of +9 volts the negative read-out pulse of approximately 30 volts through lead 2444 is shunted through a varistor 2441 and its low impedance path away from the relatively high impedance path of the varistor 2442 and the first shift register unit 406. A —37 volt potential upon the first lead 1660 disables or increases the impedance of the varistor 2441 so that the negative pulse from lead 2444 is not short-circuited therethrough but enters the first unit 406 through the varistor 2442. In this manner the varistors 2441 are selectively conditioned by the output potentials from the encoders 117, 118 and 119 in accordance with the binary numbers stored in the reversible binary counter 209. There is only one shift register 405 so that the information from the encoders 117, 118 and 119 cannot be read simultaneously. The read-out pulses through leads 2444, 2445 and 2446 are spaced so as to provide a sufficient interval for registration of the information from one of the encoders 117, 118 or 119 and also for clearing the information from the shift register 405. For example, the read-out pulse through lead 2444 enters the information to the shift register 405. The shift register 405 functions in a manner hereinafter described to clear the information to the serial adder 407. When the shift register 405 is cleared the pulse through lead 2445 is supplied to enter the information from the encoder 118. This read-out procedure continues so that the information from the encoders 117, 118 and 119 is successively entered to the shift register 405.

When digital parallax corrections, described above, are used the parallax digits for each coordinate are set up on sixteen parallax keys 414, one for each digit. A key 414 is moved up to indicate a "1" digit and down to indicate a "0" digit. These sixteen settings for each coordinate in circuits 409, 410 and 411 correct the geographical location and the altitude of the transmitter. The keys 414 are connected through the varistors 415 to the read-out leads 2444, 2445 and 2446. Leads 2444 through 2446 provides read-out pulses from the program generator 300 in a similar manner as provided to the read-out gates 401 through 403, described above. The digital information in the key circuits 409, 410 or 411 as provided by the settings of keys 414 is transmitted into the parallax shift register 412 which is similar to the shift register 405 described above having sixteen units 426 which correspond to the sixteen units 406 in register 405. The sixteenth register unit 426 in register 412 is shown in detail with each component designated with the number in the 2700's instead of in the 2400's as in the first unit 406 in register 405. Keys 414 in this manner perform the same function that read-out gates 401 through 403 do for the coordinate data. The coordinate and the parallax information consisting of a series of "1's" and "0's" is successively transmitted or pulses from the shift registers 405 and 412 and simultaneously applied to the serial adder 407 where they are combined.

The shift registers 405 and 412 are aggregates of flip-flop units 406 and 426, as described above, with one unit 406 or 426 for each digit. Each unit 406 or 426 has the ability to store the information concerning a digit and then, upon the occurrence of certain pulses, hereinafter described, to shift the information into the next unit 406 or 426 with the information in the last unit 406 or 426 being released for transmission. In the course of this clearing procedure, one end of the shift register 405 or 412 is cleared, one digit at a time, and the other end of the register 405 or 412 transmits the digits one at a time. Each shift register unit 406 or 426 comprises the four terminals 3, 10, 6 and 7 which are all direct-current coupled to the grids of tubes 2406 and 2408. The terminals 3 and 10 are connected to the terminals 6 and 7, respectively, of the previous unit 406 or 426 so that information can pass from one unit 406 or 426 to the next. Terminals 4 and 9 are input terminals and are utilized when information is spilled into all the units 406 or 426 simultaneously as from the read-out gates 401 through 403 or circuits 409 through 411. The read-out gates 401 through 403, described above, are connected to the terminals 4 of the units 406, and the circuits 409 through 411 are connected to the terminals 4 and 9 of units 426.

Each of the terminals 4, 10, 3, 9, 6 and 7 is connected through varistors to the remainder of the circuitry in the unit 406 or 426. For the inputs 4, 10, 3, 9, 7 and 6 of a unit 426 these varistors are respectively the varistors 2727, 2734, 2735, 2739, 2724 and 2730. These varistors are all included for isolation purposes. The tubes 2706 and 2708 in unit 426 are interconnected by the 47-micromicrofarad capacitors 2707 and 2709 to provide for a flip-flop operation well known in the art. The plates of tubes 2706 through 2708 are connected respectively through the 62,000-ohm plate resistors 2702 through 2704 to the +320 potential source 2701. The cathodes of tubes 2706 and 2708 are connected directly to ground. The resistors 2702 and 2704 are connected through the 56,000-ohm resistors 2703 and 2705, respectively, and the .13-megohm resistors 2713 and 2715 to the —320 volt potential source 2714. The junction of resistors 2705 and 2715 is connected to the grid of tube 2706 through the 20,000-ohm resistor 2710 and the junction of resistors 2703 and 2713 is connected to the grid of tube 2708 through the 20,000-ohm resistor 2711. An output is provided at terminals 6 and 7 for the purpose of shifting information contained in the unit 426 to the succeeding unit under control of the shift pulse which is applied at terminal 13. Terminal 13 is connected to two gating circuits; one comprising varistors 2724 and 2728 and the other comprising varistors 2729 and 2730. The operation of these gates controls the outputs through terminals 6 and 7. When no pulse is entered to terminal 13, the junction of varistors 2728 and 2729 is at ground potential. The varistor 2728 is connected to the source 2714 through the .27-megohm resistor 2718 so that the junction of varistor 2728 and resistor 2719 is also at ground potential. Varistor 2724 is connected to the plate of tube 2708 through the 12,000-ohm resistor 2721 and the 56,000-ohm resistor 2705. The potential across the varistor 2724 is, therefore, dependent upon the conduction through the tube 2708. When the tube 2708 is not conductive, potential at the junction of varistor 2724 and resistor 2721 is +2.5 volts.

Varistor 2724 is poled so as to be in its low impedance condition with 2.5 volts at this junction. Terminal 13 is connected to terminal 7 through varistor 2728 and to the terminal 6 through the varistor 2729. When the varistor 2724 is in its low impedance condition, the —40 volt pulse through terminal 13 is short-circuited or shunted away from terminal 7 and through varistor 2724. When the varistor 2724 is in its low impedance condition, the varistor 2730 is in its high impedance condition.

The varistor 2730 is connected to the plate of tube 2706 through the 12,000-ohm resistor 2711 and the 56,-

000-ohm resistor 2703, described above. When tube 2708 is non-conducting, as described above, tube 2706 is conductive providing for a —29 volt potential at the junction of varistor 2730 and resistor 2711. In this manner, when varistor 2724 is in its low impedance condition, varistor 2730 is in its high impedance condition. The negative pulse from terminal 13 through varistor 2729 is not shunted or short-circuited through the high impedance varistor 2730 so that a negative pulse is provided to terminal 6. When a negative pulse is entered to terminal 13, an output indication is, therefore, provided either through terminal 6 or terminal 7 dependent upon the conductive conditions of the tubes 2706 and 2708. An output indication through terminal 6 is responsive to a registration of the "0" digit and an indication through terminal 7 would be responsive to the registration of a "1."

The junction of varistor 2724 and resistor 2721 is connected to ground through the 430-micro-microfarad capacitor 2725 and the junction of varistor 2730 and resistor 2711 through the 430-micro-microfarad capacitor 2720. The purpose of the capacitors 2725 and 2720 is to store the +2.5 volts or —29 volts from the respective grid of tubes 2708 and 2706 for a short interval after the tubes have changed their conductive states. Even if the tubes 2706 and 2708 may be changing state, the gates, as described above, remain in the condition established prior to the changing state long enough for the negative pulse applied at terminal 13 to be transmitted through the enabled gate to the next stage or the unit 426. The flip-flop portion of the units 426 or the portion comprising the tubes 2706 and 2708 can, in this manner, receive new information from the preceding stage 426 while the old information is imported to the following stage 426. In fact, the stage or unit 426 can have the information registered therein changed at any time and no pulse will emerge from either terminal 6 or 7 until a shift pulse is applied at terminal 13 to read out the present state as stored by the capacitors 2725 and 2720.

The sequence of operations in the shift registers 405 and 412 commences with each of the units 406 and 426 having registered a "0" digit. The tubes 2406 and 2706 are conductive so that the gates comprising the diodes 2429 and 2430 or 2729 and 2730 are enabled when a "0" is registered. The read-out pulse through one of the leads 2444, 2445 or 2446 spills the information registered in one of the encoders 117, 118 and 119 into the units 406 through the terminals 4 therein. The read-out pulse also sets the units 426 in register 412 in accordance with the setting of the keys 414 in one of the circuits 409, 410 or 411. The terminal 4 is connected through the varistor 2427 in unit 406 or varistor 2727 in unit 426 to the grid of tube 2406 or 2706. When a negative pulse is transmitted through the terminal 4 the flip-flop operation takes place with tube 2408 or 2708 becoming conductive and tube 2406 or 2706 becoming non-conductive. In this manner, the coordinate information from one of the encoders 117, 118 and 119 is stored in the shift register 405 and the parallax information is stored in the shift register 412.

A series of shift pulses from the pulse delay circuit 408 associated with the serial adder 407 are simultaneously entered to the shift register units 406 and 426 through the terminals 13 as described above. Each shift pulse provides an output from either terminal 6 or terminal 7 to the next adjacent unit 406 or 426 to the left. A negative pulse through a terminal 7 indicates that a "1" digit was stored in the respective unit 406 or 426. The terminals 7 and 6 of one unit 406 or 426 are connected respectively to the terminals 10 and 3 of the adjacent unit 406 or 426. In the units 406 the terminals 10 and 3 are connected through the isolation varistors 2434 and 2435 and the delay parallax circuits comprising the 270-micro-microfarad capacitors 2432 and 2431 and the 15,000-ohm resistors 2433 and 2436, respectively, to the grids of tubes 2406 and 2408. A negative input pulse through terminal 10 steers or sets the unit 406 to register a "1" digit and a negative input pulse through terminal 3 sets the unit 406 to register a "0" digit. In this manner, when a shift pulse is entered to the units 406, each unit provides an indication to the adjacent unit 406 at the left, in accordance with the registration therein and enters or registers the indication from the unit 406, to the right. Due to the storage and delay elements there is no interference in the double functioning of each unit 406 when a shift pulse is entered. The units 426 operate in a similar manner.

The negative pulses entered through the terminals 13 of units 406 and 426 are also entered to the terminal 3 of the sixteen units 406 and 426. The first shift pulse transmits the stored digit from the sixteenth unit 406 or 426 to the fifteenth unit 406 or 426 and simultaneously steers the sixteenth unit 406 or 426 to register a "0" digit. The second shift pulse causes the fifteenth unit 406 or 426 to register a "0" digit due to a pulse from the sixteenth unit 406 or 426 which has registered therein a "0" digit. In this manner, the units 406 and 426 are cleared from the right as the digits are exited from the left until they all are returned to register "0's." In the specific embodiment of the present invention only thirteen binary digits are provided by the encoders 117, 118 and 119 so that the fourteenth through the sixteenth unit 406 is always set to register a "0."

The terminal 7 of the first unit 406 is connected to the right grid of the double triode 2301 in the cathode-follower unit 416 through the 1000-ohm resistor 2302. Any positive pulses are shunted to ground through the varistor 2303 which is connected to the right grid of tube 2301. The right plate of tube 2301 is connected to the +320 potential source 2305 and the right cathode is connected to the —50 volt potential source 2306 through the 5600-ohm cathode resistor 2307. The right cathode is connected to the serial adder 407 through lead 2304. The digits are in this manner pulsed to the serial adder 407 whenever a negative pulse is entered at terminal 13 of the first unit 406 and it is set to register a "1." Terminal 13 of the first unit 406 is connected to the program generator 300 whereas the terminals 13 of the other fifteen units 406 are connected to the pulse delay circuit 408.

The first shift register units 406 and 426 of the coordinate shift register 405 and of the parallax shift register 412 are cleared by a digit pulse through the terminals 13 from the program generator 300. The terminals 13 of the other fifteen units 406 and 426 in the registers 405 and 412, respectively, are cleared by a shift pulse from the pulse delay circuit which occurs 100 microseconds after the digit pulse from the program generator 300. The digit pulse from the program generator 300 is transmitted through lead 2447 to the terminals 13 of the first units 406 and 426 of the registers 405 and 412 and also to the pulse delay circuit 408.

Figure 23:
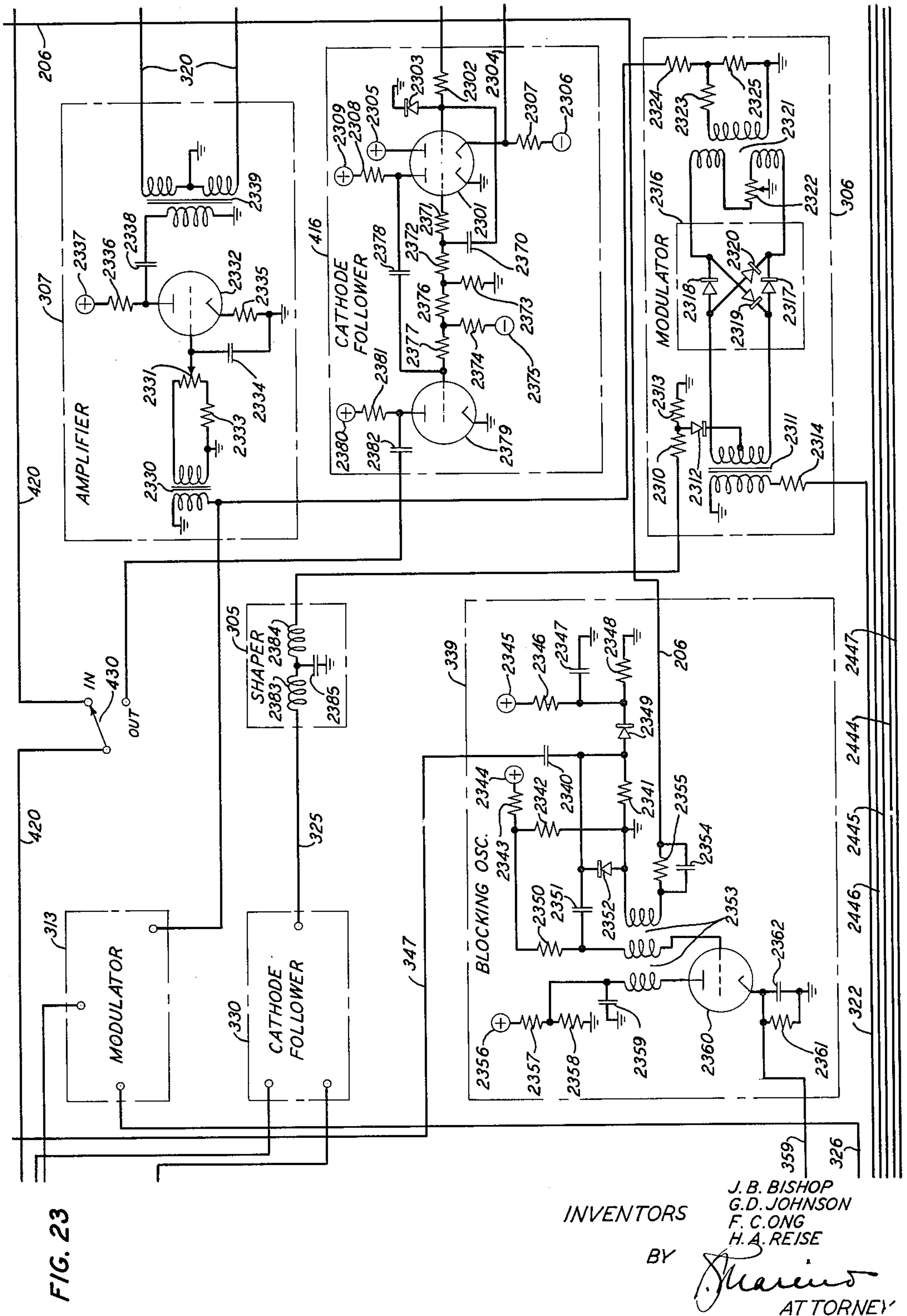
Figure 24:
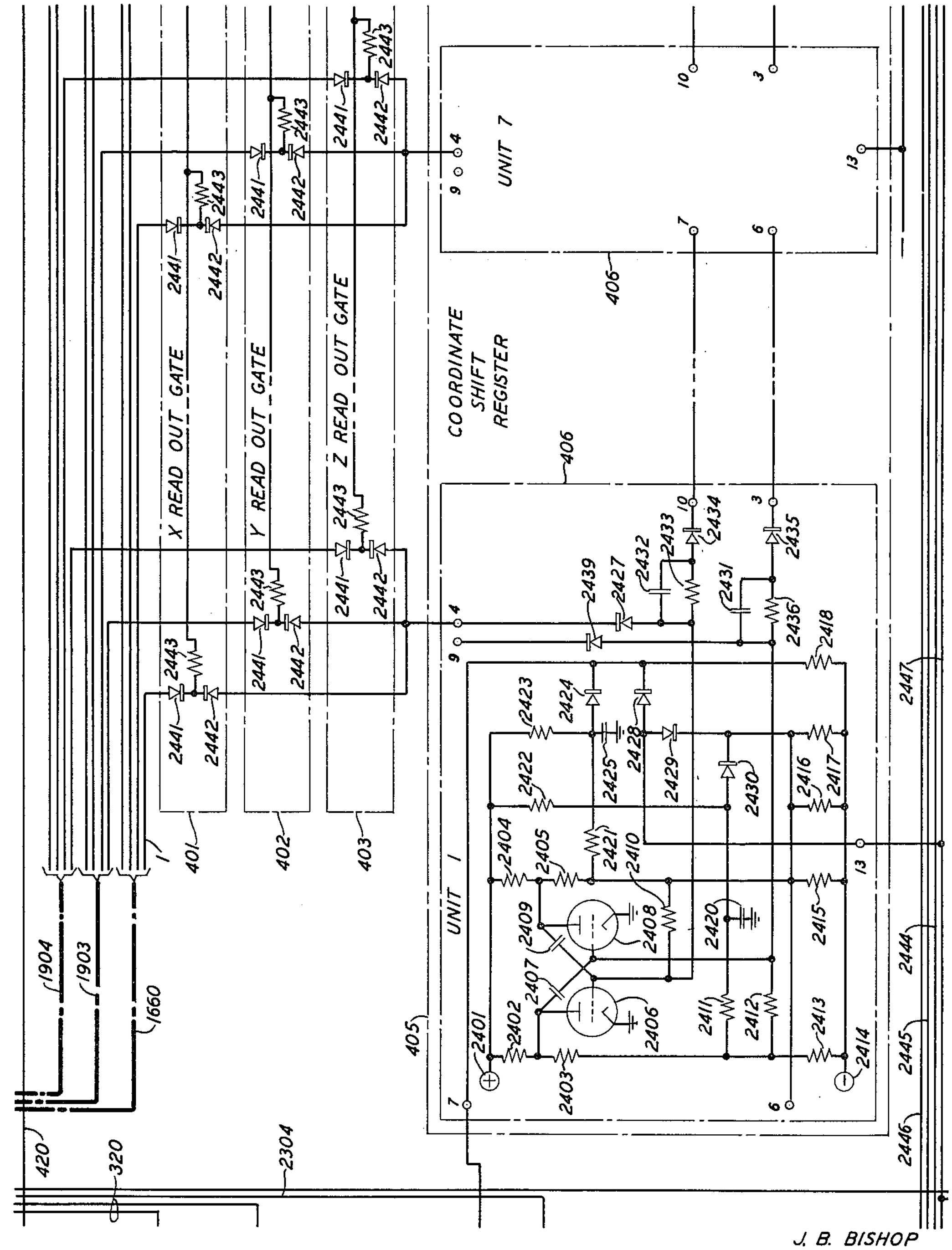
Figure 25:
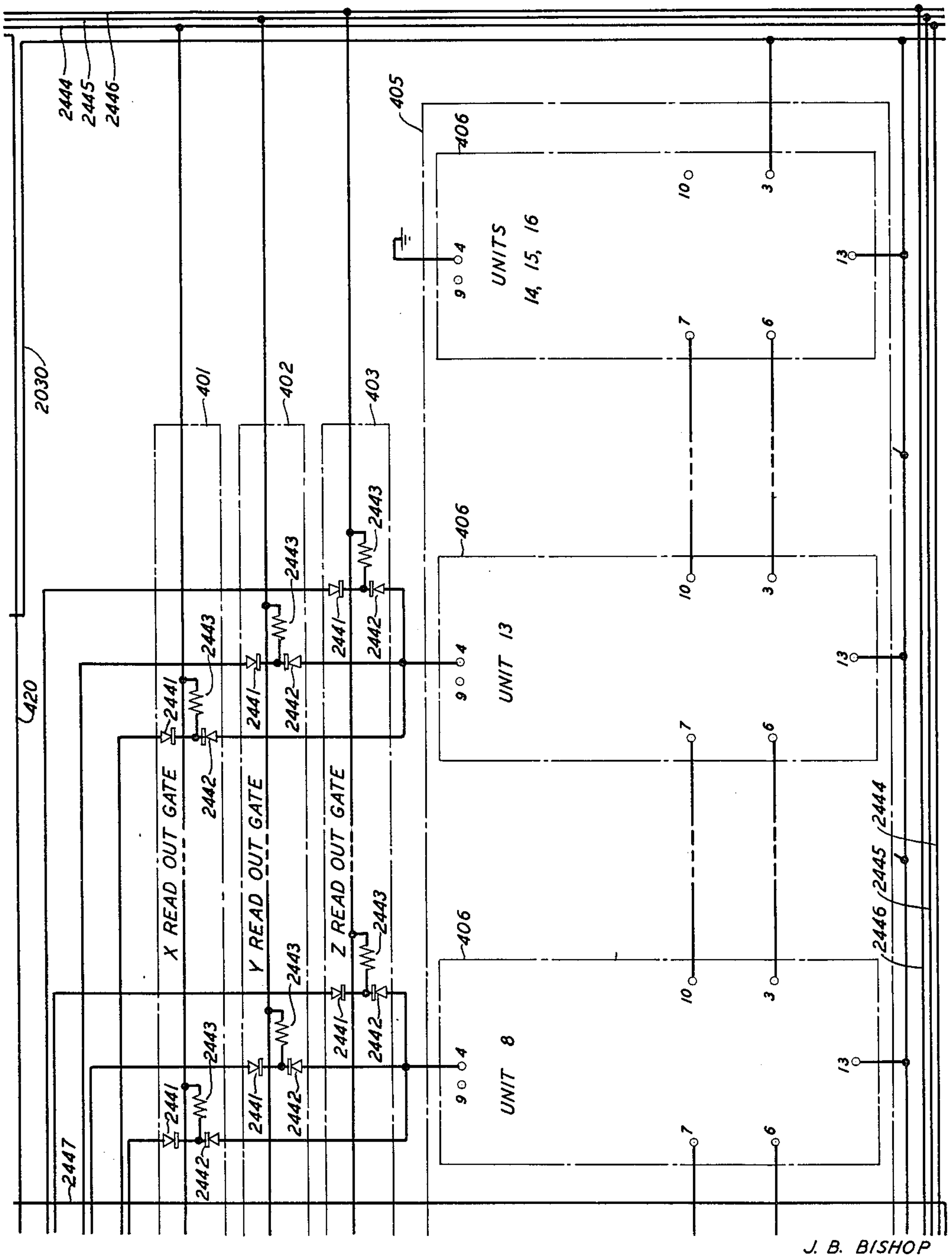
Figure 26:
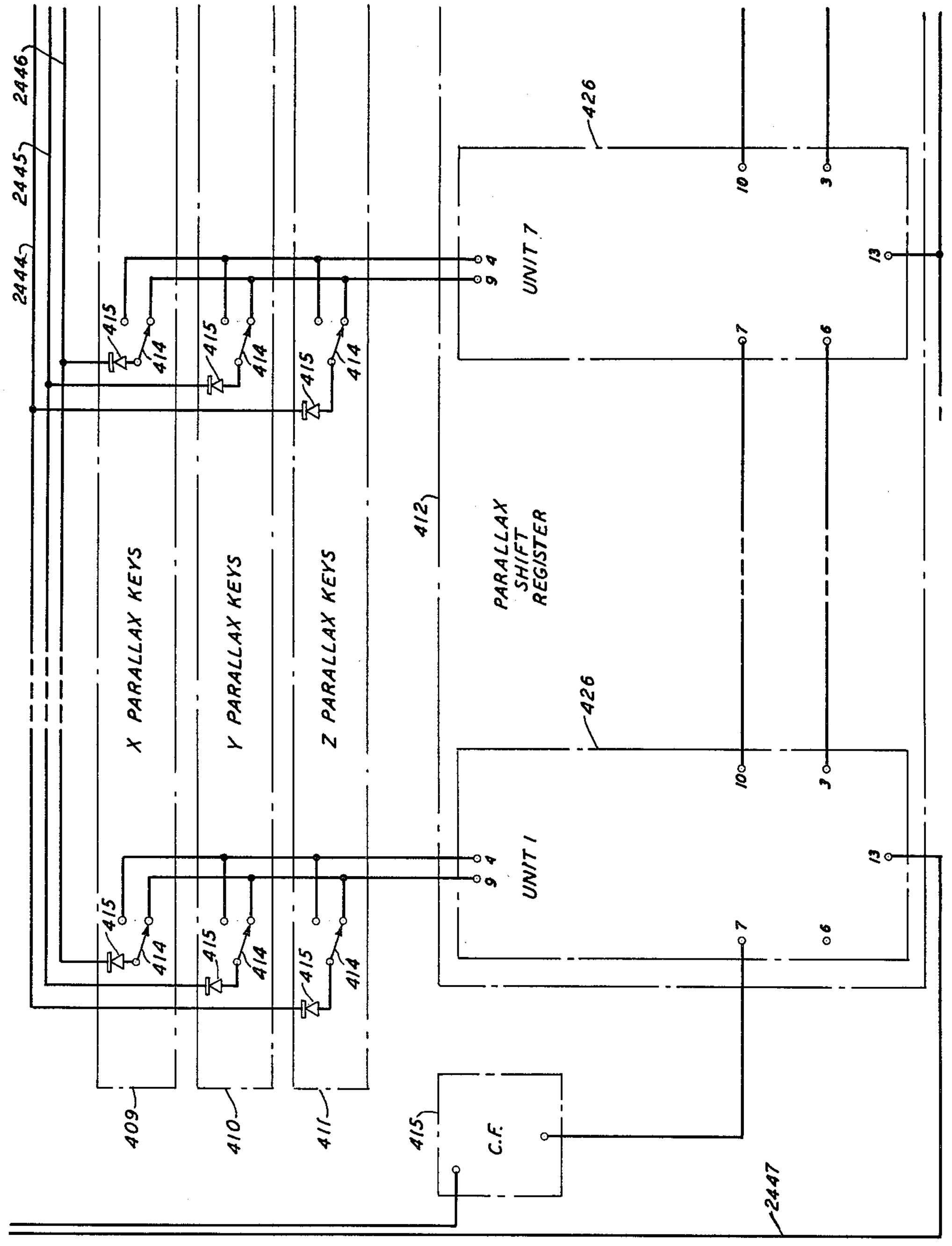
Figure 27:
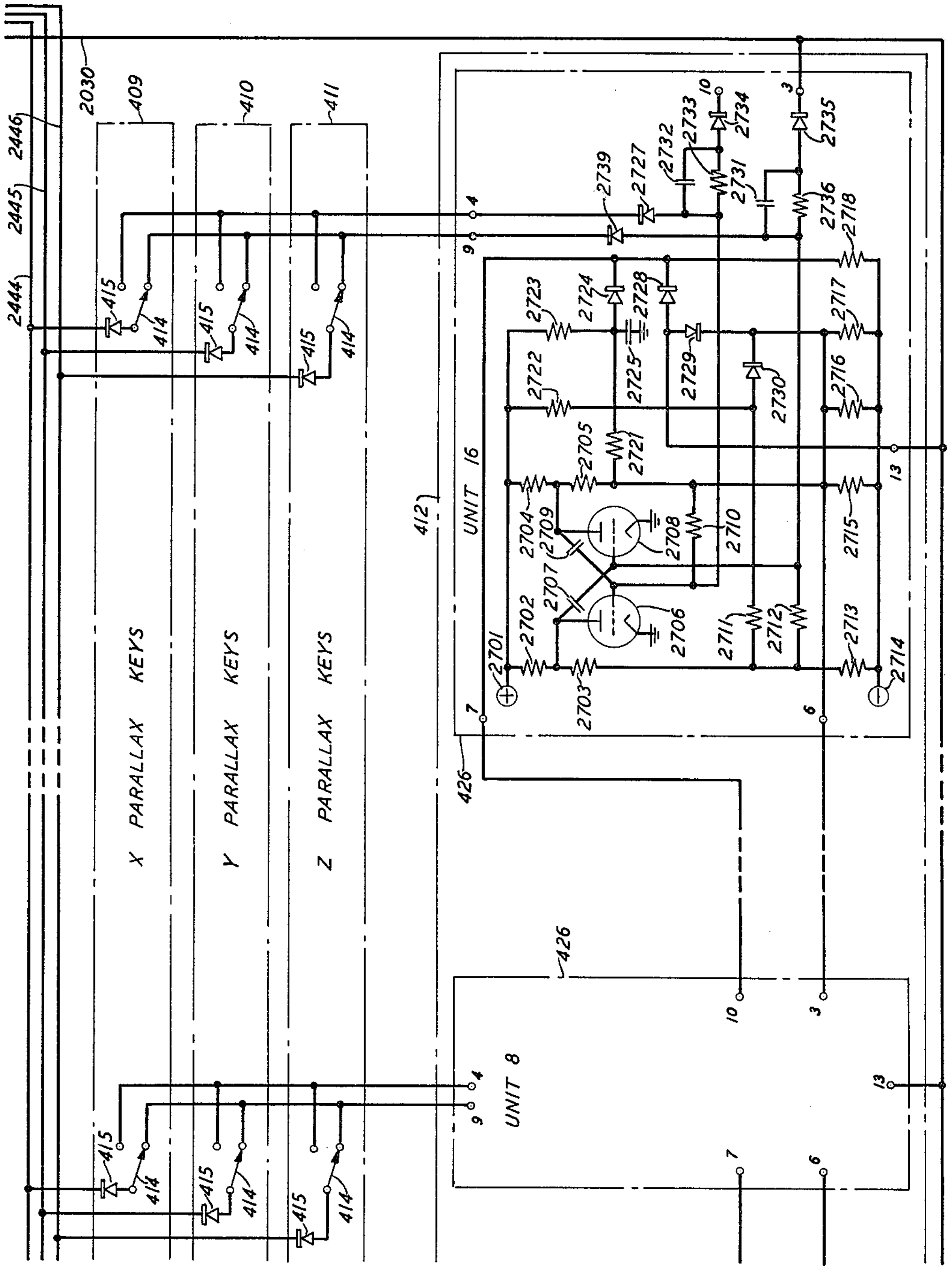

When digital parallax corrections are not utilized a serial adder, such as adder 407, hereinafter described, is unnecessary and the pulsed information from the register 405 can be sent directly to a flip-flop 302 in the modulator section 303 for conversion to spurts of 1200-cycle tone briefly described above. This is accomplished by the utilization of switch 430 which is connected in series with a line 420 from the output terminal 18 of the serial adder 407 to the flip-flop 302. The switch 430 as shown in FIG. 23 is in its upper position when digital parallax corrections are utilized. When digital parallax corrections are not utilized the switch 430 is in its lower position and the output from the shift register 405 is connected through the cathode follower 416 and switch 430 to line 420 and the flip-flop 302.

Terminal 7 of the first unit 406 is connected as described above to the right grid of tube 2301. The digital information from the shift register 405 is also supplied to the left grid of tube 2301 through the resistor 2302, the 510-micro-microfarad capacitor 2370 and the 1000-ohm resistor 2371. The left section of tube 2310 is an amplifier section having the left cathode connected to ground and the left anode connected to the +320 volt supply source 2309 through the 15,000-ohm resistor 2308. The output from the amplifier section of tube 2301 is coupled from the left plate thereof through the 4700-micro-microfarad capacitor 2378 to the grid of the amplifier triode 2379. The grid of triode 2379 is connected to the −320 volt potential source 2375 through the .47 megohm resistor 2377 and the .15 megohm resistor 2374. The junction of resistors 2377 and 2374 is connected to ground through the 9100-ohm resistor 2376 and the 1500-ohm resistor 2373. The junction of resistors 2376 and 2373 is connected to the capacitor 2370 described above through the .47 megohm resistor 2372. The output from the register 405 is in this manner applied to the grids of the left section of tube 2301 and of tube 2379.

The cathode of tube 2379 is grounded and the anode is connected to the +320 volt potential source 2380 through the 2200-ohm resistor 2381. The two amplifiers in the circuit 416 amplify the coded signals from the register 405 and couple them through the 4700-micro-microfarad capacitor 2381 to the switch 430 described above.

When the switch 430 is positioned as shown to provide a connection from the serial adder 407 the amplifiers in circuit 416 do not perform a function. When digital parallax corrections are not utilized the switch is moved to the "out" contact and the amplified signals through the circuit 416 are connected to the flip-flop 302.

As described above it is a digit pulse which is supplied by the program generator 300 that is connected to the terminals 13 of the first units 406 and 426. The digit pulse through lead 2447 is also supplied to the left grid of double triode 2002 through the terminal 1 and the 56-micro-microfarad capacitor 2003 in the pulse delay circuit 408. The digit pulse through lead 2447 actuates tube 2002 as a conventional single-shot multivibrator. The cathodes of tube 2002 are connected to ground and the plates are connected through the 16,000-ohm plate resistors 2004 and 2005 and the 1000-ohm resistor 2006 and 2500-ohm resistor 2007 to the +320 potential source 2008. Prior to the occurrence of the digit pulse which is prior to triggering, the left section of tube 2002 is conducting and the right section is cut off due to the fixed bias supplied by the resistance voltage divider comprising the 75,000-ohm resistor 2016 shunted by the 20-micro-microfarad capacitor 2015 connecting the left plate and the right grid, and the .24 megohm resistor 2012 connecting the right grid to the −320 potential source 2014. The negative digit pulse from the program generator 300 causes the sections of tube 2002 to reverse their conductive states due to the interconnecting resistor 2016. As the left plate of tube 2002 becomes more positive when the left section becomes less conductive, a positive pulse is impressed upon the right grid causing the right section to become conductive. The positive pulse upon the right grid of tube 2002 is maintained for 100 microseconds by the capacitor 2015 described above. The right section of tube 2002 conducts for only 100 microseconds as determined by the 180-micro-microfarad capacitor 2010 connecting the right plate and the left grid of tube 2002, and the 1-megohm resistor 2011 connecting the left grid and the left plate through the resistor 2004. The negative pulse to the right plate of tube 2002 is delayed through the capacitor 2010 to terminate the conduction through the right section of tube 2002. When the right section of tube 2002 stops conducting, it causes the left section to commence conduction. As the tube 2002 returns to its stable state a sudden rise in potential occurs at the right plate which is differentiated by the 100-micro-microfarad capacitor 2017 which is connected to the right plate, and the 1-megohm resistor 2013 connecting the capacitor 2017 and the source 2014. A diode 2018, which connects the capacitor 2017 to ground, suppresses the negative pulse resulting from the differentiating process and also provides a path for the initial surge of grid current through the grid of a blocking oscillator tube 2024. The blocking oscillator circuit comprising the triode 2024 is triggered as is hereinafter described to supply a single pulse to the serial adder 407 also hereinafter described.

The capacitor 2017 is connected to the cathode of tube 2024 through the positively poled diode 2019 and to the grid of tube 2024 through the parallel circuit consisting of the .01 megohm resistor 2021 and the 1000-micro-microfarad capacitor 2022 and the serially connected left winding of transformer 2023. The diode 2019 limits the amplitude of the positive input pulse to a value determined by the positive cathode voltage. Such a limitation is necessary to prevent charging the input capacitor 2022 an amount which would maintain a charge long enough to cause the tube 2024 to trigger more than once. The positive input pulse through the primary or left winding of transformer 2023 is coupled to the intermediate winding of transformer 2023 which connects the plate of tube 2024 to the 2200-ohm resistor 2027 and the .1 microfarad capacitor 2026. The resistor 2027 is connected to the junction of resistors 2006 and 2007 and the capacitor 2026 is connected to ground.

The single voltage swing that occurs through the intermediate winding of transformer 2023 is coupled to the output winding, shunted by the 220-ohm resistor 2025 which is connected to ground and through terminal 2 to the terminal 10 in serial adder 407. A diode, not shown, may be connected to the output winding to suppress the negative overshoot in the voltage swing of the single oscillation.

The length of the pulse to the serial adder 407 is determined mainly by the characteristics of the transformer 2023 but is also governed to some extent by the time constant of resistor 2021 and capacitor 2022. The pulses generated by the tube 2024 may be from one-half a microsecond to ten microseconds depending upon the characteristics of transformer 2023. In the preferred embodiment of the present invention the duration of the pulse is one-half a microsecond. The sharp one-half microsecond pulse provided at the output winding of the transformer 2023 is the shift register pulse, discussed above, which actuates the last fifteen units 406 and 426 in registers 405 and 412. The output winding of transformer 2023 is connected through terminal 6 and lead 2030 to the terminals 13 of the last fifteen units 406 and 426 in registers 405 and 412. The last fifteen register units 406 or 426 in registers 405 and 412 are in this manner actuated 100 microseconds after the occurrence of the digit pulse through lead 2447 which actuated the first units 406 and 426 in registers 405 and 412. The registers 405 and 412 can be actuated satisfactorily by a single pulse to all sixteen units 406 and 426 in each register instead of by two pulses; a digit pulse and a shift pulse. A shift register 705, which was briefly described above in reference to the box diagrams shown in FIGS. 1 through 7 when arranged in accordance with FIG. 8, utilizes the digit pulses for all sixteen units 706. The shift registers 405, 412 and 705 are all identical to simplify manufacturing procedures.

The shift pulse from the output winding of transformer 2023 actuates tube 2032 which is another one-shot multivibrator tube. The circuitry associated with tube 2032 and also with a second blocking oscillator tube 2054 is identical with the circuitry associated with tubes 2012 and 2024. The various components have been designated by a number which is greater than its corresponding component associated with tubes 2012 and 2024 by 30. For example, the capacitor 2033 associated with tube 2032 is similar to capacitor 2003 associated with tube 2002. The output winding of transformer 2053 is connected through terminal 3 to the terminal 11 of serial adder 407 providing thereto a carry pulse which occurs 100 microseconds after the shift pulse.

The cathodes of tubes 2024 and 2054 are connected to ground through the parallel circuit consisting of the 4-microfarad capacitor 2077 and the 900-ohm resistor 2078. The cathodes of tubes 2024 and 2054 are at a potential of +20 volts which is determined by the parallel circuit consisting of the capacitor 2077 and the resistor 2078 and the 4000-ohm resistor 2076 which is connected to the +100 volt potential source 2075. The source 2075 is also connected through the 2000-ohm resistor 2079 and the .1 microfarad capacitor 2074 to ground. The resistor 2079 is also connected to the +150 volt source 2072 and the 2000-ohm resistor 2071 which is in turn connected to the resistor 2007, described above, through the 4-microfarad capacitor 2070 to ground. The components 2007, 2008 and 2070 through 2072, and 2074 through 2079 provide for the +200 volt potential to resistors 2057, 2036, 2027 and 2006 and the +20 volt potential as described above to the cathodes of tubes 2024 and 2054.

The serial adder 407, as previously described, performs a binary addition, one digit at a time. The adding procedure is performed under the control of three pulses; the digit pulse from the program generator 300 through lead 2447, the shift pulse and the carry pulse from the pulse delay circuit 408. The lead 2447 from the program generator 300 is connected into the pulse delay circuit 408 to the capacitor 2003. The lead 2447 is also connected through the 120-ohm resistor 2080 which is connected to ground through the 120-ohm resistor 2073 and through terminal 4 of the pulse delay circuit 408 and terminal 12 of the serial adder 407 to the upper contacts of the double switches 2061 which are normally open.

The digital information from the coordinate shift register 405 and the parallax shift register 412 is connected to the input terminals 13 and 14 of the serial adder 407 through the cathode followers 416 and 415. The terminals 13 and 14 are connected to the lower contacts of the switch 2062. The switch 2062 is normally in its operate position, which is when digital parallax corrections are utilized, providing a path from its lower contacts to the "and" circuit 2063 and the "not and" or "or" circuit 2064. The "and" circuit generates a pulse when pulses are applied to both inputs simultaneously and the "not and" circuit generates a pulse when the pulse appears at one of its inputs but not at both.

The "and" circuit 2063 comprises three diodes 2065, 2066 and 2067 which are connected to the 510-micro-microfarad coupling capacitor 2068 and to the 47,000-ohm resistor 2069 which is connected to the −65 volt source 2072. The diode of varistor 2067 is poled towards and connected to ground. The varistors 2065 and 2066 are poled towards the varistor 2067 to which they are connected as described above. The terminals 13 and 14 to the varistors 2066 and 2065 are normally at a slightly positive voltage which is the potential upon the cathodes in the cathode followers 1416 and 1415 when no pulse is transmitted therethrough from the registers 405 and 412. The diodes 2065 through 2067 are, therefore, in their low impedance condition to provide effectively a short-circuit path to ground. Negative pulses upon both input terminals 13 and 14, however, if they appear simultaneously, change the impedance condition of the diodes 2065 through 2067 so that the junction of the three diodes 2065 through 2067 can swing as far negative as the less negative of the two potentials upon the input terminals 13 and 14. The resultant change in potential of the junction of the diodes 2065 through 2067, due to the simultaneous pulses to the diodes 2065 and 2066, is coupled through capacitor 2068 into the cathode follower 2094. If only one negative pulse was impressed upon the "and" circuit 2063, no output would appear from the "and" circuit 2063. For example, the negative pulse to diode 2065 alone is counteracted by the continued positive potential to varistor 2066 so as to maintain the diode 2067 in its low impedance condition and maintain the junction of the three diodes 2065 through 2067 at zero potential.

The switch 2062, as described above, is also connected to the "not and" circuit 2064 which provides an output indication when only one of its inputs receives the negative pulse. The "not and" circuit 2064 comprises tubes 2083 and 2089 which may be parts or sections of a double triode, and also double triode 2086. The grids of tubes 2083 and 2089 are connected to the switch 2062 through the 510-micro-microfarad capacitors 2095 and 2096 and also to the +150 volt potential sources 2081 and 2097, respectively, through the .1 megohm resistors 2082 and 2098. The plates of tubes 2083 are connected to the +320 volt potential source 2088 which is also connected to the plates of double triode 2086 through the 5100-ohm plate resistor 2087. The three tubes are arranged in a symmetrical arrangement with tubes 2083 and 2089 normally conducting. The biases for the grids and cathodes of the double triode 2086 are taken from the cathode resistors 2084, 2085, 2090 and 2091 of the tubes 2083 and 2089, respectively. The resistors 2084 and 2090 are of 1300 ohms and resistors 2085 and 2091 which are connected to ground are of 18,000 ohms. The junction of the resistors 2084 and 2085 is connected to the left grid of tube 2086 and the junction of resistors 2090 and 2091 is connected to the right of tube 2086. The cathode of tube 2083 is connected to the right cathode of tube 2086 and the cathode of tube 2089 is connected to the left cathode of tube 2086. With the tubes 2083 and 2089 normally conducting the grids of tube 2086 are at a potential of +145 volts and the cathodes at a potential of +150 volts so that both sections of tube 2086 are normally nonconducting. A negative pulse, however, to the grid of either tube 2083 or 2089 reduces the potential upon one of the cathodes of tube 2086 and the grid of the other section of tube 2086. The section of tube 2086 with its cathode potential reduced, conducts, generating a negative pulse at its plate terminal which is coupled through a 510-micro-microfarad capacitor 2099 to a third flip-flop circuit 2003A. Simultaneous pulses to both grids of tubes 2083 and 2089 reduce the potential on both cathodes and both grids of tube 2086 providing no net change at either of the plates of tube 2086 and thereby no output pulse.

The flip-flop units 2001A, 2002A and 2003A are similar to units 406 and 426, described above, with the terminals being designated by the same numbers. Supplying a negative pulse to a terminal 4 sets the unit 2001A, 2002A or 2003A to register a "1" digit and a negative pulse to a terminal 9 registers a "0" digit. A negative pulse to a terminal 10, also described above, sets the units 2001A, 2002A and 2003A to register a "1" digit and a pulse to a terminal 3 registers a "0" digit. Units 2001A, 2002A and 2003A function when a negative pulse is entered at a terminal 13 to provide an output indication through one of the terminals 6 and 7 in accordance with the registration.

The "not and" circuit 2064, described above, is connected to terminal 4 of the flip-flop unit 2003A so that a pulse from the "not and" circuit 2064 steers or causes the unit 2003A to register a "1" digit. The coupling from the "not and" circuit 2064 is through the capacitor 2099 which is connected to ground through the 18,000-ohm resistor 2060. The output from the "and" circuit 2063 is connected to the cathode-follower circuit 2094 which is in turn connected to the terminal 10 of the flip-flop unit 2001A. An input to the terminal 10 of the unit 2001A, as described above, sets the unit 2001A to register a "1" digit. In this manner, the digit pulse entered to the first units 406 and 426 in registers 405 and 412 causes the digital information registered therein to set the units 2003A and 2001A to a "0" or "1" condition depending upon the simultaneous registration of a "1" digit in both of the first units or the registration of only one "1" digit or the registration of no "1" digits. Simultaneous registration of a "1" digit of both of the first units 406 and 426 enables the "and" circuit 2063 but not the "not and" circuit 2064 so that the unit 2001A registers a "1" digit and unit 2003A continues to register the "0" digit.

The shift pulse from terminal 2 of the pulse delay circuit 408 is connected through terminal 10 of the serial adder 407 to the terminals 13 and 9 of the unit 2003A and the terminal 13 of the unit 2002A. The shift pulse at the terminal 13 clears the digit registered in the respective unit 2003A or 2002A to the cathode follower 2004A. Terminals 7 of the units 2003A and 2002A are connected to the double cathode-follower circuit 2004A. The unit 2002A is connected through terminals 10 and 3 to the output terminals 7 and 6 of unit 2001A. The outputs from the cathode follower 2004A are connected through the switch 2043A which is normally closed at its lower contacts to the second "not and" circuit 2010A and the second "and" circuit 2005A. If both sections of the cathode follower 2004A are actuated, the second "and" circuit 2005A, which is identical to the "and" circuit 2063, functions to supply the negative pulse to the cathode follower 2009A. The cathode follower 2009A is connected to the terminal 4 of the unit 2001A described above to reset the circuit 2001A to register a "0." If only one of the sections of the cathode follower 2004A is actuated, a negative pulse is supplied by the second "not and" circuit 2010A, which is identical to the "not and" circuit 2064, to the amplifier 2011A hereinafter described.

Terminal 3 in the pulse delay circuit 408 as described above provides the carry pulse 100 microseconds after the shift pulse, through the terminal 11 in serial adder 407 to the terminals 13 and 9 of the unit 2001A. The carry pulse through the terminal 13 of the unit 2001A causes the unit 2001A to transmit its registration through one of its outputs 7 or 6 in accordance with registration therein and the negative pulse through the terminal 9 of the unit 2001A resets the unit 2001A to register a "0" digit.

Terminal 9 of unit 2002A is connected to the leads 2444, 2445 and 2446 through the varistors 2033A, 2031A and 2030A and terminals 17, 16 and 15, respectively. The leads 2444 through 2446 provide the three read-out pulses, as described above, to the read-out gates 401, 402 and 403 and the circuits 409, 410 and 411. The unit 2002A is in this manner reset to register a "0" digit by each of the three read-out pulses.

The following chart summarizes the operation of the components of the serial adder 407 for the addition of the binary numbers 0110 and 0011 stored in the registers 405 and 412, respectively:

| Pulses | 405 | 412 | 2064 | 2063 | 2001A | 2002A | 2003A | 2010A | 2005A | Output |
|---|---|---|---|---|---|---|---|---|---|---|
| Start | 0110 | 1100 | | | 0 | 0 | 0 | | | |
| Digit | | | 1* | 1 | | | 1 | | | |
| Shift | 110 | 100 | | | | | 0* | 1* | 1 | 1 |
| Carry | | | | | | | | | | |
| Digit | | | 11 | 11* | 1 | | | | | |
| Shift | 10 | 00 | | | | | | | | 0 |
| Carry | | | | | 0* | 1 | | | | |
| Digit | | | 1* | 1 | | | 1 | | | |
| Shift | 0 | 0 | | | 1 | 0* | 0* | 11 | 11* | 0 |
| Carry | | | | | 0* | 1 | | | | |
| Digit | | | | | | | | | | |
| Shift | | | | | | 0* | | 1* | 1 | 1 |
| Carry | | | | | | | | | | |

The numbers above each column in the chart identify the circuit. For example, 405 identifies the coordinate shift register 405. The binary numbers in columns 405 and 412 are written backwards, with the least significant digit at the left, to correspond with the arrangement of equipment in the registers 405 and 412 and because the shifting therein proceeds to the left.

At the commencement or start of the binary addition as indicated in the chart, the registration in the shift registers 405 and 412 is 0110 and 1100, respectively, and the registration in the units 2001A, 2002A and 2003A is "0." The digit pulse through leads 2447 causes the least significant digits in the registers 405 to 412 to be sent or transmitted to the serial adder 407. The least significant digit in the coordinate shift register is "0" and the parallax shift register is "1." The pulse from the shift register 412 is applied to both the "and" circuit 2063 and the "not and" circuit 2064. The "and" circuit 2063 does not provide an output indication since only one of its inputs is energized, but the "not and" circuit 2064 produces the pulse in response to its single input as described above. This response is indicated on the chart by an asterisk adjacent the "1" digit in the column headed 2064. This newly generated pulse by the "not and" circuit 2064 is applied to the unit 2003A changing its registration from "0" to "1," also as indicated in the chart. Nothing further happens until the shift pulse is generated by the pulse delay circuit 408. The shift pulse clears the unit 2003A from "1" to "0" generating a new pulse which in turn causes the second "not and" circuit 2010A to generate a pulse which is transmitted as an output indication. The shift pulse also causes the information registered in the shift registers 405 and 412 to shift to the left. The carry pulse produced by the pulse delay circuit 408 is applied to the unit 2001A and produces no effect therefrom as the unit 1001A is already in a "0" condition. An output indication is provided from the units 2001A, 2002A and 2003A only when their registrations change. The second digit pulse provides an indication from the registers 405 and 412 since they both now have registered a "1" digit in the least significant units 406. The two inputs provide an output indication from the "and" circuit 2063, but not from the "not and" circuit 2064. The output from the "and" circuit 2063 changes the registration from "0" to "1" of the unit 2001A. The shift pulse which follows 100 microseconds later shifts the information in the registers 405 and 412 to the left, but produces no other effect as the units 2002A and 2003A to which it is also applied as they are already in a "0" position. The second carry pulse, however, which is applied to the unit 2001A produces an output indication therefrom to the unit 2002A which changes its registration from "0" to "1." The third digit pulse provides a pulse from the register 405 and not from the register 412 so that the "and" circuit 2063 does not transmit a pulse, but the "not and" circuit 2064 does. The pulse from the "not and" circuit 2064 sets the unit 2003A to register a "1" digit. The shift pulse which follows, shifts the information registered in the registers 405 to 412 and all the units 406 now register a "0." The shift pulse also clears both units 2002A and 2003A to register a "0" digit and provides two pulses to the "not and" circuit 2010A and the "and" circuit 2005A. The "and" circuit 2005A provides an output indication of the unit 2001A changing its registration to "1." The carry pulse which is applied to the unit 2001A provides an indication therefrom to the unit 2002A changing its registration once again to a "1." The pulse generated by the "and" circuit 2005A as described above is not an output indication, but provides a "carry" signal to the unit 2001A which is used in adding the next digits. The carry pulse to the unit 2001A effectively transmits the carry pulse therefrom to the unit 2002A. The fourth digit pulse which is applied to the registers 405 and 412 provides no signal or pulses to the serial adder 407 and no further operation occurs therein. The fourth shift pulse which is applied to the units 2002A and 2003A changes the registration in the unit 2002A from a "1" to a "0" and provides a pulse to the circuits 2010A and 2005A, the single input energizes only the "not and" circuit 2001A which provides a "1" output indication.

In this manner, an output indication "0" or "1" is provided upon the occurrence of each shift pulse for the sum of the binary numbers 0110 from the coordinate shift register 405 and 0011 from the parallax register 412 is 1001 as indicated in the output column of the chart with the least significant digit occurring at the top of the column. The purpose of the two units 2010A and 2002A arranged in tandem, as described above, is to store a carry signal until needed for the next addition operation.

The output indications are provided from the "not and" circuit 2001A to the amplifier 2011A. An output indicating a "1" digit transmits a negative pulse through the 510-micro-microfarad capacitor 2013A which is connected to the left grid of the double triode 2018A and to ground through the .47 megohm resistor 2019A and the 3600-ohm resistor 2020A. The cathodes of tube 2018A are connected to ground and the left and right plates are connected through the 15,000 and 2200-ohm resistors 2014A and 2015A, respectively, to the +320 volt potential source 2012A. The negative pulse indicating a "1" digit which is applied to the left grid of tube 2018A cuts off or interrupts conduction through the left section, increasing the potential at the left plate. The left plate of tube 2018A is coupled through the 510-micro-microfarad capacitor 2060A to the right grid. The increase of potential of the left plate causes the right section of tube 2018A to become conducting. Normally, the right section of tube 2018A is non-conducting due to connection of the right grid to the −320 volt potential source 2029A through the .47 megohm resistor 2017A and the .15 megohm resistor 2022A. The junction of resistors 2017A and 2022A is connected through the 6800-ohm resistor 2021A to the junction of resistors 2019A and 2020A described above. The increase in conduction through the right section of tube 2018A reduces the potential at the right grid providing a negative pulse through the .01 microfarad capacitor 2024A which is connected to ground through the 1-megohm resistor 2023A to the output terminal 18. The source 2029A is connected to ground through the 10,000-ohm resistor 2025A and the .1 microfarad capacitor 2026A. The junction of capacitor 2026A and resistor 2025A is connected to the −65 volt potential source 2028A and to ground through the 4000-ohm resistor 2027A.

A "0" output indication from the "not and" circuit 2010A provides no change in potential at the left grid of tube 2018A and, therefore, no pulse to lead 2015A from the amplifier 2011A.

The sequence of operations repeats in the serial adder 407 until all sixteen digits stored in registers 405 and 412 have been added and transmitted from the serial adder 407. The next read-out pulse from one of the leads 2444 through 2446 which spills the next coordinate sixteen digits into the register 405 is coupled through one of the diodes 2030A, 2031A or 2033A as described above to reset the unit 2002A to "0." Another first digit pulse follows the read-out pulse and commences once again the sequence of events described above.

Figure 3:
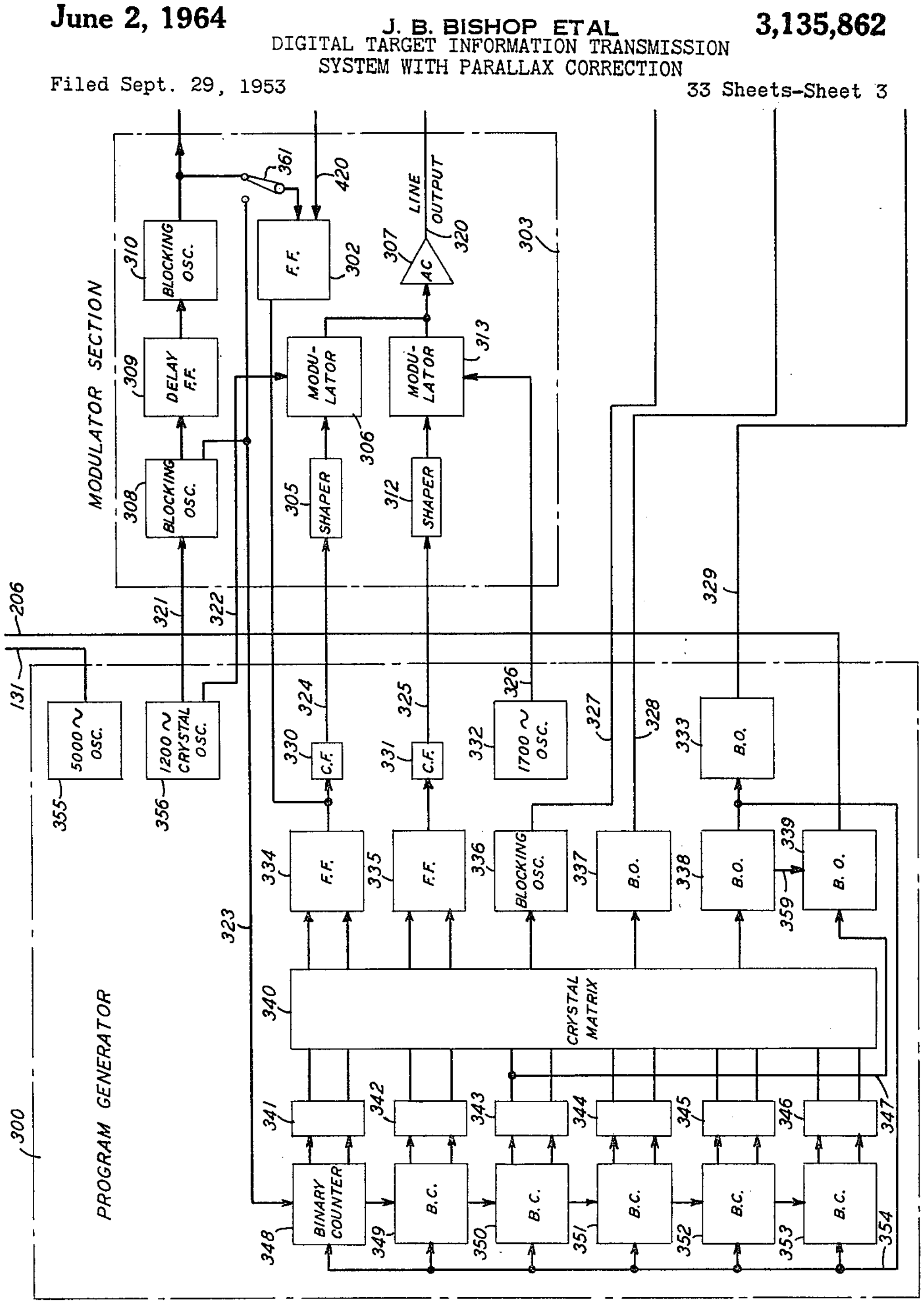
Figure 4:
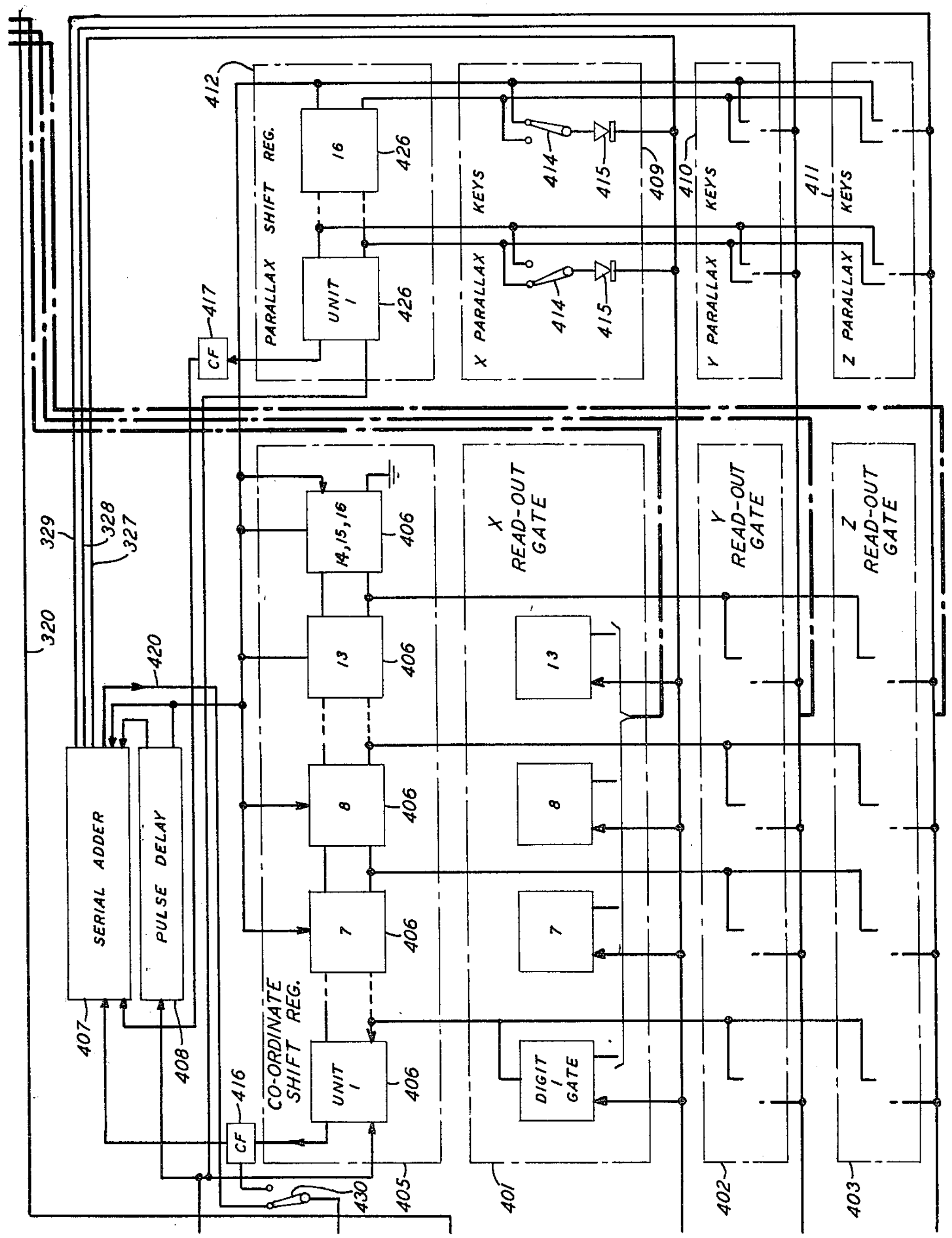

The lead 420 which is connected from the terminal 18 of the serial adder is connected through a switch 430 described above to a flip-flop 302 which is in the modulator section 303 shown in FIG. 3 on the block diagrams. The flip-flop 302 is identically the same as the hereinafter described binary counters 348 through 353 in the frame timing section of the program generator 300. In short, the flip-flop 302 and the counters 348 through 353, as well, are flip-flop circuits which provide a relatively long spurt 1⅔ milliseconds long of tone, responsive to the input of a very short pulse such as provided from the serial adder 407 through lead 420. The sharp pulse upon lead 420 is connected into the flip-flop 302 through terminal 7 thereof and the output is taken from the terminal 9. The output of the serial adder 407 is a very short pulse which is unsuitable for transmission over a telephone line. The flip-flop 302 is cleared by each of the digit pulses described above which are coupled to terminal 9 through capacitor 2203 so that when the output of the serial adder is a "1" digit and the flip-flop 302 registers a "1" digit, the digit pulse returns the flip-flop 302 to register a "0" digit. This procedure converts the short sum pulses from lead 420 to square-topped steady direct-current signals corresponding to either a "0" or a "1" digit. The square-topped signals from the flip-flop 302 are supplied to the cathode follower 330. The output from the cathode follower 330 is connected from the cathodes thereof to the shaper 305. The filter section 305 comprising inductors 2383 and 2384 and capacitor 2385 reshapes the square wave from the flip-flop 302 so that they build up and die down more slowly than square pulses to reduce the level of harmonics of the line signals. The reshaped pulses from the shaper 305 are connected to the modulator 306. The shaped pulses effectively function to release spurts of 1200 cycles to the output line. The time allotted to each digit as indicated by the flip-flop 302 allows for two full cycles to tone, but due to the shaping process a low pulse is preceded and followed by cycles of lower amplitude. If several "1" digits arrive in succession, the tone builds up in one cycle to a steady maximum value and then dies down in one cycle to zero. In addition to the digit spurts controlled through the flip-flop 302 the modulator 306 releases a synchronizing signal which is a spurt of tone three digits long. This procedure is accomplished under control of start and stop pulses from program generator 300 as is hereinafter described. The 1200-cycle tone is supplied to the modulator 306 through lead 322.

The modulator 306 is actuated by the flip-flop 302 and also by a flip-flop 334 which is similar to the flip-flop 302. The flip-flops 302 and 334 effectively change the grid bias in the cathode follower 330, the output of which is connected through the shaping network 305.

The shaper 305 is connected through the 10,000-ohm resistor 2310 and the varistor 2312 to the center tap of the secondary of transformer 2311 in modulator 306. The junction of resistor 2310 and varistor 2312 is connected to ground through the 2700-ohm resistor 2313. The primary of transformer 2311 is connected to ground and through the 10,000-ohm resistor 2314 to lead 322. A 1200-cycle tone of sinusoidal shape is supplied over lead 322 from the crystal oscillator 356 hereinafter described. The secondary of transformer 2311 is connected to the diode network 2316 which has the four diodes or varistors 2317, 2318, 2319, 2320. The varistors 2317 through 2320 are poled so that if no direct current is superimposed upon the 1200-cycle tone from oscillator 356, one varistor, either 2317 or 2318, opposes the induced current regardless of phase, and other diodes, either 2319 or 2320, acts to short-circuit the secondary of the transformer 2311. The resistor 2312 limits the amount of short-circuit current and thereby further insures a low output when there is no direct-current signal.

When either of the flip-flops 302 or 334 operates and provides a positive pulse to the secondary of transformer 2311 the two series varistors 2317 and 2318 become low impedance elements and the two shunt varistors 2319 and 2320 become high impedance elements. With the varistors 2317 and 2318 at low impedance and varistors 2319 and 2320 at high impedance, the 1200-cycle tone is coupled through network 2316 to the primary of transformer 2321. The network 2316 functions therefore as a gate circuit being enabled by a positive pulse from either of the binary counters 302 or 334.

The primaries of transformer 2321 are connected to ground through the adjustable contact of 100-ohm potentiometer 2322. The potentiometer 2322 is adjusted so that the tone output from modulator 306 is zero when the network 2316 is not enabled. The secondary of transformer 2321 is connected to ground and to the amplifier 307 through the 24-ohm resistors 2323 and 2324. The junction of resistors 2323 and 2324 is connected to ground through the 430-ohm resistor 2325.

A modulator 313 which is similar to the modulator 306 acts as a gate to connect the 1700-cycle oscillator 332 to the amplifier 307. The modulator 313 is controlled by the flip-flop 335 which is similar to the flip-flops 302 and 334 and which is in turn controlled by the program generator 300 as is hereinafter described. The modulator 313 proves a ready signal through amplifier 307 to the line.

The spurts of 1700-cycle tone and 1200-cycle tone from modulators 313 and 306 are connected to the grounded primary of transformer 2230 in amplifier 307. The secondary of transformer 2230 is also grounded and connected through the 2-megohm potentiometer 2231 to the grid of triode 2232. The potentiometer 2231 is connected to ground through the .1 megohm resistor 2233 and is provided to adjust the line output between +10 and −10 decibels. The grid of triode 2232 is connected to ground through the 82-micro-microfarad capacitor 2234 and the cathode thereof is connected to ground through the 1000-ohm resistor 2235. The output of the tube 2232 is coupled through the 1-microfarad capacitor 2238 to the grounded primary of the output transformer 2239. A positive potential source 2237 supplies plate potential to the tube 2232 through the 33,000-ohm resistor 2236. The secondary of transformer 2239 is connected to the line 320 which connects the receiver and transmitter. An idealized curve illustrating the ready, synchronizing and data signals is shown in FIG. 9.

As previously described above the oscillator 356 shown in FIG. 21 is a crystal-controlled oscillator which provides a tone for the transmission of the digits from the serial adder 407 and also provides a tone which acts as a basic timing reference. The quartz crystal 2142, which has a low temperature coefficient, is utilized to stabilize the frequency of the tone from the oscillator 356. The right plate of crystal 2142 is connected through a .51 megohm resistor 2145 to the left grid of double triode 2150. Resistor 2145 together with a 510-micro-microfarad grounded capacitor 2138 acts as a filter to prevent unwanted high frequency oscillations. The capacitor 2138 is shunted to ground by the 56,000-ohm resistor 2139 and is connected to the left plate from the crystal 2142 through the .11 megohm resistor 2140. The left plate of the crystal 2142 is also connected to a grounded thyrite varistor 2131 through a 3900-micro-microfarad capacitor 2141 and a .05 microfarad capacitor 2137. The varistor 2131 prevents the crystal 2142 from overloading and also tends by its limiting action to square the output wave produced by the oscillator 356. The squaring of the output of the oscillator 356 is accentuated by the action of the zero bias amplifier tube 2150. The left grid of tube 2150 is connected to the right plate of the crystal 2142 as described above through the resistor 2145. The junction of capacitors 2141 and 2137 is connected to the left plate of tube 2150 which is also connected to the +320 volt potential source 2132 through the .47 megohm plate resistor 2133. The left cathode of tube 2150 is connected to ground through the parallel circuit comprising the .25 microfarad capacitor 2147 and 2200-ohm resistor 2148. The output from tube 2150 is taken from the right plate which is connected through the .27 megohm resistor 2134 to the source 2132. The right cathode of tube 2150 is grounded and the right grid is connected through the .11 megohm resistor 2151 and the 180-micro-microfarad capacitor 2152 to the left plate of crystal 2142. The junction of resistor 2151 and capacitor 2152 is grounded through the .11 megohm resistor 2149. Due to the connection of the grids of tube 2150 to the plates of the crystal 2142, the oscillation of the crystal 2142 causes the sections of tube 2150 to alternately conduct. A positive pulse upon the right plate is differentiated by the 1500-micro-microfarad capacitor 2136 which is connected thereto through the 24,000-ohm resistor 2135. Negative pulses from the right plate of tube 2150 are suppressed or short-circuited to ground through the varistor 2170 which is shunted by the 9100-ohm resistor 2171. The positive pulse from the right grid is limited in amplitude by the varistor 2172 which is connected to the capacitor 2136 and to the +320 potential source 2173 through the 91,000-ohm resistor 2174. The junction of varistor 2172 and resistor 2174 is connected to ground through the parallel circuit comprising the .1 microfarad capacitor 2175 and 9100-ohm resistor 2176.

The positive pulse, limited in amplitude as described above, triggers the blocking oscillator 308 hereinafter described. The cathode or bottom plate of the crystal 2142 is connected to ground through the 220-micro-microfarad capacitor 2143 and 910-micro-microfarad capacitor 2144. The right plate of crystal 2142 is also connected to ground through the .1 megohm resistor 2146. A second output of the oscillator 356 is taken from the junction of capacitors 2143 and 2144 which is of lower amplitude than the output from the right plate of double triode 2150. The junction of capacitors 2143 and 2144 is connected to ground through the 1-megohm resistor 2153 and to the grid of the amplifier tube 2115. The input to the grid of tube 2115 has a sinusoidal wave shape which provides an output from tube 2115 to the modulator 306 described above through lead 322. The plate of tube 2115 is connected to the +320 volt potential source 2154 through the 15,000-ohm plate resistor 2155 and the cathode thereof is connected to ground through the 1000-ohm cathode resistor 2159. The lead 322 which supplies the 1200-cycle tone to the modulator 306 is connected to the plate of tube 2115 through the 1-microfarad coupling capacitor 2156.

The output from the plate of tube 2150 described above is connected to the blocking oscillator 308. The blocking oscillator 308 is similar to the blocking oscillators in the pulse delay circuit 408, described above, and effectively halves the frequency from the oscillator 356. The oscillator 308 has a three-winding transformer 2163 and an amplifier triode 2164. The 1200-cycle tone from the oscillator 356 is coupled through the .01 microfarad capactor 2162, the center winding of transformer 2163 which is in turn connected to the grid of tube 2164 through the 510-ohm limiting resistor 2165. The capacitor 2162 together with a 50,000-ohm potentiometer 2167, which is connected thereto through the 33,200-ohm resistor 2166, determine the time constant of the blocking oscillator 308. The time constant is so adjusted by the potentiometer 2167 so as to provide for the triggering or operation of the blocking oscillator 308 upon every second input pulse so that it functions as a frequency halver. The potentiometer 2167 is connected to the −320 volt potential source 2169 through the .09 megohm resistor 2168 and through the variable contact to the grounded 7500-ohm resistor 2177.

The cathode of the amplifier tube 2164 is grounded and the anode is connected through the right winding of transformer 2163, shunted by the 7500-ohm resistor 2178, and through the 43,200-ohm resistor 2179 to the +320 volt potential source 2189. The resistor 2179 is connected to ground through the parallel circuit comprising the .1 microfarad capacitor 2197 and the .22 megohm resistor 2198. The resistors 2179 and 2198 are carbon-deposited resistors to provide for a precision plate supply to maintain the stability of the blocking oscillator 308. The transformer 2163 provides for a single voltage swing responsive to the entry of a pulse from oscillator 356 which has a duration equivalent to two of the pulses from the oscillator 356.

The output from the blocking oscillator 308, which has a frequency of 600 pulses per second, is provided to a lead 323 to the frame timing section of the program generator 300 and also to the delay flip-flop 309 hereinafter described. The output to lead 323 is taken from the left winding of transformer 2163 which is connected to ground through the 3300-ohm resistor 2195 and the 1600-ohm resistor 2196. The junction of resistors 2195 and 2196 is connected to the "out" contact of the switch 361. When digital parallax corrections are not utilized and the switch 361 is moved to its "out" contact the output of the blocking oscillator is supplied to the flip-flop 302 described above.

Lead 323 connects the 600 cycles per second from the blocking oscillator 308 to the frame timing section of the program generator 300 which comprises the six binary counters 348 through 353 which are connected to the network 340. The counters 348 can count collectively to sixty-four, which is the sixth power of 2, but are reset at the count of sixty. With 600 pulses per second applied through lead 323, a count of sixty represents one-tenth of a second. The count of sixty or one-tenth of a second is the time utilized for the transmission of a complete data frame with each count representing one time slot or the time allotted to each digit in the transmitted binary data. During each 100 milliseconds, or one-tenth of a second, a ready signal, three time slots long, a synchronizing signal three time slots long and the three, sixteen time slot data sections are transmitted as shown in FIG. 9.

The lead 323 is connected to the terminals 6 and 7 of the binary counter 348, which is first of the six counters 348 through 353. The terminals 6 and 7 are connected through the 51,000-ohm resistors 1707 and 1708 and the 47-micro-microfarad capacitors 1705 and 1706, respectively, to the plates of triodes 1701 and 1702. The tubes 1701 and 1702 are interconnected as is hereinafter described to provide for the flip-flop operation with each tube alternately conducting upon successive input pulses. The plates of tubes 1701 and 1702 are connected respectively through the 47-micro-microfarad capacitors 1703 and 1704 to the grid of the opposite of tubes 1702 and 1701, and also through the .24 megohm resistors 1719 and 1720 to terminals 1 and 12, respectively. The cathodes are connected together and through the parallel circuit of the .1 microfarad capacitor 1724 and the 18,000-ohm resistor 1722 and the serially connected 470-ohm resistor 1723 to ground. The grids of tubes 1701 and 1702 are connected to the output terminal 5 and to ground through the .22 megohm resistors 1725 and 1721, respectively. The terminals 1 and 12 provide input terminals whereby the counter 348 may positively be set to a particular condition. The plates of tubes 1701 and 1702 are connected to the −320 volt potential sources 1717 and 1718 through the .39 megohm resistors 1713 and 1714 and the .91 megohm resistors 1715 and 1716, respectively. The junctions of resistors 1713 and 1715, and 1714 and 1716 are connected respectively to the output terminals 4 and 11. The plates of tubes 1701 and 1702 are also connected to terminals 3 and 9, respectively, which can be utilized to trigger an adjacent counter such as 349.

When tube 1702 is conducting the potential at its plate is at +115 volts due to the connection therefrom through the 20,000-ohm resistor 1710 to the +210 volt potential source 1711. The plate of tube 1701, which would not be conducting when tube 1702 is conducting, is also connected to source 1711 through the 20,000-ohm resistor 1709. The plate of tube 1701, when it is non-conductive, is at a potential of +195 volts. The potential, therefore, upon terminals 3 and 9 which are connected to the plates of tubes 1701 and 1702 is respectively +195 and +115 volts. The potentials upon terminals 1 and 12 when tube 1702 is conducting is respectively +80 and +53 volts and the potential upon terminals 4 and 11 is respectively +44 and −18 volts. When a pulse is entered through terminals 6 and 7 the conductive condition of tubes 1701 and 1702 reverses, reversing the potentials upon the terminals 3 and 9, 4 and 11, and 1 and 12. The terminals 3, 1 and 12 are not utilized in the counters 348 through 353 but are utilized in binary counters or flip-flops in other parts of the system described above and as is hereinafter described. Since the unit 348 changes state, or reverses the conduction through tubes 1701 and 1702, upon one pulse and returns to its initial condition upon the second pulse and pulses are entered thereto at a rate of 600 per second, its cycle of operation is therefore 300 per second. The potentials upon the terminals 9, 4 and 11 of the binary counter 348 change back and forth at 300 cycles per second. The output terminal 9 of the counter 348 is connected to the input terminals 6 and 7 of the adjacent counter 349 so that the input pulses thereto are at 300 cycles per second. It takes two pulses to the counter 349, in a similar manner as described above in reference to counter 348, to provide one pulse or cycle therefrom. The potentials therefor upon terminals 9, 4 and 11 of counter 349 change at 150 cycles per second. Similarly, the output terminal 9 of each of the stages 349 through 352 is connected to the terminals 6 and 7 of its adjacent counter 350 through 353. The counter 350 operates at 75 cycles per second; the counter 351 at 37.5 cycles per second; the counter 352 at 18.75 cycles per second; and the counter 353 at 9.375 cycles per second. There is no connection from terminal 9 of the binary counter 353.

The terminals 4 and 11 of each of the binary counters are connected selectively to the left and right grids, respectively, of the double triode, cathode-follower tubes 341 through 346. The plates of the tubes 341 through 346 are connected to the +320 volt potential source 1770 through the 2500-ohm resistor 1771, and are at a potential of approximately 135 volts. The plates are also shunted to ground through the 40-microfarad capacitor 1772. The cathodes of the tubes 341 through 346 are individually connected through one of the twelve, 10,000-ohm resistors 1730 and the serially connected 2500-ohm resistor 1773 to the −320 volt potential source 1729. The resistor 1773 is shunted to ground through the 30-microfarad capacitor 1774. The junction of capacitor 1774 and resistor 1773 is at approximately −50 volts.

Figure 10:
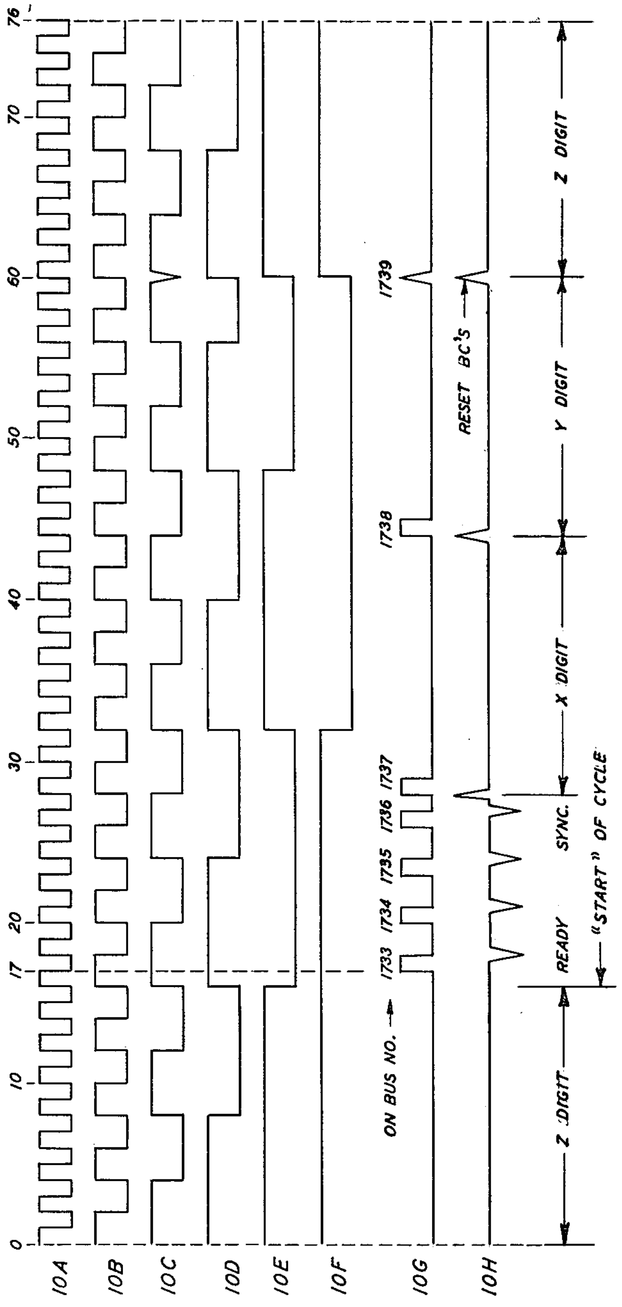
FIG. 10 is a series of curves illustrating the operation of the transmitter program generator of the present invention.

The terminals 4 and 11 of the binary counters 348 through 353 are alternatively positive at +44 volts, and negative at −18 volts at a rate varying from 300 to 9.375 cycles per second. One section of each tube 341 through 346 is conductive and the other is non-conductive depending upon the condition of its associated counters 348 through 353. The cathode of the conductive section in tubes 341 through 346 is positive and the cathode of the non-conductive section is negative. The curves 10*a* through 10*f* in FIG. 10 illustrate, respectively, the wave shape at the left cathode of the tubes 341 through 346. The wave shapes at the right cathodes are similar but opposite in phase. Each positive and negative pulse in curve 10*a* represents one time slot or one six-hundredths of a second. The timing of the cycle of operation including the ready, synchronizing, and data signals is shown at the bottom of FIG. 10. The entire cycle or sequence of operation is of sixty time slots or 600 milliseconds or one-tenth of a second.

The cathodes of tubes 341 through 346 are connected through selective groups of varistors or diodes 1740 through 1753 and 1810 through 1837 to selected ones of the bus bars 1733 through 1739 in the network 340. The bus bars 1733 through 1739 are connected to ground individually through the seven varistors 1840 and to the +320 volt potential source 1731 through the .3 megohm resistors 1732.

As long as one cathode of tubes 341 through 346, which is connected to a particular bus bar 1733 through 1739, is negative, the diode 1840 connected thereto will be of low impedance and the respective of the bus bars 1733 through 1739 will be at ground potential. For example, if the right cathode of tube 341 is negative the bus bars 1733 and 1735 remain at ground potential irrespective of the positive potentials upon the other cathodes of tubes 341 through 346 connected thereto. A positive potential upon a cathode of tubes 341 through 346 causes the diodes 1740 through 1753 and 1810 through 1837 connected thereto to be in their high impedance condition. When all the diodes 1740 through 1753 and 1810 through 1837, which are connected to one of the bus bars 1733 through 1739, are in their high impedance condition the potential upon the bus bars 1733 and 1739 in question becomes positive due to the connection to source 1731. The diodes 1840 become high impedance elements in such an event.

The bus bar 1733 is connected to the right cathodes of tubes 341 and 345 and the left cathodes of tubes 342, 343, 344 and 346. Referring to FIG. 10, the curves **10*a* through 10*f*, as described above, illustrate the potential condition upon the left cathodes of tubes 341 through 346, respectively. The potentials upon the right cathodes of tubes 341 through 346 are similar but opposite in phase. The cathodes of tubes 341 through 346 which are connected to bus bar 1733, as described above, are all positive for the first time at the commencement of the seventeenth pulse as shown by the dashed line in FIG. 10. The bus bar 1733 is, therefore, positive during the seventeenth pulse to the binary counter 348 providing a square-shaped signal of one time slot duration as shown in curve 10*g* in FIG. 10. By a similar choice of connections the bus bar 1734 provides a positive pulse at the count of twenty; the bus bar 1735 at the count of twenty-three; the bus bar 1736 at the count of twenty-six; the bus bar 1737 at the count of twenty-eight; the bus bar 1738 at the count of forty-four; and the bus bar 1739 at the count of sixty. At no other times or counts throughout the sequence of events does a positive pulse appear upon the bus bars 1733 through 1739**.

The square-shaped signals or pulses appearing upon bus bars 1733 through 1739 are separately differentiated, as is hereinafter described. The trailing edges of the pulses upon the bus bars 1733 through 1736 are utilized for the ready and synchronizing signals, and the leading edges of the pulses upon bus bars 1737 through 1739 are utilized for the three coordinate read-out pulses. The start of the data frame or sequence of operation occurs at the count of sixteen in the program generator cycle as shown on curve **10*h* in FIG. 10. Starting at the count of sixteen is an arbitrary designation in a continuous sequence of frames and allows the use of the third coordinate read-out pulse for resetting the binary counters 348 through 353** as in hereinafter described. The curve in FIG. 9 illustrating an idealized representation of a sample frame would start at the count of sixteen and end at the count of seventy-six.

Various connections are made from the bus bars 1733 through 1739 and from the left cathode of tube 343 to control the timing of the transmitter components.

The connection from the left cathode of tube 343 is to the count pulse generator 338 through lead 347. The generator 339 supplies pulses through lead 206 to the counting gate 205 described above. The lead 347 supplying pulses at 75 cycles per second is connected through the 1000-micro-microfarad capacitor 2340 and the 5100-micro-microfarad capacitor 2351 to the center winding of transformer 2353. The center winding of transformer 2353 is connected to the grid of triode 2360. The triode 2360 and transformer 2353 function as a blocking oscillator in a manner similar to the blocking oscillators in the pulse delay circuit 408 described above. The junction of capacitors 2340 and 2351 is connected to ground through the varistor 2352, through the varistor 2349 and the 7500-ohm resistor 2348 and through the 33,000-ohm resistor 2341. The junction between varistor 2349 is connected to the +320 volt potential source 2345 through the 91,000-ohm resistor 2346 which is shunted to ground by the .1 microfarad capacitor 2347. The center winding of transformer 2353 is connected to the −320 volt potential source 2344 through 1-megohm resistor 2350 and .3 megohm resistor 2343. The junction of resistors 2350 and 2343 is connected to ground through the 24,000-ohm resistor 2342. The varistor 2352 effectively short-circuits negative pulses to ground and the varistor 2349 by its connection to source 2343 limits the magnitude of the positive pulses applied to the grid of tube 2360 to prevent overloading. The plate of tube 2360 is connected through the left winding of transformer 2353 to the +320 volt potential source 2356 through the .11 megohm resistor 2357 and to ground through the 22-megohm resistor 2358 and the .1 microfarad capacitor 2359. The cathode of tube 2360 is connected to ground through the parallel circuit comprising the .047 microfarad capacitor 2362 and 15,000-ohm resistor 2361. A sharp positive output pulse is provided from the grounded right winding of transformer 2353 through the parallel circuit consisting of the 1300-ohm resistor 2355 and the 470-micro-microfarad capacitor 2354 to lead 206 described above. The lead 206 is connected to the counting gates 205 in each of the encoders 117, 118 and 119.

Figure 17:
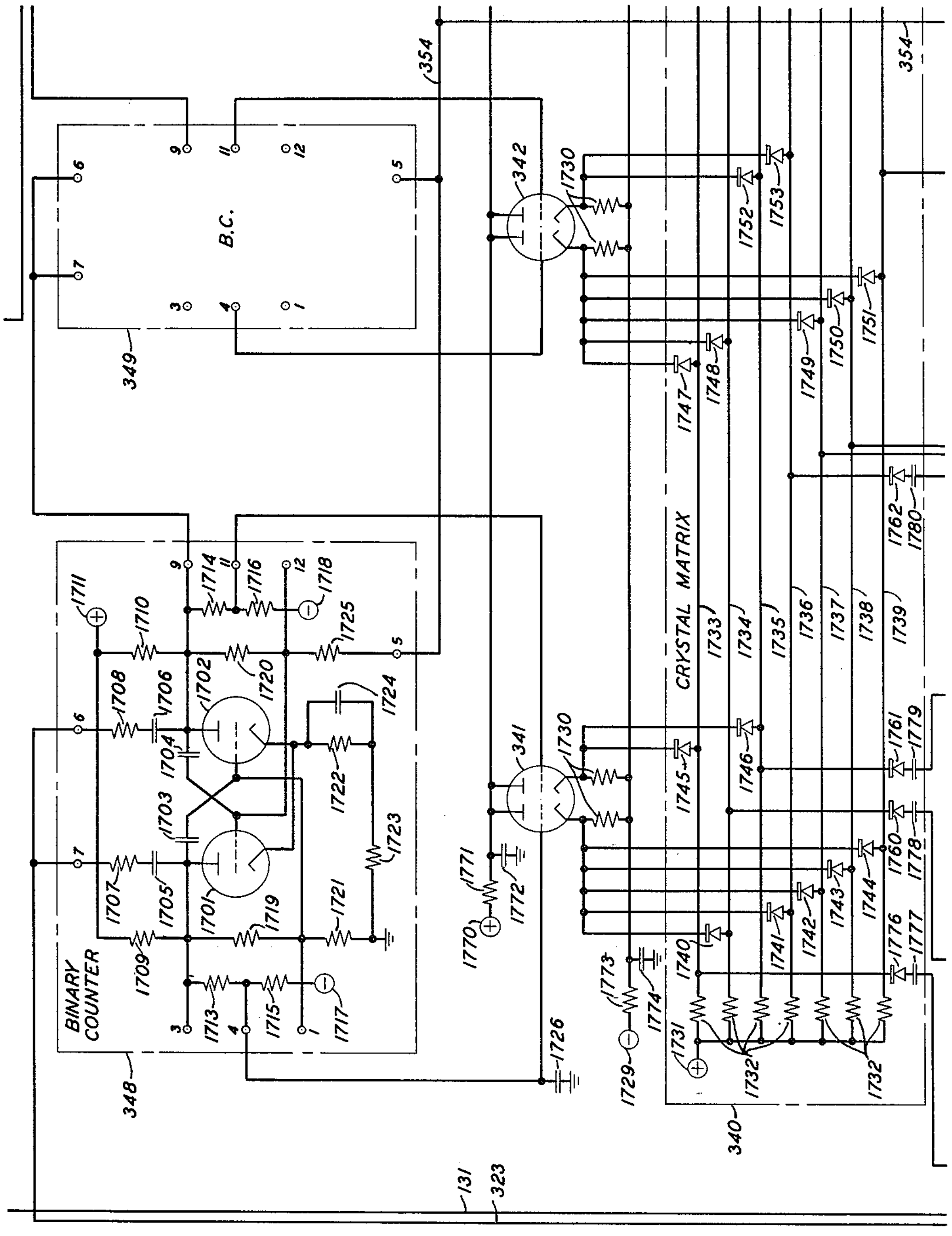
Figure 18:
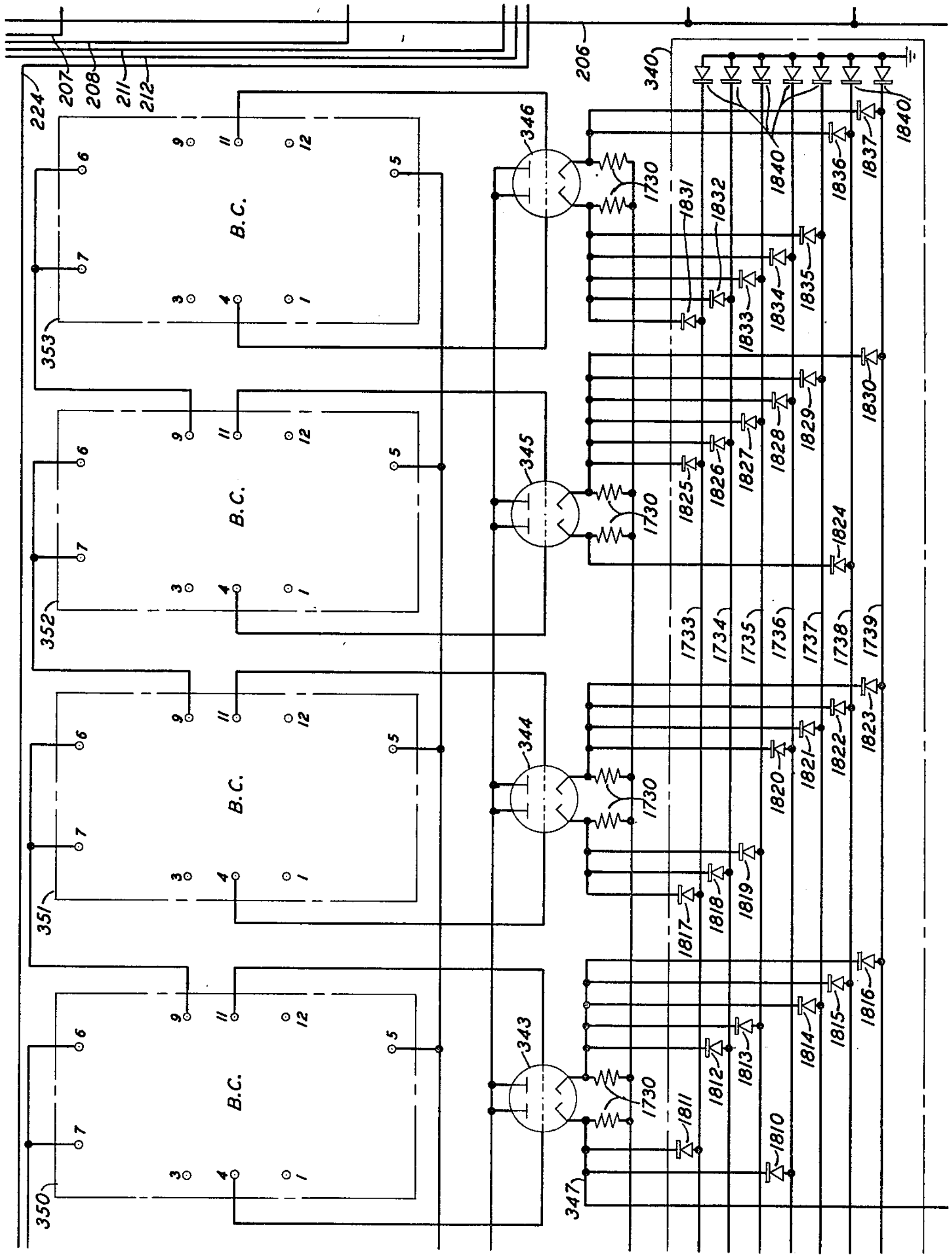

As briefly described above, the bus bars 1733 through 1739 in the frame timing circuit shown in FIGS. 17 and 18 are connected to the associated transmitter components controlling their sequences of operation therein.

The bus bar 1733, which provides a positive pulse at the count of seventeen, as described above, is connected through the varistor 1776 and the 160-micro-microfarad differentiating capacitor 1777 to terminal 1 of the flip-flop 335. The flip-flop 335 is similar to the counters 348 through 353 described above. Due to the effect of varistor 1776 and capacitor 1777 a sharp negative pulse is provided upon the count of eighteen upon the reduction of the positive potential upon bus bar 1733 as shown on curve **10*h* in FIG. 10. The varistor 1776 blocks a positive pulse to hte flip-flop 335 and the negative pulse at terminal 1 of flip-flop 335 sets the flip-flop 335 to provide a relatively positive potential upon its terminal 9 as described above in reference to counter 348. The positive potential upon terminal 9 of counter 335 is connected through the cathode follower 331, lead 325 and shaper 312, similar to the cathode follower 330 and shaper 305 described above, to the modulator 313 which commences the ready signal. The positive-shaped pulse to modulator 313 is terminated by the effect of the positive pulse upon bus bar 1734 described above. Bus bar 1734 is connected through varistor 1760 and the 160-micro-microfarad capacitor 1778 to terminal 12 of the flip-flop 335. A negative pulse is provided in this manner to terminal 12, upon the count of twenty-one, to reset the flip-flop 335 and terminate the positive pulse from terminal 9 to the cathode follower 331. The controlling positive potential upon terminal 9 of flip-flop 335 therefore has a duration of three time slots; from the count of eighteen when a pulse is entered to its terminal 1 to the count of twenty-one when a pulse is entered to its terminal 12. The cathode follower 331 provides for an impedance transformation of isolation circuit and the shaper 312 rounds the square corners of the three time slot pulses. The ready signal provided by the modulator 313 as controlled by the pulse from flip-flop 335** has a duration of three time slots, or 5 milliseconds, as shown in FIG. 9.

The 1700-cycle signal is provided to the modulator 313 through a lead 326 from the 1700-cycle oscillator 332. The lead 326 is connected through the 1-microfarad capacitor 2124 to the right cathode of the double triode 2123 in the oscillator 332. The anodes of tube 2123 are connected to the +210 volt potential source 2122 and the cathodes are connected to ground through the 24,000 and 10,000-ohm resistors 2127 and 2126, respectively. The left cathode of tube 2123 is connected through the 51,000-ohm resistor 2128 to the shaper network 2130. The shaper network 2130 comprises two inductors 2180 and 2183 which are shunted by the capacitor 2182. The shaper network 2130 is connected to the grids of tube 2123 through the .1 microfarad capacitor 2100 and the 1-megohm resistor 2129 and 1500-micro-microfarad capacitor 2125, respectively. The left grid is connected to ground through the 1-megohm resistor 2121 and the 10,000-ohm resistor 2120, and also to the +320 volt potential source 2116 through the 10,000-ohm resistor 2110 and the .11 megohm resistor 2117. The junction of resistors 2117 and 2119 is connected to the right grid of tube 2123 through the 1-megohm resistor 2118.

The circuit parameters in the 1700-cycle-per-second oscillator 332, as described above, provide for an alternating potential through the capacitor 2124 to lead 326. The frequency provided by the oscillator 322 is not critical since none of the timing functions depends thereon as on the 1200-cycle-per-second oscillator 356, described above.

Figure 19:
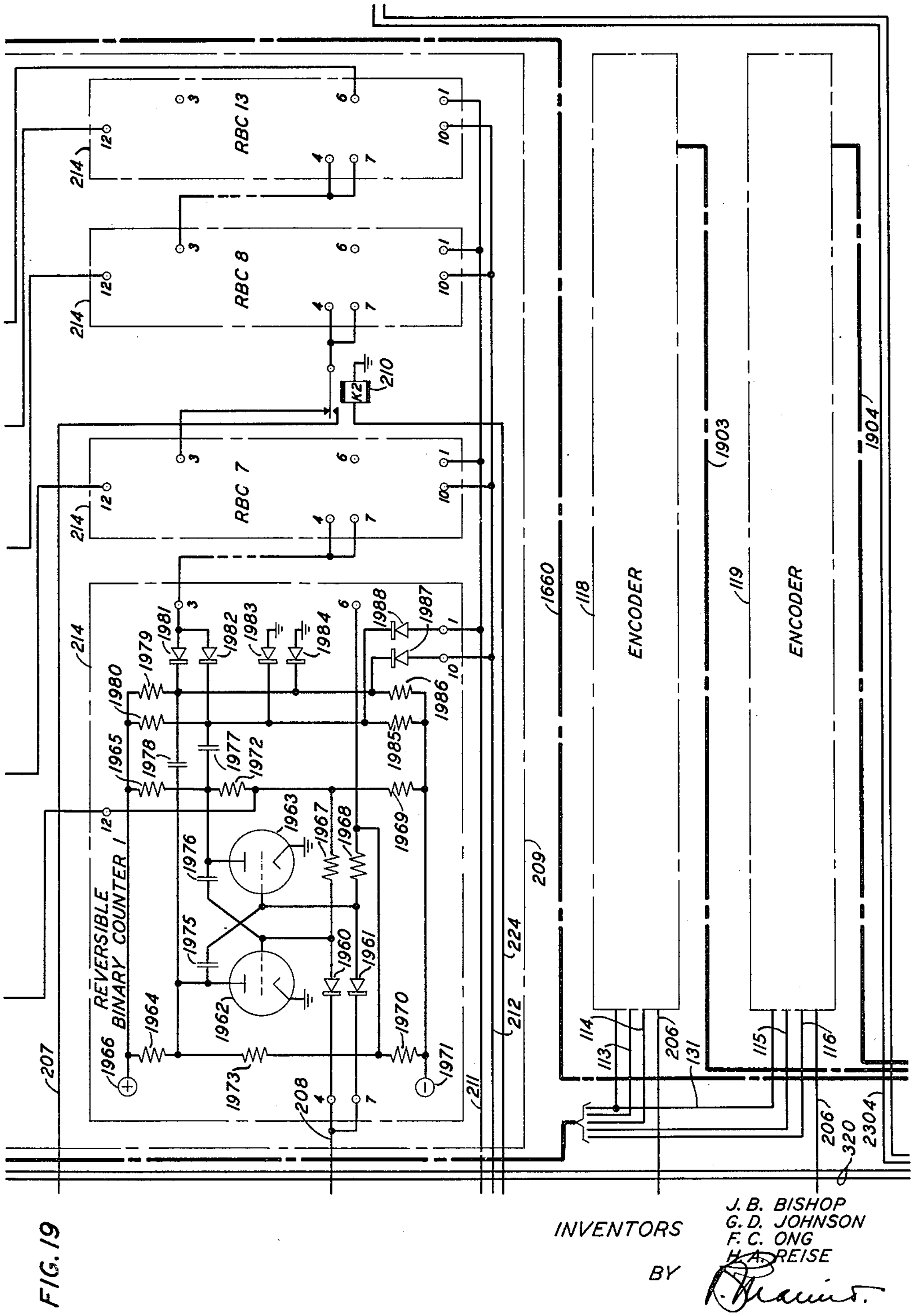
Figure 20:
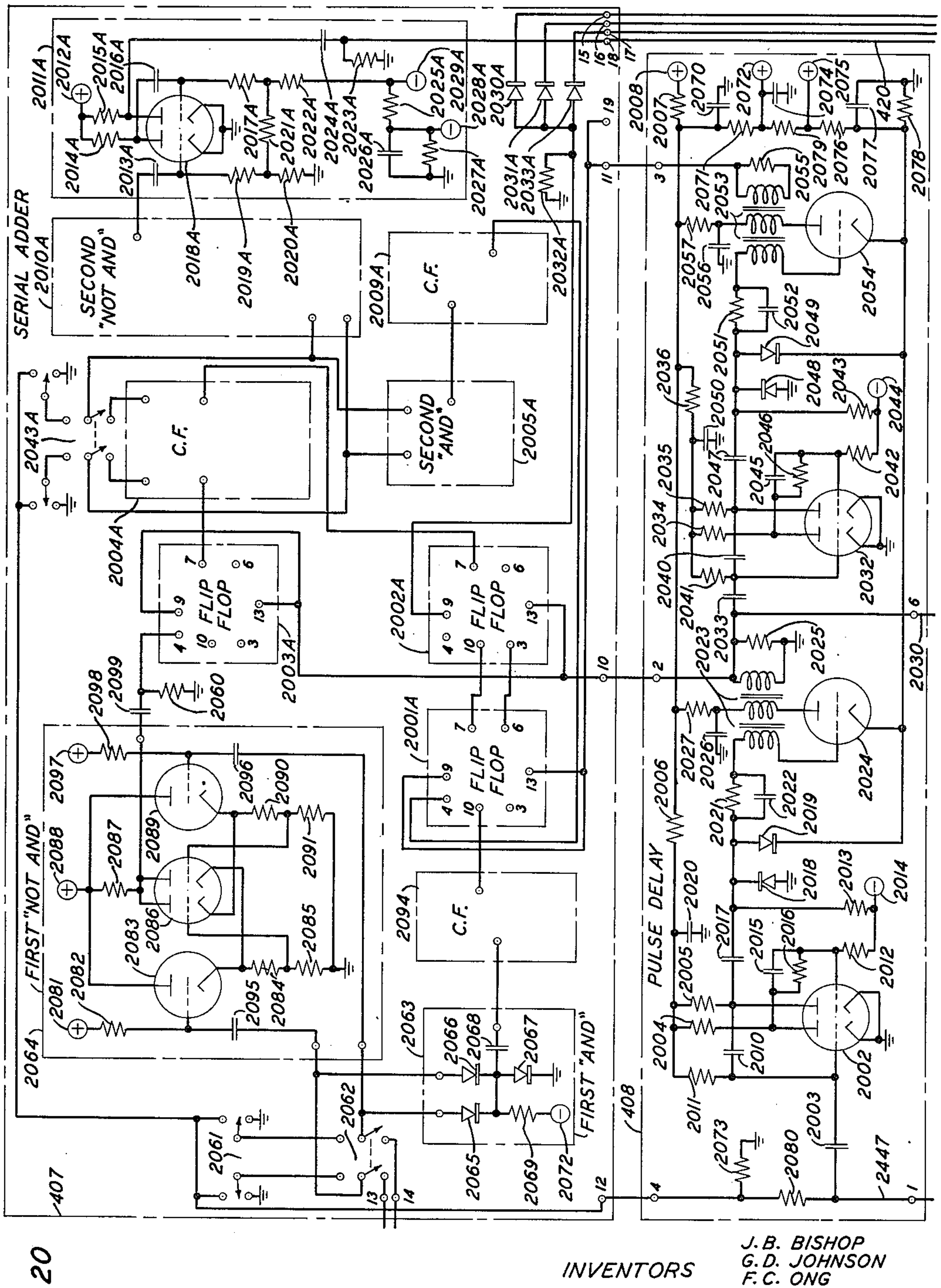
Figure 21:
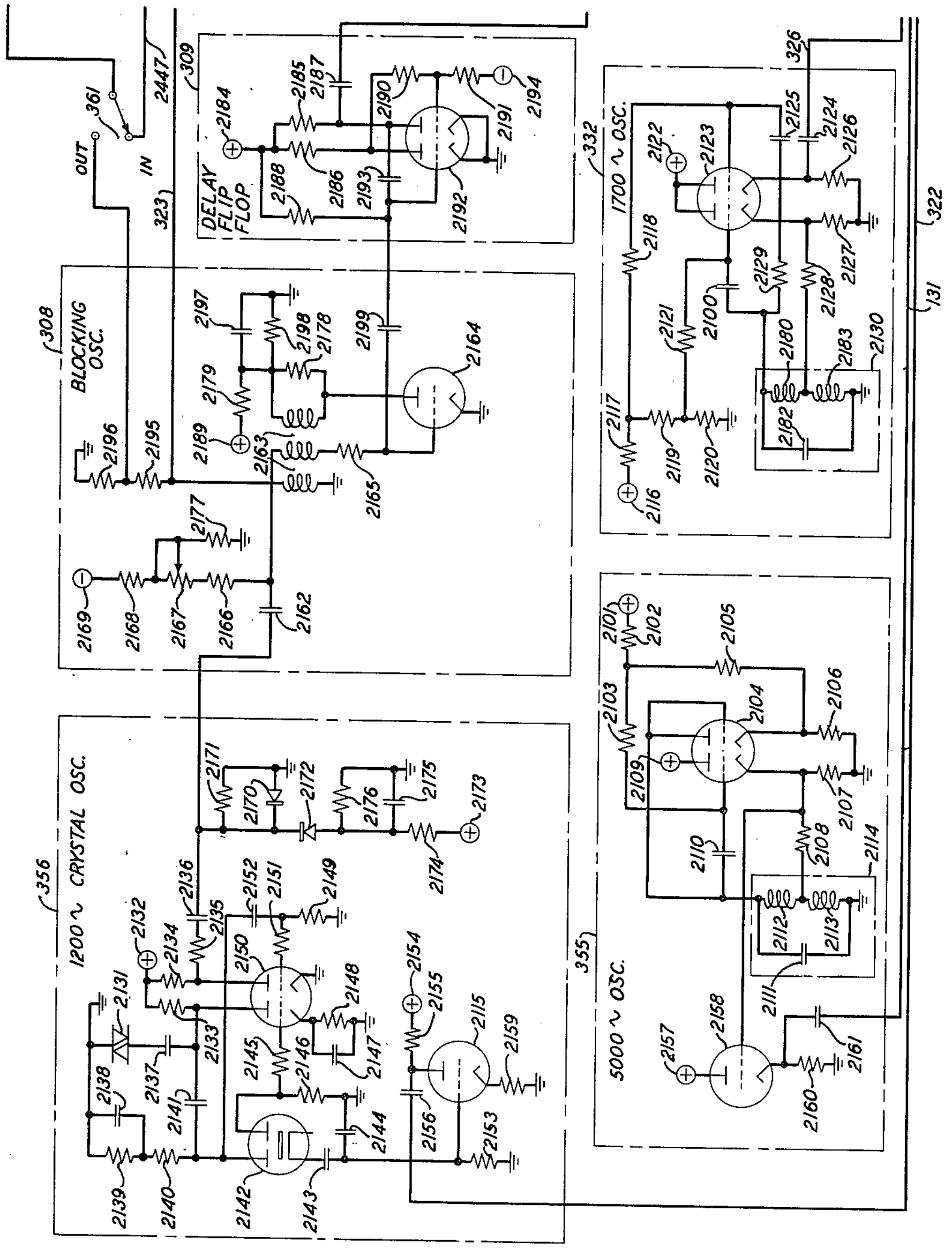
Figure 22:
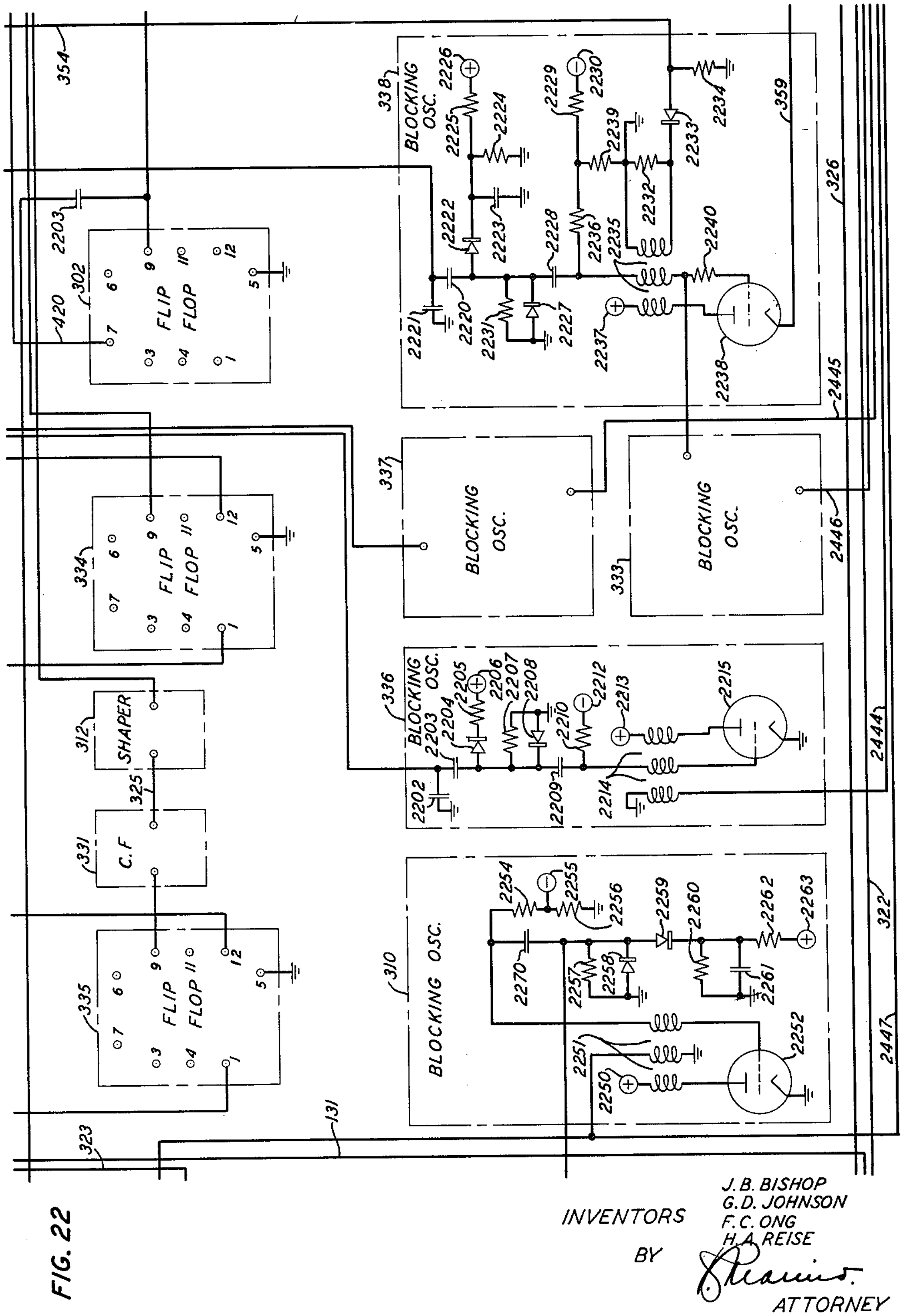

The connection from the bus bars 1735 and 1736 in the frame timing section shown in FIGS. 19 and 20 controls the timing of the synchronizing pulse shown in FIG. 9 and described above. The bus bar 1735 becomes positive at the count of twenty-three and the bus bar 1736 becomes positive at the count of twenty-six. The bus bars 1735 and 1736 are connected respectively through varistor 1761 and 160-micro-microfarad capacitor 1779 and varistor 1762 and 160-micro-microfarad capacitor 180 to the terminals 1 and 12 of the synchronizing flip-flop 334. The trailing edges of the positive pulses upon bus bars 1735 and 1736 provide a negative pulse to the terminals 1 and 12 of flip-flop 334 as shown for curves 10*g* and 10*h* in FIG. 10. The flip-flop 334 therefore provides a positive pulse through its terminal 9 to the cathode follower 330 described above. The cathode follower 330 is connected through lead 325 and shaper 305 to the modulator 306 also described above. The modulator 306 is controlled in this manner to provide a synchronizing 1200-cycle-per-second signal of 5 milliseconds or three time slots duration.

The connection from bus bars 1737 through 1739 provide, as is hereinafter described, for the three coordinate read-out pulses described above. The bus bars 1737, 1738 and 1739 are connected directly to the blocking oscillators 336, 337 and 338. The blocking oscillator 336 provides for the first or the X coordinate read-out pulse to lead 2444; the blocking oscillator 337 provides for the second or Y coordinate read-out pulse to lead 2445 and the blocking oscillator 338 together with the blocking oscillator 333 provides for the third or Z coordinate read-out pulse to lead 2446. The four blocking oscillators 336, 337, 338 and 333 operate in a manner similar to the count pulse generator 339, described above, or to the blocking oscillators in the pulse delay circuit 406, also described above, and also to the blocking oscillator 308 described above.

The bus bar 1737 is connected through the 2700-micro-microfarad capacitor 2203 in the blocking oscillator 336 to the +320 volt potential source 2206 through the varistor 2204 and the 19,000-ohm resistor 2205. The connection through varistor 2204 to the source 2206 limits the magnitude of the positive pulse through the capacitor 2203. The connection from bus bar 1737 is also connected to ground through the 680-micro-microfarad capacitor 2202. The capacitor 2203 is connected to ground through the parallel circuit comprising the varistor 2208 and the 33,000-ohm resistor 2207. The varistor 2208 is poled so as to short-circuit the negative pulses' potentials from the bus bar 2737 to ground. The capacitor 2203 is also connected through the 1000-micro-microfarad capacitor 2209 to the center winding of the three-winding transformer 2214. The right winding of transformer 2214 connects the plate of the triode 2215 and the +210 volt potential source 2213. The cathode of tube 2215 is grounded and the grid is connected to the central winding of the transformer 2214. The output of the blocking oscillator 336 is provided from the left winding of the transformer 2214 to lead 2444, described above. The bus bar 1737 becomes positive at the count of twenty-eight and provides a positive pulse to the blocking oscillator 336 which in turn provides a positive pulse referred to above as the X read-out pulse, to the lead 2444, as shown on curves 10*g* and 10*h* in FIG. 10 at count twenty-eight. The negative pulse provided by the trailing edge of the pulse on the bus bar 1735 is not effective, being short-circuited to ground through varistor 2208. At the count of twenty-eight, therefore, the positive read-out pulse is provided by the blocking oscillator 3336 through lead 2444 to the X coordinate read-out gates 401, described above.

At the count of forty-four, bus bar 1738 becomes positive and causes the blocking oscillator 337 which is similar to the blocking oscillator 336 to provide a positive pulse through lead 2445 to the Y coordinate read-out gates 402. The bus bar 1739 becomes positive as described above on the count of sixty and causes the Z read-out pulse to be generated to lead 2446 to the Z coordinate read-out gates 403, but in a more indirect manner than that described above in reference to the X and Y coordinate read-out pulses. The increase in potential upon the bus bar 1739 triggers the blocking oscillator 338 which is generally similar to the blocking oscillator 336; the components 2220 through 2231 being essentially similar to corresponding components in blocking oscillator 336. The left-hand winding of transformer 2235 is connected to the potential source 2237 whereas the right-hand winding of the transformer 2214 is connected to the source 2213. The output to the blocking oscillator 336 is taken from the right winding which is shunted by the resistor 2232. The center winding of the transformer 2235 is connected to the grid of tube 2238 through the 510-ohm resistor 2240. The output of the blocking oscillator 338 is connected from the junction of the center winding of transformer 2235 and resistor 2240 to blocking oscillator 333. An output is also provided from the right winding of transformer 2235 through the varistor 2232 to lead 354. The lead 354 is connected to the terminals 5 of the binary counters 348 through 353, described above. Terminal 5 in the binary counter 348, for example, is connected through the .22 megohm resistor 1725 to the grid of tube 1701. A negative pulse provided from the blocking oscillator 338 resets the binary counters 348 through 353 to begin the counting sequence as described above. The positive pulse from the junction of resistor 2240 and center winding of transformer 2235 triggers the blocking oscillator 333 providing additional delay for the Z read-out pulse to lead 2446. The blocking oscillator 333 is similar to the blocking oscillator 336 described above.

The cathode of tube 2238 in oscillator 338 is connected to lead 359 to the cathode of tube 2360 in the blocking oscillator or generator 339 described above. The pulse from the blocking oscillator 338 to the generator 339 exercises an inhibiting function by momentarily raising the cathode voltage of tube 2360. A count pulse cannot be generated therefore at the same instant that the Z data is being read out. In each data frame, therefore, one of the counting pulses is suppressed to prevent interference with the Z read-out operation.

In this manner, the binary counters 348 through 353, which are actuated by the 600-cycle-per-second pulse from the blocking oscillator 308, provide for a series of pulses to control the operation of the various components in the transmitter. The potentials provided on the bus bars 1733 and 1734 control the ready signal, potentials provided upon the bus bars 1735 and 1736 control the synchronizing signal, the potentials provided on bus bars 1737, 1738 and 1739 control the X, Y and Z read-out pulses, and the pulses provided from the left cathode of tube 343 provide for the counting pulses to the decoders 117, 118 and 119.

The program generator 300 has three oscillators; the 1200-cycle oscillator 356, the 1700-cycle oscillator 332, and a 5000-cycle oscillator 355. The function of the oscillators 356 and 332 has been described above and the oscillator 355 provides the 5000-cycle tone through lead 131 to the modulator 129 and amplifier clipper 141 as described above. The 1200-cycle oscillator 356 in addition to the functions described performs the function of providing for the digit pulses, described above, which control the operation of the shift registers 405 and 412 and the serial adder 407. The oscillator 356 is connected to the blocking oscillator 308 through the lead 321 which is triggered by every second input pulse thereto to act as a frequency halver. The 600 pulses per second from the blocking oscillator 308 are coupled to the blocking oscillator 310 through the delay flip-flop circuit 309. The delay flip-flop circuit 309 is a single cycle multivibrator having a period of 100 microseconds which produces positive triggering pulses. The positive pulses trigger the blocking oscillator 310 which in turn generates the digit pulses which are used in the digital operations described above. The digit pulses are also connected to the binary counter 302 through switch 361 to reset the unit 302 to zero before each of the sum output pulses arrive through lead 420 from the serial adder 407. When digital parallax corrections are not utilized the switch 361 is positioned to the left.

The 600-cycle-per-second pulse from the blocking oscillator 308 is connected to the left grid of the tube 2192 in the delay circuit 309. The cathodes of tube 2192 are connected to ground and the anodes are connected through the 16,000-ohm resistors 2185 and 2186 to the +210 volt potential source 2184. The source 2184 is also connected to the left grid of tube 2192 through the 1.1-megohm resistor 2188. The left plate of tube 2192 is connected through the 75,000-ohm resistor 2190 to the right grid thereof and also to the −320 volt potential source 2194 through the .24 megohm resistor 2191. The input from the oscillator 308 is coupled through the 180-micro-microfarad capacitor 2193 to the left plate. The delayed output is supplied from the left plate of tube 2192 through the 100-micro-microfarad capacitor 2187 to the blocking oscillator 310.

The blocking oscillator 310 is essentially similar to the blocking oscillators 336, 337 and 333, described above, having a three-winding transformer 2251 and a triode 2252. The input from the delay flip-flop 309 is coupled through the 1000-micro-microfarad capacitor 2270 to the right winding of transformer 2251 which is also connected to the voltage divider comprising the .22 megohm resistor 2254 and the 24,000-ohm resistor 2256. The junction of resistors 2254 and 2256 is connected to the −320 volt potential source 2255. The input pulses are controlled by the connections to ground through varistor 2258 shunted by the 33,000-ohm resistor 2257 and to the +320 volt potential source 2263 through varistor 2259 and the 91,000-ohm resistor 2262. The junction of varistor 2259 and resistor 2262 is connected to ground through the parallel circuit comprising the .1 microfarad capacitor 2261 and the 7500-ohm resistor 2260. The cathode of tube 2252 is grounded and the anode is connected through the left winding of transformer 2251 to the +210 volt potential source 2250. The output from the blocking oscillator 310 is taken from the center winding to lead 2447 described above. This output comprises the digit pulses described above.

The data frame comprising the ready, synchronizing, and data digit pulses as described above is amplified through the output amplifier 307 and connected by means of line 320 to the receiver shown in FIGS. 28 through 34.

Figure 28:
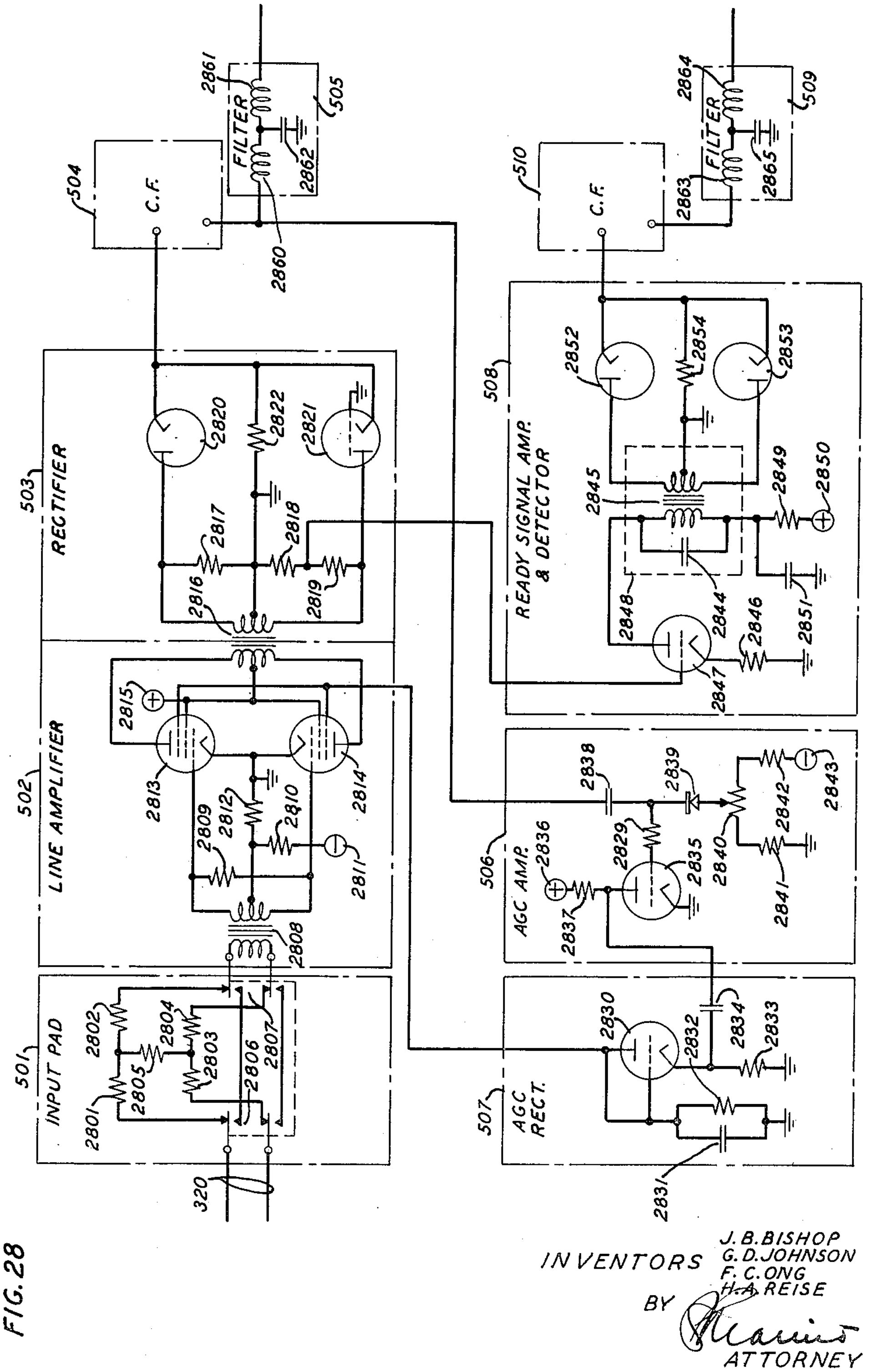
Figure 29:
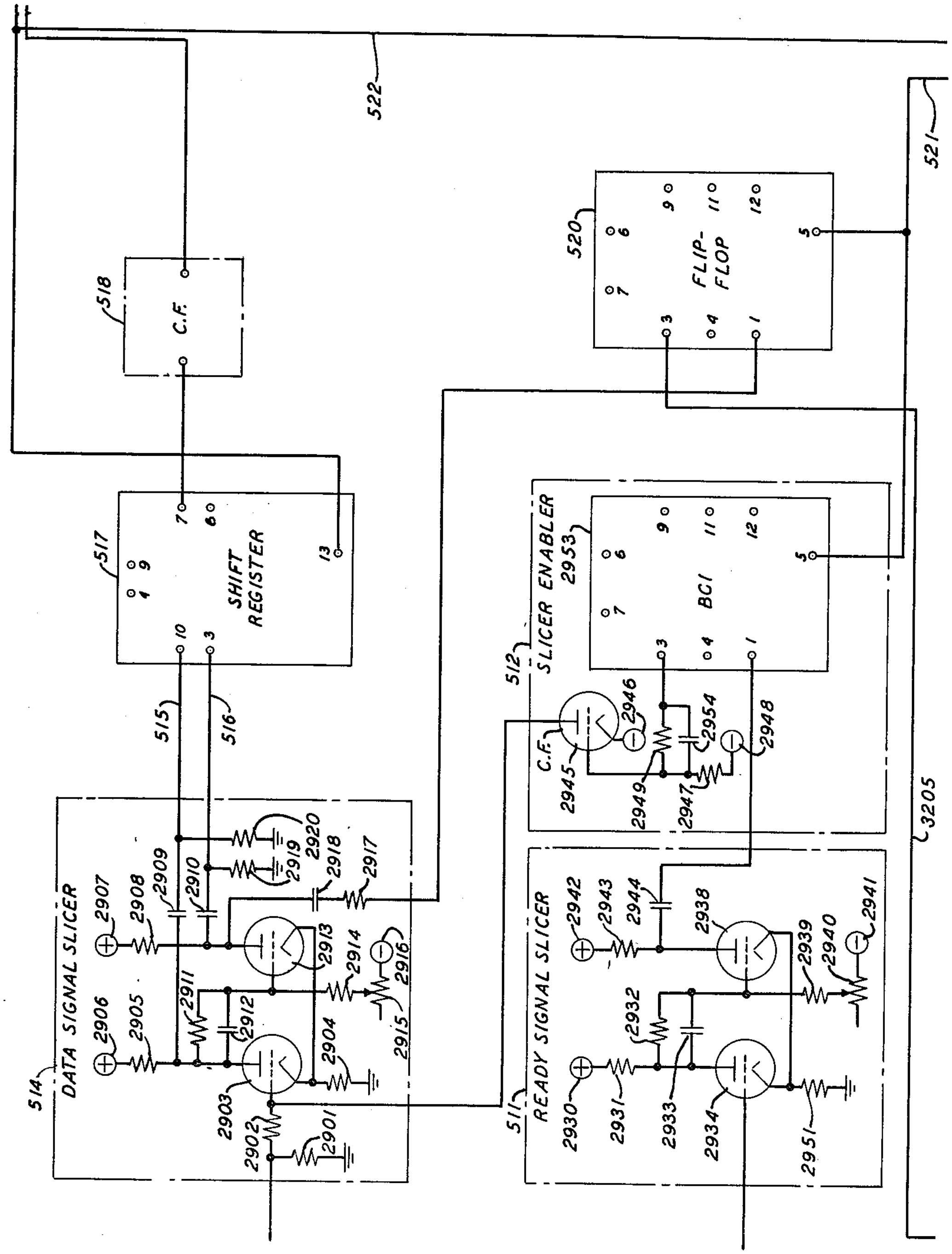
Figure 30:
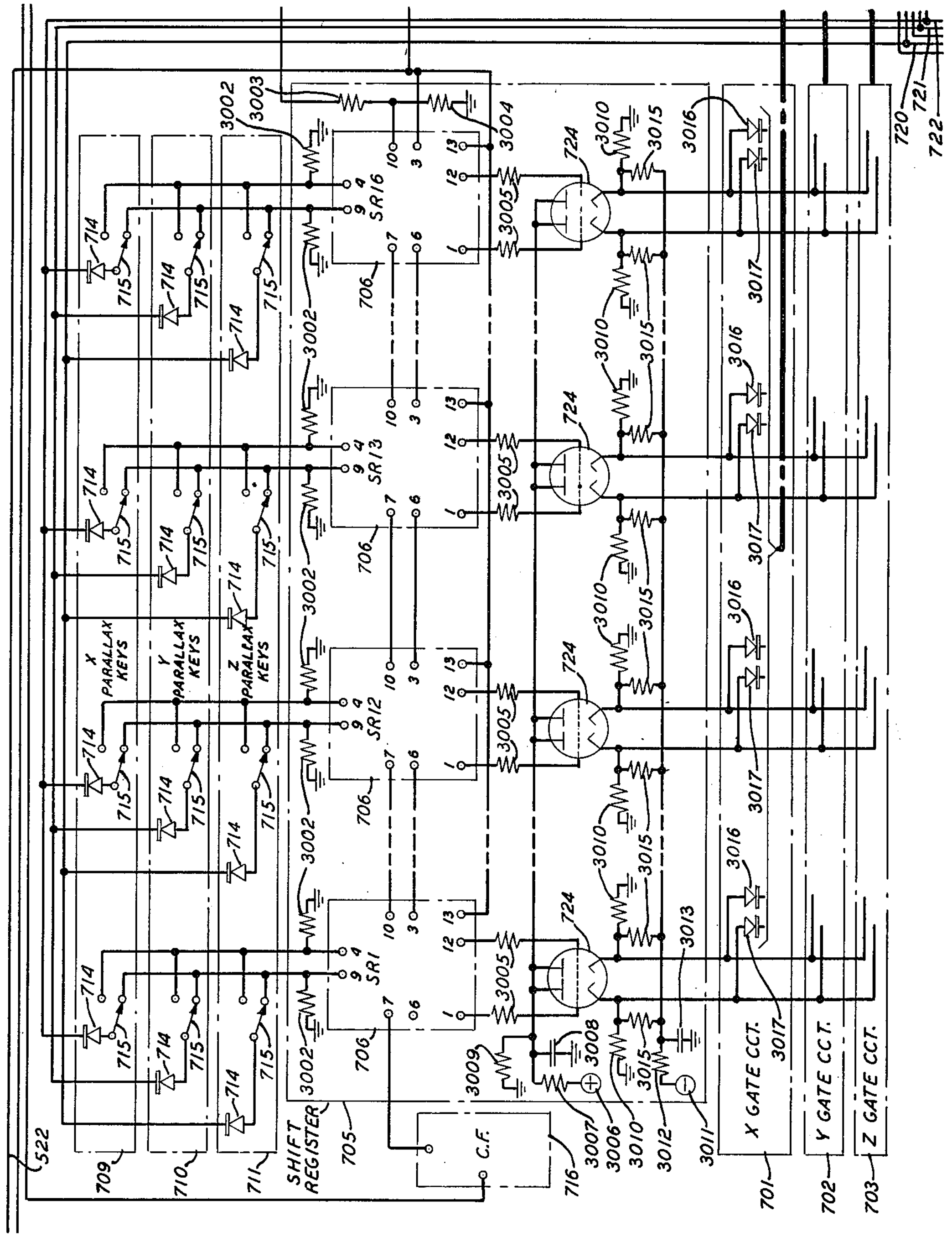
Figure 31:
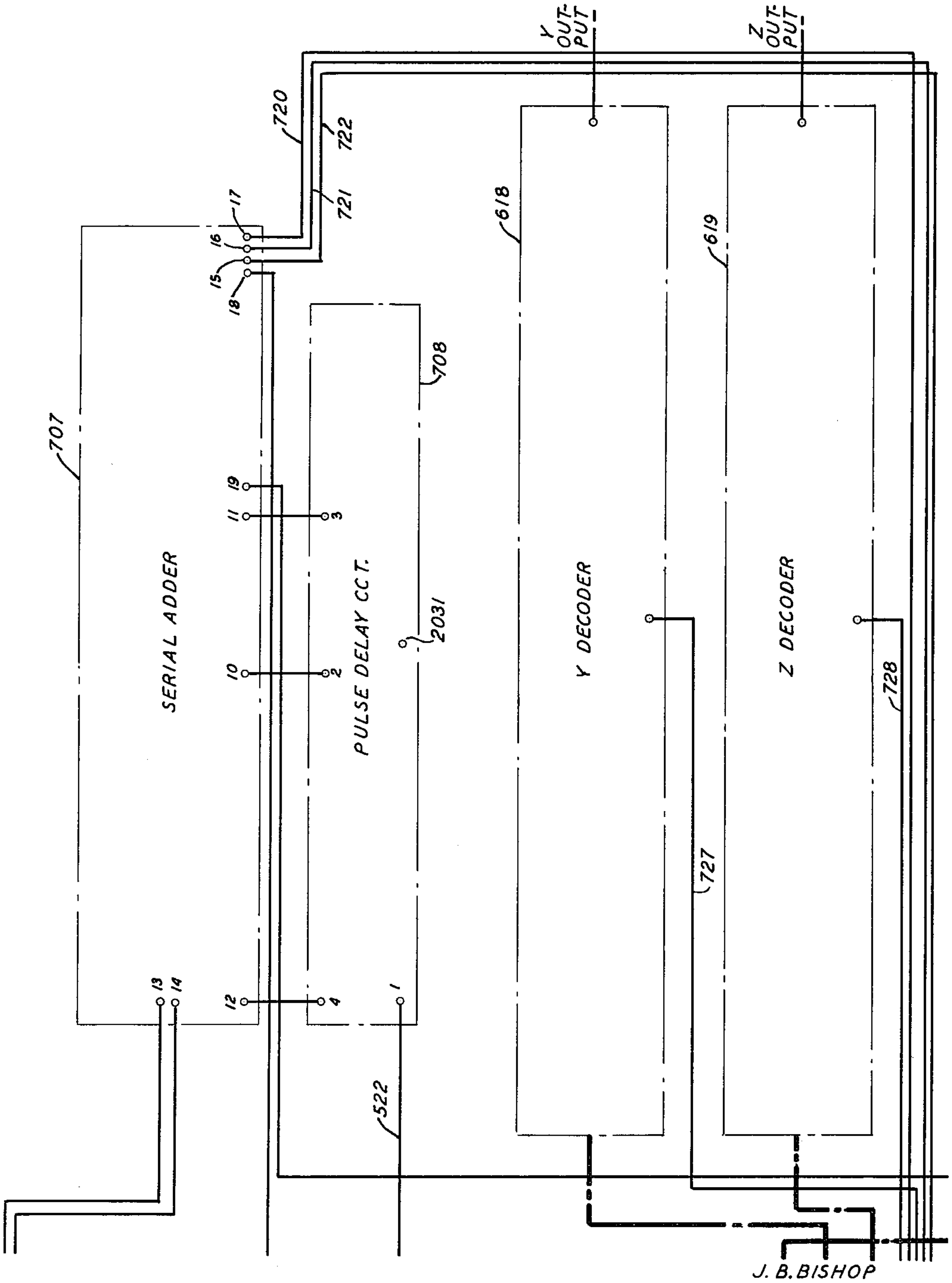
Figure 32:
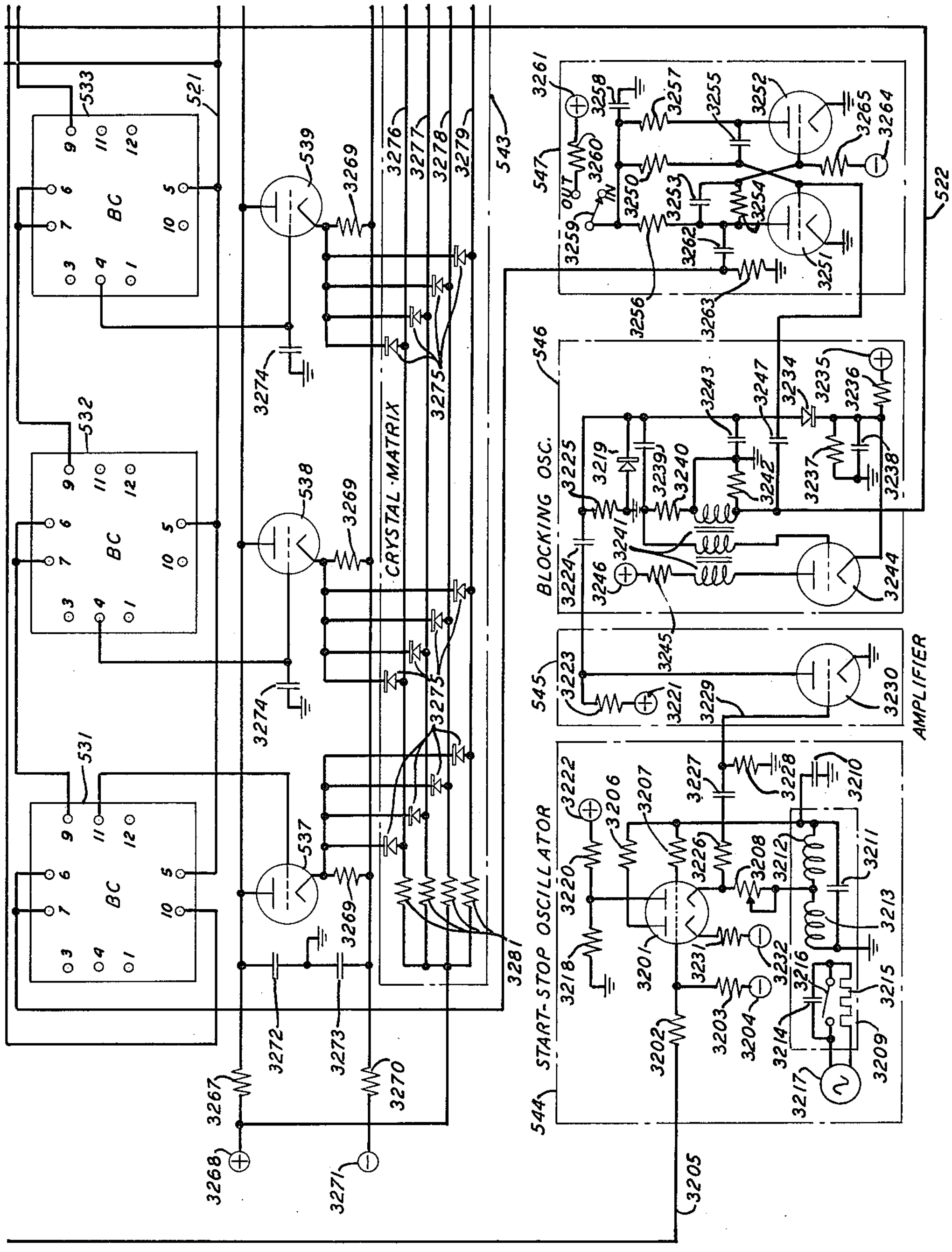
Figure 33:
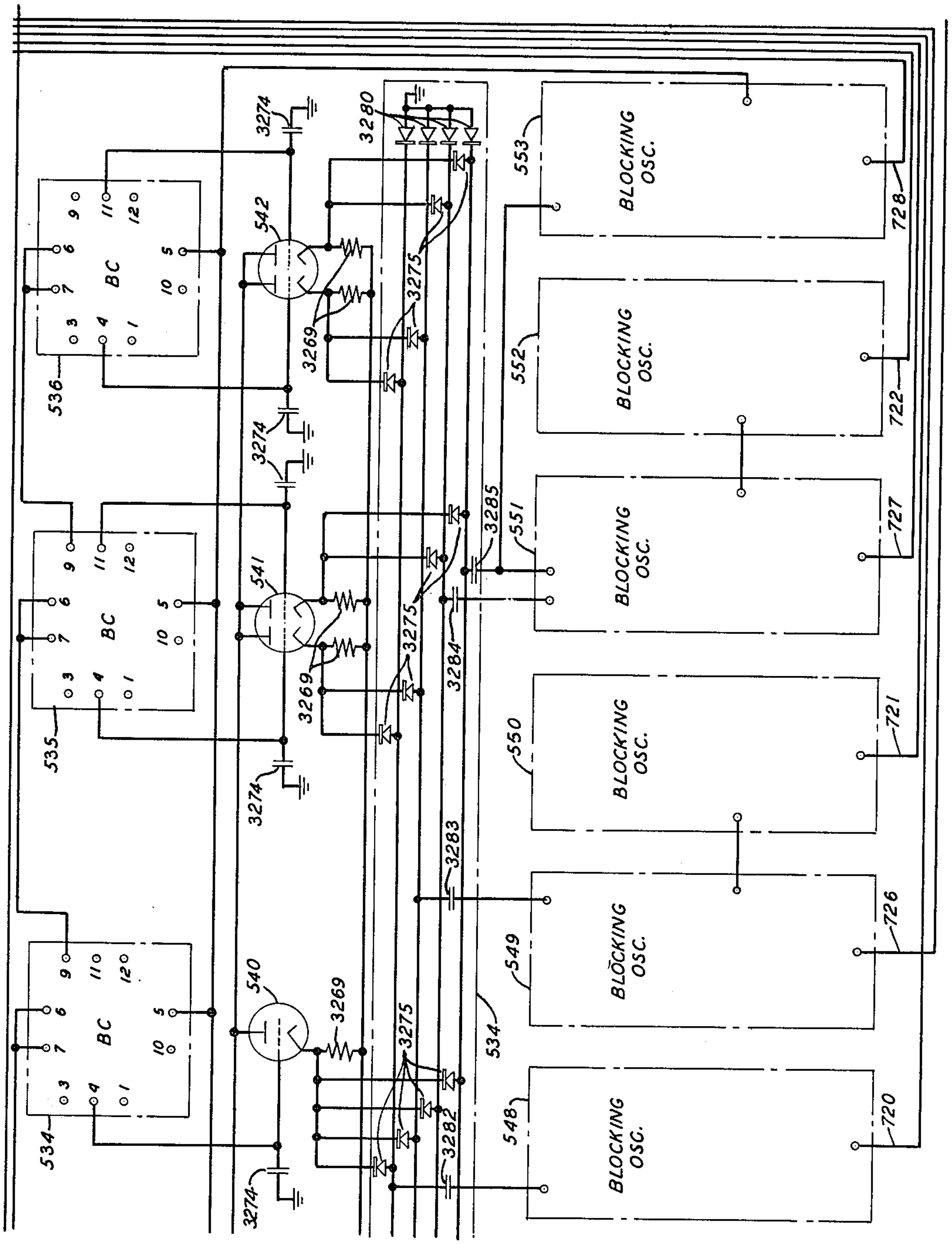

The line 320 may be connected to any number of receivers, not shown, supplying the data frame intelligence, described above, thereto. In the specific embodiment of the present invention the line 320 from the transmitter is connected to the receiver line amplifier and detector section 500 which is shown in FIGS. 28 and 29. The receiver of the specific embodiment of the present invention is shown in FIGS. 28 through 34 with FIGS. 28 and 29 as described above showing the line amplifier and detector 500. The function of section 500 is to accept all the tone spurts from line 320 including the ready and synchronizing signals and convert them into square-topped direct-current pulses which are connected to and activate the rest of the receiver.

The line 320 is connected through the switch contacts 2806 in the input pad 501. The input pad 501 is a 15-decibel pad which may be removed if the signal level is too low and which consists of five 220-ohm resistors 2801 through 2805. The resistors 2802 and 2804 are connected through the contacts 2807 to a gain control amplifier 502. The contacts 2806 and 2807 may be actuated simultaneously by means not shown which can be either manual or automatic to short circuit the resistors 2801 through 2805 when the signal level is low. The line signals through the pad 501 are applied to the push-pull line amplifier 502 through the transformer 2808. The secondary of transformer 2808 is connected to the control grids of the high gain pentodes 2813 and 2814 and is shunted by the .27 megohm resistor 2809. The center tap of the secondary of transformer 2808 is connected to the −320 volt potential source 2811, through the .22 megohm resistor 2810, and to ground through the 2200-ohm resistor 2812. Operating grid bias for the tubes 2813 and 2814 is supplied by the voltage divider consisting of the resistors 2810 and 2812. The amplifier 502 has a wide range of automatic gain control due to the connection of the suppressor grids of the tubes 2813 and 2814 to the automatic gain control rectifier 507 hereinafter described. The screen grids of tubes 2813 and 2814 are connected to the +150 volt potential source 2815 and the output or anodes of tubes 2813 and 2814 are connected to the opposite sides of the primary of transformer 2816, the center tap of which is connected to the screen grids of tubes 2813 and 2814. The amplified output from the push-pull amplifier 502 is coupled through the transformer 2816 to the data detector or rectifier 503.

The rectifier 503 is a balanced double diode rectifier which provides full wave rectification. The rectifier 503 comprises two diodes 2820 and 2821, the anodes of which are connected to opposite sides of the secondary of transformer 2816 and the cathodes of which are connected together and to ground through the 1-megohm resistor 2822. The center tap of the secondary of transformer 2816 is also grounded and each half thereof is shunted by a 2-megohm resistance; the upper half by the 2-megohm resistor 2817; and the lower half by the .2 megohm resistor 2818 and the 1.8 megohm resistor 2819. The junction of resistors 2818 and 2819 is connected to the ready signal amplifier 508 which is hereinafter described. The cathodes of the diodes 2820 and 2821 provide the full wave rectifier output to the cathode follower 504.

Shown as curve 11*a* in FIG. 11, the output of the line amplifier 502 is similar to the idealized wave shape shown in FIG. 9 which illustrates the transmitter output and consists of spurts of alternating current comprising the 1700-cycle ready signal, the 1200-cycle synchronizing signal and the 1200-cycle digit spurts. The 1700-cycle tone is picked off from the data detector 503 at the junction of resistors 2818 and 2819 before it is recified by means of the amplifier 508. The 1200-cycle spurts of tone including the synchronizing signal are coupled from the data detector 503 through the cathode follower 504 and the shaper or filter 505. A positive pulse to the cathode follower 504 from the data detector 503 transmits a positive pulse to the filter 505 and thence to the automatic gain control amplifier 506 to which the cathode follower 504 is also connected. The gain control for the amplifier 502 is provided over a control path through the rectifier 503, cathode follower 504, the amplifier 506 and the rectifier to the suppressor grids of tubes 2813 and 2814 in the amplifier 502.

The positive pulse from the cathode follower 504 to the amplifier 506 is coupled to the control grid of the triode 2835 through the 1000-micro-microfarad capacitor 2838 and the .82 megohm resistor 2829. The cathode of tube 2835 is grounded and the plate is connected to the +320 volt potential source 2836 through the .1 megohm resistor 2837. The junction of the capacitor 2838 and the resistor 2829 is connected through the negatively poled varistor 2839 to the variable contact of the 15,000-ohm potentiometer 2840. The potentiometer 2840 is connected to ground through the 1000-ohm resistor 2841 and to the −320 volt potential source 2843 through the .178 megohm resistor 2842. The magnitude of the negative pulses coupled to the control grid of tube 2835 is limited by the connection through the varistor 2839 to a potential as determined by the potentiometer 2840. The output from the automatic gain control amplifier 506 is rectified by the automatic gain control rectifier 507 and returned to the gain control amplifier 502 described above to provide for wide range gain control.

The plate of tube 2835 in amplifier 506 is coupled through the 1000-micro-microfarad capacitor 2834 to the cathode of the triode 2830. The cathode of triode 2830 is also connected to ground through the .1 megohm resistor 2830. The grid and plate of triode 2830 are connected together and to ground through the parallel circuit comprising the 2-microfarad capacitor 2831 and the 1-megohm resistor 2832. The capacitor 2831 and resistor 2832 smooth the rectified signal through tube 2830 to the amplifier 502. A negative pulse to the rectifier 507 from the amplifier 506 provides an output to the suppressor grids of tubes 2813 and 2814 in amplifier 502 from the plate of tube 2830 but a positive pulse applied to the cathode of tube 2830 does not cause a change of potential upon the plate thereof and thus no change in potential upon the suppressor grids of tubes 2813 and 2814.

The cathode follower 504 as described above is connected to the filter 505 as well as the automatic gain control amplifier 506. The filter 505 comprises two 3-henry serially connected inductors 2860 and 2861. The junction of inductors 2860 and 2861 is coupled to ground through the .1 microfarad capacitor 2862. The filter 505 allows the 1200-cycle spurts of tone in the input signal from the transmitter to pass therethrough but filters out or blocks the 1700-cycle ready signal. The 1700-cycle tone ready signal as described above was picked off from the junction of resistors 2818 and 2819 in the data detector 503 by the connection to the reader amplifier detector 508. The junction of resistors 2818 and 2819 is connected to the control grid of tube 2847 in the amplifier detector 508, the cathode of which is grounded through the 3000-ohm resistor 2846. The anode of tube 2847 is connected through the tuned circuit comprising the primary of transformer 2845 and the shunting capacitor 2844 and through the 12,000-ohm resistor 2849 to the +320 volt potential source 2850. The resistor 2849 is coupled to ground through the 1-microfarad capacitor 2851. The secondary of transformer 2845 is connected to the plates of the two diodes 2852 and 2853. The center tap of the secondary of transformer 2845 is grounded and the cathodes of diodes 2852 and 2853 are also grounded but through the 1-megohm resistor 2854. The circuitry included in the dotted box 2848 filters or tunes the amplifier detector 508 to 1700 cycles and filters out or blocks the 1200-cycle tone.

The rectified 1700-cycle output is connected from the cathodes of tubes 2852 and 2853 to the impedance transformation cathode follower 510 and thence to a ready signal slicer 511 through the filter 509. The filter 509 comprises the inductors 2863 and 2864 and the capacitor 2865. The slicer 511 is a trigger circuit similar to the level trigger circuit 137 described above in the encoder 117. The wave form at the input of the ready slicer 511 is shown as curve 11*b* in FIG. 11 with the gradual build-up and decay due to filter 509. The slicer 511 is as hereafter described so adjusted so as to function or trigger when the signal thereto has reached approximately half its maximum magnitude and to trigger back when the signal reduces so that the output from the slicer 511 is a square wave shown as curve 11*c* in FIG. 11.

The ready signal slicer 511 has two triodes 2934 and 2938 which provide for the triggering function described above. The input signal from filter 509 is connected to the control grid of tube 2934 supplying the shaped ready signal shown as curve 11*b* in FIG. 11. The cathodes of tubes 2934 and 2938 are connected together and through the 2700-ohm cathode resistor 2951 to ground. The anodes of tubes 2934 and 2938 are connected respectively through the 5620-ohm and the 4700-ohm plate resistors 2931 and 2943 to the +320 volt potential sources 2930 and 2942. The anode of tube 2934 is also connected through a parallel circuit consisting of the 100-micro-microfarad capacitor 2933 and the .215 megohm resistor 2932 to the control anode of the triode 2938. The control anode of triode 2938 is also connected to the −320 volt potential source 2941 through the .215 megohm resistor 2939 and the 5000-ohm ready threshold adjusting rheostat 2940. The rheostat 2940 is adjusted to provide for the triggering of slicer 511 at approximately one-half the magnitude of the incoming signal through the filter 509. Normally tube 2938 is conductive and tube 2939 is non-conductive. When the positive signal shown as curve 11*b* in FIG. 11 has entered to the ready signal slicer 511, tube 2934 becomes conductive so that the potential at its anode is reduced supplying a negative pulse to the control grid of tube 2938. The negative signal or pulse upon the control grid of tube 2938 functions to inhibit conduction through the tube 2938 and increase the potential at its anode. The potential upon the anode of tube 2938 is shown as curve 11*c* in FIG. 11. The output potential upon the anode of tube 2938 is differentiated by the 47-micro-microfarad capacitor 2944 and connected to the slicer enabler 512. The slicer enabler 512 comprises a flip-flop unit 2953 which is similar to the binary counter untis 348 through 353 in the program generator 300 described above. The terminals 1, 3 through 7, 9, 11 and 12 are identical to those described above in reference to the binary counter units 348 through 353. The ready signal slicer 511 is connected to the terminal 1 of the flip-flop unit 2953. The negative differentiated pulse shown on curve 11*d* in FIG. 11 triggers the flip-flop unit 2953 in the slicer enabler 512 to one of its stable states. The flip-flop unit 2953 remains in this condition until reset, as hereinafter described, by a pulse through lead 521 from the program generator 530 at the end of the receiving cycle as is hereinafter described. When the flip-flop 2953 is triggered or operated to its stable condition responsive to the negative pulse from the ready signal slicer 511, it provides an unvarying positive direct-current voltage at its terminal 3 as shown in curve 11*e* in FIG. 11. The positive direct-current potential at terminal 3 is connected through the parallel circuitry comprising the 22-micro-microfarad capacitor 2954 and the .619 megohm resistor 2949 to the control grid of triode 2945. The control grid of triode 2945 is also connected to the −320 volt potential source 2948 through the .75 megohm resistor 2947.

The positive direct-current potential from the flip-flop 2953 cancels or neutralizes the negative bias from source 2948 which inhibited conduction through tube 2945. The cathode of tube 2945 is connected to the —50 volt potential source 2946 and the anode thereof is connected to a data signal slicer 514.

The anode of tube 2945 is connected to the control grid of tube 2903 in the data signal slicer 514 which comprises also the tube 2913. Tubes 2903 and 2913 operate in a similar manner as the tubes 2934 and 2938 in the ready signal slicer 511. The data signal slicer 514 is similar to the ready signal slicer 511 except that the control grid of tube 2903 is connected to ground through the .47 megohm resistor 2903 and the 7500-ohm resistor 2901.

When tube 2945 in the slicer enabler 512 is not conducting due to the inhibition by the negative potential source 2948 the potential upon its anode and the control grid of tube 2903 in the data signal slicer 514 allows the triode 2903 to be conductive. Due to the connections between the tubes 2903 and 2913 which comprise the resistor 2911, capacitor 2913 and the resistor 2904, when tube 2903 is conductive tube 2913 is not. The potential at the anode of tube 2903 is relatively negative due to the drop in potential from the source 2903 through the resistor 2905. When the data signal slicer 514 is in this condition with tube 2903 conductive and tube 2913 non-conductive, a positive signal to the control grid of tube 2903 from the filter 505 does not provide an output from either of the anodes of tubes 2903 and 2913. When, however, the slicer enabler 512 functions in response to the ready signal to provide a positive potential to the control grid of tube 2945, the tube 2945 conducts and lowers the potential upon the control grid of tube 2903. Tube 2903 becomes non-conductive and tube 2913 becomes conductive so that the data slicer 514 is enabled or is respective to positive pulses through the filter 505.

Two outputs are provided from the data signal slicer 514 to a data storage register or shift register 517 through the 470-micro-microfarad capacitors 2909 and 2910 which are shunted to ground by the 22,000-ohm resistors 2919 and 2920, respectively. The register 517 is similar to the registers 406 and 426 described above. The data signal slicer 514 in effect squares the synchronizing and data pulses providing supplementary wave shapes as shown as curves 11*g* and 11*h* in FIG. 11. The capacitors 2909 and 2910 function to differentiate the square waves and provide pulses shown as curves 11*i* and 11*j* in FIG. 11. The negative pulses through lead 515 set the data storage register 517 to its "1" condition and a negative pulse through lead 516 resets it to its "0" condition. The anode of tube 2913 is also connected through the 47-micro-microfarad capacitor 2918 and the .1 megohm resistor 2917 to the flip-flop or start-stop oscillator control 520. At the end of the synchronizing signal a negative pulse 11*m* on curve 11*j* in FIG. 11 causes the flip-flop 520 to provide a negative pulse at its terminal 3. The flip-flop 520 is a unit which is similar to the binary counter units 348 through 353 described above. The negative potential at terminal 3 starts the program generator 530 shown in FIGS. 32 and 33 to start functioning as is hereinafter described. The terminal 3 of the flip-flop 520 is connected to a start-stop oscillator 544 in the program generator 530.

The register 517 is set as described above by the pulses from the data signal slicer 514. Merely setting the register 517 to its "1" or "0" condition does not provide any indication from its terminal 7 to the cathode follower 518. Digit timing pulses are, however, provided from the program generator 530 responsive to the operation of the start-stop oscillator control 520 described above to the terminal 13 of the register 517. The digit timing pulses from the program generator 530 are, in effect, steered or directed in accordance with the condition of the register 517 to the terminal 7 when it is in its "1" condition or the terminal 6 when it is in its "0" condition. Since only the terminal 7 is connected to the cathode follower 518, an indication thereto is only provided responsive to the "1" condition of the register 517. The cathode follower provides for a low impedance path between the register 517 and the serial adder 707.

The serial adder 707 is similar to the serial adder 407 in the transmitter and has associated therewith a pulse delay circuit 708 which is similar to the pulse delay circuit 408 in the transmitter. The serial adder 707 functions to sum two sets of digits, one from the cathode follower 518 in the line amplifier and detector 500 described above in reference to FIGS. 28 and 29 from the line 320, and the other from a shift register 705 hereinafter described. The shift register 705 comprises sixteen shift register units 706 which are similar to the shift register units 406 and 426 in the transmitter.

The sequence of events in the shift register 705 commences when a read-in pulse is provided through lead 720 from the program generator 530, through the varistors 714 and parallax keys 715 in the parallax key section 709. The key 715 in the parallax key circuit 709 is set in accordance with the complement of the X coordinate parallax information to be subtracted. There are three parallax key circuits 709, 710 and 711 which are connected between the read-in leads 720, 721 and 722 and the shift register units 706 in the shift register 705. The first read-in pulse through lead 720 sets the units 706 in accordance with the setting of the keys 717 in the parallax key section 709. The parallax data of the first coordinate is in this manner stored or registered in register 705. The keys 715 are set in accordance with the complement of the parallax number to be subtracted, as described above in detail in the functional description in conjunction to FIGS. 1 through 7 when arranged in accordance with FIG. 8.

At the same time that the digit timing pulses described above from the program generator 530 provide or supply the coordinate data from the line amplifier and detector 500 to the serial adder 707 they also extract the parallax data one digit at a time from the register 705 in a manner similar to that described above in reference to the transmitter registers 405 and 412. The lead 502 described above which is connected to terminal 13 of the register 517 is also connected to the terminal 13 of each of the shift register units 706. The terminals 4 and 9 of the shift register units 706 are shunted to ground by the 3300-ohm resistors 3002. The terminals 6, 7, 10 and 3 interconnect the shift register unit 706. The terminal 7 of the first or least significant unit or shift register 706 is connected through the cathode follower 716 to the serial adder 707. Whenever the least significant or first unit 706 has registered therein a "1" digit, the digit timing pulse through deal 522 passes therethrough and through the cathode follower 716 to the serial adder 707. Every time a digit is extracted from the first unit 706 all the digits are shifted to the left by the digit timing pulses which are applied to the terminal 13 of all the units 706 as shift pulses.

The two sets of digits, one from the line amplifier and detector 500 from line 320, and the other from the register 705, are supplied to and added by serial adder 707. The sum pulses emerge 100 microseconds after the simultaneous entry of the coordinate data from the amplifier detector 500 and the parallax data from the shift register 705. The shift pulse and carry pulse described above which are supplied from the delay circuit 708 are applied only to the serial adder 707. The shift pulse causes the adder 707 to emit the sum pulses therefrom through the 22,000-ohm resistor 3003 to terminal 10 of the sixteenth shift register unit 706. Terminal 10 of the sixteenth shift register unit 706 is also connected to ground through the 12,000-ohm resistor 3004. As the registration in register 705 is shifted to the left by the digit timing pulses through lead 522, the corrected or summed data from the serial adder 707 is entered at the right or to the sixteenth unit 706 after a 100-microsecond delay for each digit by the shift pulses. At the end of sixteen such operations the register 705 is full of the parallax corrected data from the serial adder 707 which is now available for the decoder 617 which is hereinafter described.

The output of the serial adder 707 is connected to the register 705 by only one lead through the resistor 3003 as described above. When the sum digit from the serial adder 707 is a "0" it is necessary to set the sixteenth unit 706 to indicate a "0." This is accomplished by applying the digit pulses through lead 522 to the terminal 3 which is the "0" input terminal of the sixteenth unit 706. There are therefore two connections, one to terminal 3 and the other to terminal 13 of the sixteenth unit 706 from lead 522. The read-in leads 720, 721 and 722 described above are also connected to the serial adder 707 to provide the read-in pulses as reset pulses for the serial adder 707. When the next or the second set of parallax data is entered to the shift register 705 by the second read-in pulse the serial adder 707 is in this manner reset to "0."

Each of the shift register units 706 is connected from the terminals 1 and 12 thereof to the control grids of the double triodes 724 through the .47 megohm resistors 3005. The tubes 724 are cathode-follower tubes having their anodes connected to the +320 volt potential source 3006 through the 6200-ohm resistor 3007 which is shunted to ground by the .1 microfarad capacitor 3008 and the 10,000-ohm resistor 3009. The cathodes of the cathode-follower tube 724 are connected to ground through the .1 megohm resistors 3010 and to the −320 volt potential source 3011 through the 7000-ohm resistor 3012 which is shunted to ground by the .1 microfarad capacitor 3013 and the 56,000-ohm resistor 3015. Each of the cathodes of tubes 724 is also connected to the three read-out gates 701, 702 and 703. The cathode-follower tubes 242 provide a low impedance path from the shift register unit 706 to the read-out gates 701, 702 and 703. The read-out gates 701, 702 and 703 comprise diodes so arranged so that those which are biased by the cathode-follower tube 724 in accordance with the condition of the units 706 condition the flip-flops 604, hereinafter described.

Figure 34:
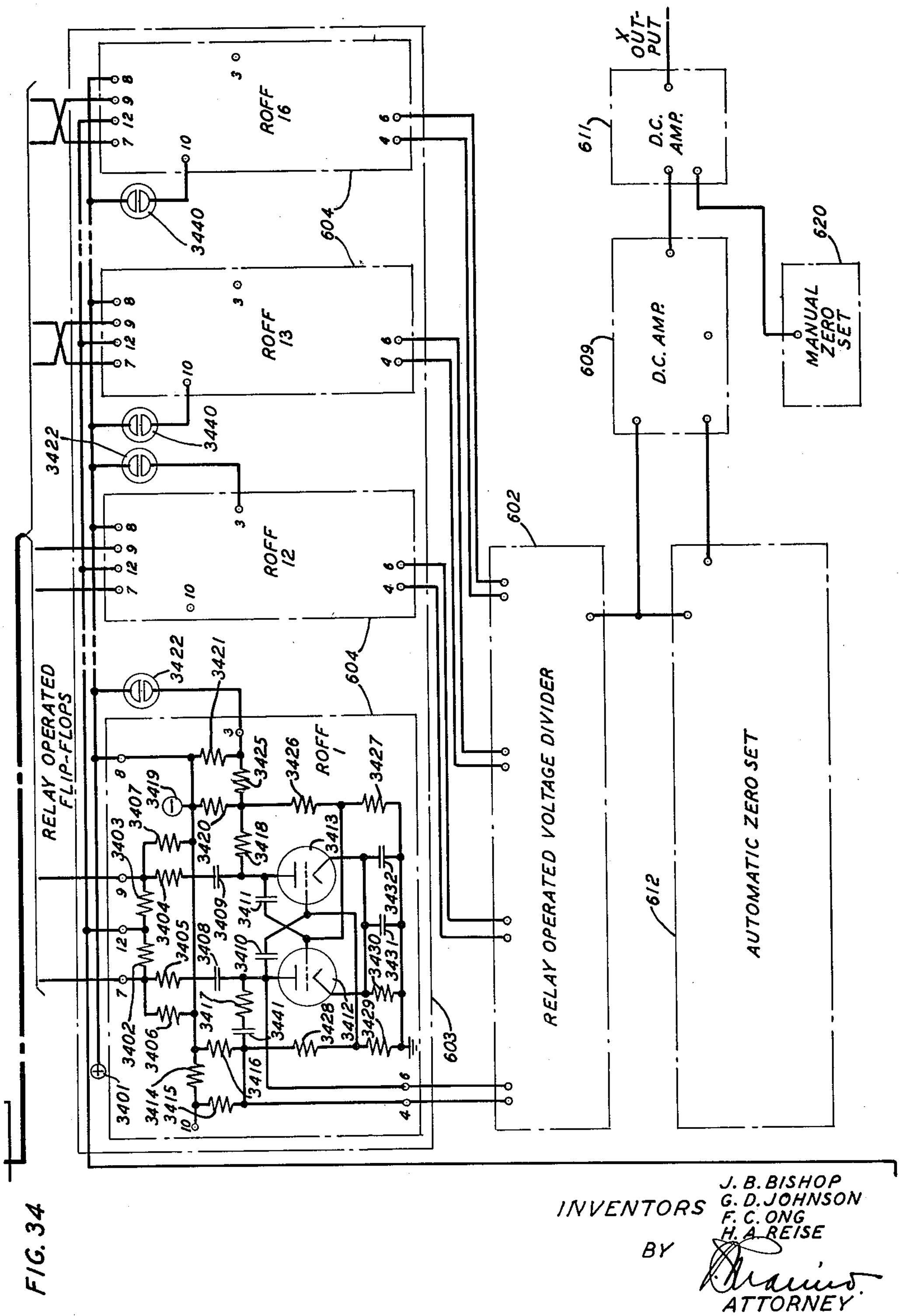

The read-out gates 701 through 703 are connected respectively to the relay-operating flip-flop section 603 in the decoders 617, 618 and 619; the decoder 617 being shown in further detail in FIG. 34. Each read-out gate 701 through 703 has sixteen diodes 3016 and sixteen diodes 3017 which are connected respectively to the right and left cathodes of tubes 724. The diodes 3016 are connected to the terminals 9 of the flip-flop units 604 in the circuit 603 and the diodes 3017 are connected to the terminals 7 thereof. The circuit 603 has sixteen flip-flop units 604 which are conditioned in accordance with the registration in register 705. The flip-flop units 604 provide, as is hereinafter described, for sufficient power to operate the relays in the relay-operated voltage divider 602 which is hereinafter described and they also function as memory devices which retain their settings either "1" or "0" until changed. The first flip-flop unit 604 is shown in detail.

The flip-flop units 604 are bistable devices capable of supplying current to operate a relay in one of its stable states. The operation of the flip-flop units 604 is determined by the read-out gates 701 through 703 which supply +6 and −25 volts in accordance with the condition of the tubes 724 to the terminals 7 and 9 of the units 604. The terminals 7 and 9 are connected through the 33,000-ohm resistors 3405 and 3404 and the 160-micro-micro-farad capacitors 3408 and 3409, respectively, to the anodes of tubes 3412 and 3413. The terminals 7 and 9 are connected together through the two 10,000-ohm resistors 3402 and 3403. The junction of resistors 3402 and 3403 is connected to the read-out lead 726 from the program generator 530 through the terminal 12.

The read-out gate 701 conditions the flip-flop units 604 in the decoder 617 so that the read-out pulse through lead 726 functions or does not function to operate the associated relay in the relay-operated voltage divider 602. The terminals 7 and 9 are also connected to the +320 volt potential source 3419 through the .62 megohm resistors 3406 and 3407. The potential source 3419 is also connected to the anodes of tubes 3412 and 3413 through the 43,000-ohm resistors 3416 and 3420. The resistor 3416 is connected to the anode of tube 3412 through the .1 microfarad capacitor 3416 and the 27,000-ohm resistor 3417. The resistor 3420 is connected directely to the anode tube 3413 through the 10,000-ohm resistor 3418. The anodes of tubes 3412 and 3413 are cross-connected through the 330-micro-microfarad capacitors 3410 and 3411 to the grid of tubes 3413 and 3412, respectively. The grids of tubes 3412 and 3413 are connected to the junction of the .56 megohm resistors 3426 and 3428 of the .33 megohm resistors 3427 and 3429 which are connected to ground. The resistors 3426 and 3428 are connected to the resistors 3420 and 3416 described above. The cathodes of tubes 3412 and 3413 are connected together and thence to ground through the parallel circuit comprising the 27,000-ohm resistor 3430 and the two .1 microfarad capacitors 3431 and 3432.

In the first twelve flip-flop units 604 the anode of tube 3413 provides an indication of its conductivity by the connection through the resistor 3418 and the .22 megohm resistor 3425 which is connected through the indicating device 3422 to the source 3419. In the thirteenth through sixteenth flip-flop units 604 an indication is provided of the conductivity of tube 3412 by the connection from the anode of tube 3412 through resistor 3417, capacitor 3441, the .22 megohm resistor 3415 and terminal 10 to an indicating device 3440 and thence to the source 3401.

In accordance with the conditioning of the read-out gates 701, 702 and 703 either the terminal 7 or terminal 9 will have diode 3017 or 3016 of high impedance connected thereto. A negative pulse through lead 726 which is applied to the terminal 12 of the units 604 will be transmitted through the various circuit components to the anode of tube 3412 or 3413 and to the grid of the other of the tubes 3412 and 3413. Suppose, for example, that the diode 3016 connected to terminal 9 is at its high impedance condition, the negative pulse through terminal 12 would therefore be short-circuited through terminal 7 but would also pass through resistor 3403, resistor 3404, the capacitor 3409 to the anode of tube 3413 and through the capacitor 3411 to the grid of tube 3412. If tube 3412 was conducting the negative pulse would stop or cut off the conduction and cause the circuit 604 to flip to its other stable state with tube 3414 conducting. The capacitor 3441 and the resistor 3417 compensate to an extent for the high inductive time constant of the relay winding in the voltage divider 602 and decrease the relay-operating time. The capacitors 3431 and 3432 maintain a constant cathode potential during the transition interval making possible the use of a relatively small trigger pulse.

For the first twelve digits registered in the shift register 705 the flip-flop units 604 associated with the various units 706 operate their associated relays in the voltage divider 602 for each "0" recorded in units 706. In other words a negative bias exists at terminal 7 of the first flip-flops 604 for a "0" in the first shift register units 706. For the thirteenth through sixteenth digits, the relay 222 in the voltage divider 602 is operated for a "1" instead of a "0" digit as can be seen by the cross leads connected to the terminals 7 and 9 of the flip-flop units 13 through 16. The output of the voltage divider 602, which is similar to the voltage divider 201 in the transmitter, drives the summing amplifier 609. The summing amplifier 609, which is similar to the summing amplifier 111 in the transmitter, has associated therewith an automatic zero set 612 which is similar to the automatic zero set 112 in the transmitter. The output of the amplifier 609 is connected to a second amplifier 611 similar to amplifier 609 which is provided with a manual zero set 620. The output from the amplifier 611 is the reconstructed target voltage of the first or X coordinate. The decoders 618 and 619 provide the other two outputs or reconstructed target voltages.

The program generator 530 in the receiver has a six-stage binary counter consisting of the binary counter units 531 through 536. The counters 531 through 536 actuate a diode matrix 543 through the cathode-follower tubes 537 through 542. The sequence of operations in the program generator 530 commences when a start signal is provided by the flip-flop 520. The output from the flip-flop 520, which is shown as curve 11*k* in FIG. 11, is a steady relatively negative potential which is applied to the start-stop oscillator 544 just before the data digit pulses are received from line 320. The signal from the flip-flop 520 is also shown as curve 12*a* in FIG. 12 wherein the time scale is identical with that used in describing the program generator 300 in the transmitter. The start signal from the flip-flop 520 occurs at the count of twenty-seven in the counting sequence of the transmitter program generator 300 neglecting transmission time. The start signal enables the start-stop oscillator 544 as is hereinafter described to provide or generate the 600-cycle sine wave which is shown as curve 12*b* in FIG. 12.

Terminal 5 of the flip-flop 520 is connected through the lead 3205 to the start-stop oscillator 504. Terminal 5 of flip-flop 520 is either at +195 volts or at +115 volts depending upon the state or condition thereof. The voltage at terminal 5 of flip-flop 520 is divided by the .62 megohm resistor 3202 and the .75 megohm resistor 3203 which is connected to the −320 volt potential source 3204 so that the junction thereof is either at −100 volts or at −50 volts. When the flip-flop 520 is actuated to supply the start signal to the start-stop oscillator 544 the junction of resistors 3202 and 3203 decreases in potential from −50 volts to −100 volts. The junction of resistors 3202 and 3203 is connected to the left grid of the double triode 3201. When the voltage on the left grid of tube 3201 is at −50 volts the left section of tube 3201 is conducting since the left cathode, being connected through the 3100-ohm resistor 3231 to the −320 volt potential source 3232, is also at a potential of −50 volts. The left plate of tube 3201 is connected through the 1000-ohm resistor 3206 to the oven 3209. The frequency of the oscillator 544 is controlled not by crystal means but by the oven 3209, which is sufficiently accurate as is hereinafter described, since the oscillator 544 is stopped in each frame and restarted at exactly the proper instant in response to the signal from flip-flop 520 at the count of twenty-seven. The oscillator 544 cannot, therefore, accumulatively drift out of phase with the incoming digits from line 320. The right section of tube 3201 is the oscillating section which cannot oscillate when the left section thereof is conductive as described above. When the left section of tube 3201 is conducting the plate thereof is relatively negative and connected through the resistor 3206 and a .1 megohm resistor 3207 to the right grid. The conduction through the left section of tube 3201 therefor is an inhibiting factor upon the right section. When the start signal, however, is supplied from the flip-flop 520, the potential upon the left grid of tube 3201 drops from −50 volts to −100 volts cutting off the conduction through the left section and allowing the right section of tube 3201 to oscillate. The right plate of tube 3201 is connected to ground through the 36,100-ohm resistor 3218 and through the 27,100-ohm plate resistor 3220 to the +320 volt potential source 3222. The left cathode of tube 3201 is connected through the 10,000-ohm oscillator adjustment potentiometer 3208 to the oven 3209. The potentiometer 3208 is provided to adjust the amplitude of oscillation. The oven 3209 comprises the inductors 3212 and 3213 which are shunted to ground by the capacitor 3211. The junction of inductors 3212 and 3213 is connected to the potentiometer 3208 and the inductor 3212 is connected to the resistor 3206 described above and to ground through the 47-micro-microfarad capacitor 3210. The temperature in the oven 3209 is maintained by the 115-volt potential source 3217 which is connected through the capacitor 3214 and resistor 3215. The capacitor 3214 is shunted by the switch 3216 which can short-circuit it. The right section of tube 3201 oscillates sinusoidally at a frequency of 600 cycles per second as determined by the inductors 3212 and 3213 and the capacitor 3211 which are mounted in the temperature-controlled oven 3209 for stability.

The output of the start-stop oscillator 544 is taken from the right cathode of tube 3201 through the 1-megohm resistor 3226 and the 4700-micro-microfarad differentiating capacitor 3227 to the biased amplifier 545. The capacitor 3227 is connected to ground through the 1-megohm resistor 3228. The biased amplifier 545 as is hereinafter described suppresses the positive half cycles of the sinusoidal wave thereto and converts the negative half cycles to positive pulses having steep sides as illustrated by the curve 12*c* in FIG. 12. The capacitor 3227 in the oscillator 544 is connected through the lead 3229 to the grid of tube 3230. Both the grid and cathode of tube 3230 are at ground potential so that the tube 3230 is normally conductive and the positive half cycles upon its grid are suppressed and the negative half cycles distorted into a steep wave form of positive polarity upon the plate thereof due to the phase reversal therethrough. The plate of tube 3230 is connected to the +320 volt potential source 3221 through the 45,500-ohm plate resistor 3223. The positive pulses from the biased amplifier 545 are supplied to the blocking oscillator 546 wherein the pulses are differentiated and the negative pips suppressed. The connection from the amplifier 545 is through the 1500-micro-microfarad capacitor 3224 which is connected to ground through the 33,000-ohm resistor 3225 and the negatively poled diode 3219. The capacitor 3224 differentiates the pulses from the amplifier 545 when the diode 3219 short-circuits the negative differentiated pips or pulses. The positive pips shown as curve 12*d* in FIG. 12 trigger the blocking oscillator 546 and an associated delay circuit 547 hereinafter described which supplies the pulses to the input of the binary counting system comprising the binary counters 531 through 536 briefly described above. The oscillator 546 as is hereinafter described supplies the digit timing pulses through lead 522 to the shift register 705 and the pulse delay circuit as described above. The blocking oscillator 546 is similar to the blocking oscillators 308, 310, 336 through 339 and 333 in the transmitter and supplies a negative pulse to lead 522 which is ½-microsecond duration every time that it is triggered.

The positive pip is limited by the positively poled varistor 3234 which is connected to the +320 volt potential source 3235 through the 20,000-ohm resistor 3236 and to ground through the parallel circuit comprising the 1500-ohm resistor 3237 and the 35-microfarad capacitor 3238. The length of the output pulse from the blocking oscillator 546 is governed by the 1000-micro-microfarad capacitor 3239 which is connected to the diode 3219 and the .51 megohm resistor 3240 which is connected to the capacitor 3239. The resistor 3240 connects the right winding and the central winding of the three-winding transformer 3241. The right winding is also shunted to ground through the 510-ohm resistor 3242. The junction of the varistors 3219 and 3234 is also connected to ground through the 100-micro-microfarad capacitor 3243. The central winding of transformer 3241 is connected to the grid of triode 3244 the cathode of which is connected to the diode 3234 and the plate of which is connected to the left winding of transformer 3241. The left winding is also connected through the 10,000-ohm resistor 3245 to the +320 volt potential source 3246. An output is also provided from the blocking oscillator 546 from the right winding of transformer 3241 through the 100-micro-microfarad capacitor 3247 to the delay circuit 547.

The capacitor 3247 is connected to the grid of the triode 3251 which is one of two triodes 3251 and 3252 in the delay circuit 547. The cathodes of both tubes 3251 and 3252 are connected to ground and the anodes are connected respectively through the 18,000-ohm resistors 3256 and 3257 and through the 1-microfarad capacitor 3258 to ground. When the negative pulse from the blocking oscillator 546 is provided to the control grid of tube 3251 it blocks conduction therethrough and increases the potential at its anode. The anode of tube 3251 is coupled through the parallel circuit comprising 47-micro-microfarad capacitor 3253 and the .47 megohm resistor 3254 to the control grid of tube 3252. The anode tube 3252 is in turn connected through the 270-micro-microfarad capacitor 3255 to the control grid of tube 3251 and also through the 1-megohm resistor 3250 to the capacitor 3258 described above. The control grid of tube 3252 is connected to the −320 volt potential source 3264 through the 1.3-megohm resistor 3265. When the negative pulse is entered from the blocking oscillator 546 it is applied to the control grid of tube 3251 and through the capacitor 3255 to the anode of tube 3252. The tubes 3251 and 3252 provide for a positive pulse from the anode tube 3251 through the 100-micro-microfarad capacitor 3262 which is connected to ground through the 10,000-ohm resistor 3263 to the binary counter comprising the units 531 through 536. The switch 3259 which is connected to the resistor 3250, described above, can be connected to its out position to the +320 volt potential source 3261 through the 6800-ohm resistor 3260 to short out the delay circuit 547 when the serial adder 707 is not utilized.

The program generator 530 was completely idle during the first eleven counts between the count of sixteen and twenty-seven in the data frame of the transmitter program generator 300. Since the first half cycle of the output of the start-stop oscillator 544 is suppressed, an output is provided to start the binary counters 531 through 536 to operate at the count of twenty-seven and one-half. The binary counter comprising the counters 531 through 536 which are similar to the counters 348 through 353 counts to forty-eight whereupon it is reset to zero at the count of 15.5 in the cycle of the transmitter program generator 300. The counter comprising counters 531 through 536 counts at the same rate as the counter comprising the counters 348 through 353 in the transmitter.

Figure 12:
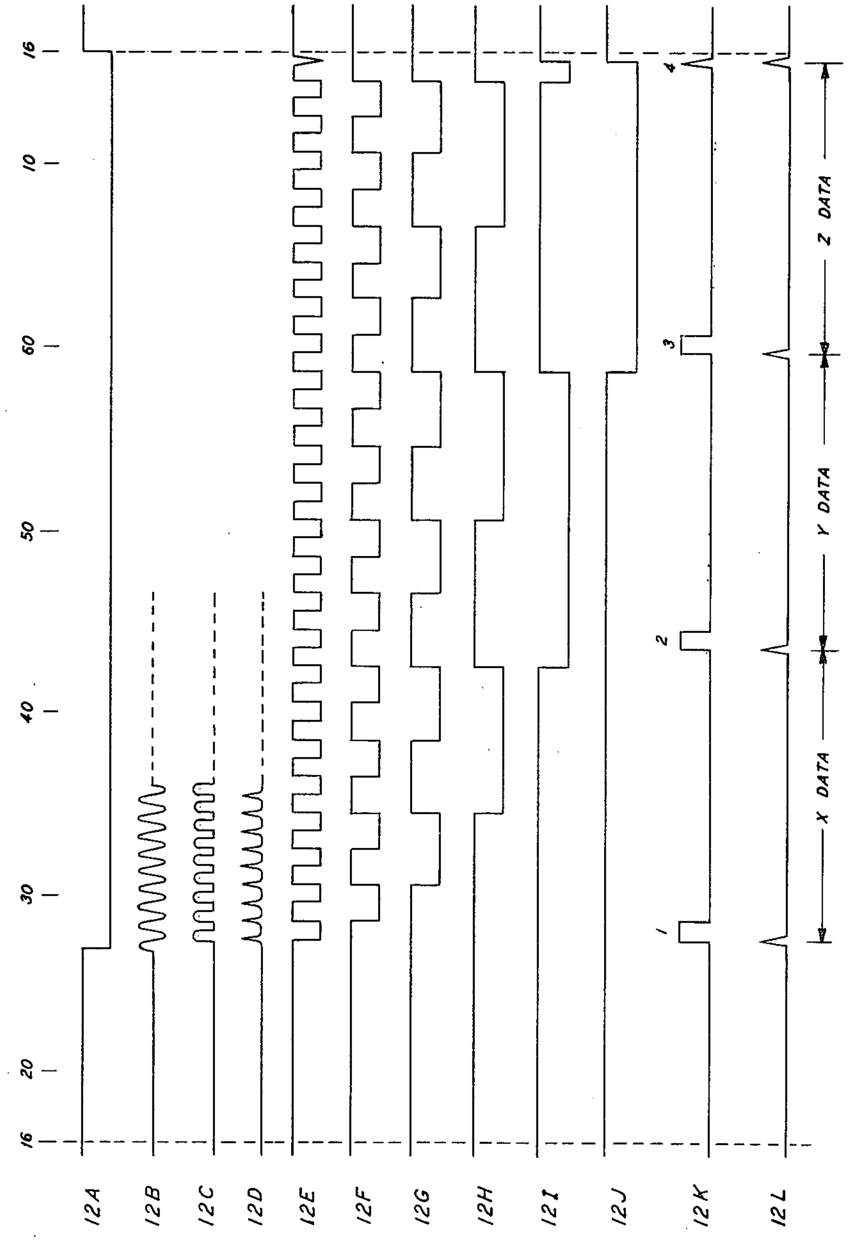
FIG. 12 is a series of curves illustrating the operation of the receiver program generator.

The wave forms from the six cathode-follower tubes 537 through 542 are shown as curves 12*e* through 12*j*, respectively, in FIG. 12. Curve 12*e* is the complement of the actual potentials provided from the cathode-follower tube 537 and is shown in this manner for consistency with the other curves. The anodes of the cathode-follower tubes 537 through 542 are connected through the 2200-ohm resistor 3267 to the +320 volt potential source 3268. The cathodes of tubes 537 through 542 are connected through the 10,000-ohm cathode resistor 3269 and the 3100-ohm resistor 3270 to the −320 volt potential source 3271. The resistors 3267 and 3270 are shunted by the 35-microfarad capacitor 3272 and the 30-microfarad capacitor 3273 the junction of which is grounded. The control grids of the tubes 538 through 542 are coupled to ground through the 470-micro-microfarad capacitor 3274. The cathodes of the tubes 537 through 542 are connected to the diode matrix 543.

Responsive to the timed potentials or pulses from the cathode-follower tubes 537 through 542 the crystal diode matrix 543 provides four timed pulses with the first pulse being provided one-half time slot before the coordinate data digits arrive from line 320. The diode matrix 543 is substantially similar to the diode matrix 340 in the transmitter and comprises a plurality of negatively poled diodes 3275 which are connected to the cathodes of tubes 537 through 542. The positive poles of diodes 3275 are connected to the bus bars 3276, 3277, 3278 and 3279. The bus bars 3276 through 3279 are connected to ground through the negatively poled diodes 3280 and to the +320 volt source 3268 through the .3 megohm resistors 3281. The bus bar 3276 is coupled through the 2700-micro-microfarad capacitor 3282 to the blocking oscillator 548. A pulse is provided through the capacitor 3282 from the bus bar 3276 to activate the blocking oscillator 548 which in turn supplies a read-in pulse through lead 720 to the parallax key section 709 described above. This pulse is utilized to read the first coordinate parallax data registered by the parallax keys 715 in section 709 into the shift register 706. The parallax data is thereafter added to the first coordinate position data arriving on line 320 as described above. The adding operation for the first coordinate consumes sixteen time slots also as described above in reference to the adders 407 and 707. At the end of the sixteen time slots a second pulse is provided by the crystal diode matrix 543 from the bus bar 3277 through the 5100-micro-microfarad capacitor 3283 to the blocking oscillator 549 which produces the first coordinate read-out pulse to the read-out gate 701. The read-out pulses provided by the blocking oscillator 549 have a duration of 10 microseconds which is of longer duration than necessary to actuate the flip-flops 604 described above. The trailing edge of the read-out pulse provided by the blocking oscillator 549 is used to trip or actuate the blocking oscillator 550 which generates the second coordinate read-in pulse to lead 721. The 10-microsecond delay thus introduced is sufficient to avoid interference between the read-out and read-in operations.

Similar sequences of timing pulses are provided from the blocking oscillators 551 through 553 responsive to the pulses provided upon the bus bars 3278 and 3279 which are coupled respectively to the oscillators 551 and 553 through the 5100-micro-microfarad capacitors 3284 and 3285, the oscillators 551 through 553 produce the Y or second coordinate read-out and Z or third coordinate read-in and read-out pulses. The blocking oscillator 551 provides the Y read-out pulse to the read-out lead gate 702 through lead 726 and actuates the blocking oscillator 552 which provides the Z or third coordinate read-in pulse through lead 722. Finally, the third coordinate read-out pulse is generated through the blocking oscillator 553 which also signals through lead 521 to reset the counters 531 through 536 and flip-flops 512 through 520 that the frame is ended. When the flip-flop 520 is reset it stops the start-stop oscillator 544. In this manner the program generator 530 is started and stopped by the flip-flop 520 to control the sequence of operations in the transmitter.

It is to be understood that the above-described arrangements are illustrative of the application of the principles of this invention. Numerous other arrangements may be devised by those skilled in the art without departing from the spirit and scope of the invention.

What is claimed is:

1. A transmission system for transmitting signals representing the position of an object from an object detecting site to a remote receiving site comprising a transmitter located at said object detecting site; a receiver located at said remote site; and a transmission medium connecting said transmitter with said receiver, said transmitter having predictor circuits for adding a correction to the target position data to compensate for changes in object position during delays through said transmitter, said transmission medium, and said receiver; said transmitter and said receiver having parallax correcting means to automatically compensate for the difference in locations of said transmitter and said receiver.

2. A transmission system in accordance with claim 1 wherein said transmitter comprises in addition encoders selectively controlled by analog representations of the coordinates of said object position and additionally by said predictor circuits for providing a coded representation of the predicted object position.

3. A transmission system in accordance with claim 2 wherein said receiver comprises in addition decoders for translating the coded representation of the predicted object position to analog potentials.

4. A transmission system in accordance with claim 3 wherein said transmitter comprises in addition a coordinate shift register controlled by said encoders for serially arranging the coded representation of the object position for transmission through said medium, and a parallax shift register for serially arranging the coded representation of the transmitter parallax correction for transmission through said medium.

5. A transmission system in accordance with claim 4 wherein said transmitter comprises in addition a serial adder for summing the coded representations of the predicted object position and transmitter parallax correction from said coordinate shift register and said parallax shift register respectively.

6. A transmission system in accordance with claim 5 wherein said transmitter comprises in addition a modulator section for converting the output from said serial adder to spurts of tone to be applied to said transmission medium.

7. A transmitter comprising an input for receiving analog potentials representing the coordinate position of an object; means for adding incremental potentials to said analog potentials to compensate for transmission delays; means for translating the sums of said incremental and analog potentials to coded coordinate signals; means for adding coded parallax signals to said coded coordinate signals to correct for location limitations; means for serially arranging the signals representing the sum of said coded coordinate and parallax signals; and means for converting said serially arranged sum signals to spurts of tone.

8. A transmission system for supplying the location of a rapidly moving object from locating apparatus to a remote receiving site comprising a transmitter associated with said locating apparatus; a receiver located at said remote receiving site; and a transmission medium connecting said receiver and said transmitter, said transmitter having an input for receiving analog potentials representing the coordinates in space of the moving object from said locating apparatus, encoders for translating the analog potentials to coded signals, each of said encoders comprising a reversible binary counter for storing an indication of the coded signals, and means for continuously adjusting said reversible binary counter in accordance with changes of the analog potentials at said input, and a coordinate shift register connected to said reversible binary counters in said encoders for serially arranging the coded signals stored therein for transmission through said transmission medium to said receiver.

9. A transmission system in accordance with claim 8 wherein said transmitter comprises in addition gating means for periodically sampling the coded signals stored in said reversible binary counter and setting said coordinate shift register in accordance therewith, a modulator connected to and controlled by said shift register, a source of alternating current connected to said modulator, and means for successively shifting the coded signals registered in said shift register to enable and disable said modulator in accordance therewith thereby allowing spurts of tone from said source representing the coded signals in said shift register to emit to said transmission medium.

10. A transmission system in accordance with claim 9 wherein said transmitter comprises in addition predictor circuits for adding a correction to the analog potentials at said input to compensate for changes in the position of the moving object during the operation of the transmission system.

11. A transmission system in accordance with claim 10 wherein said transmitter comprises in addition parallax correcting circuits to refer the position of said moving object to a reference point common to said transmitter and said receiver.

12. In combination a transmitter at a local station; a receiver at a remote station; and a transmission channel therebetween, said transmitter having three input terminals, and three encoders connected respectively to said terminals for converting currents at said terminals to coded signals, each of said encoders having a relay-operated voltage divider providing a neutralizing current, a summing amplifier connected to said voltage divider and to one of said input terminals for summing said neutralizing current and the respective of said input currents, means for detecting the magnitude and phase of the sum of said neutralizing and input current, a counting gate controlled by said detecting means, and a reversible binary counter connected to and controlled by said detecting means and said counting gate to change the registration therein in accordance with the magnitude and phase of the sum of said neutralizing and input currents, said reversible binary counter being connected to and controlling said relay-operated voltage divider.

13. In combination in accordance with claim 12 wherein said detecting means in each of said encoders comprises a phase detector for setting said reversible binary counter to add or subtract in accordance with the phase of the sum of said neutralizing and input currents, a modulator for translating the direct-current sums to alternating currents, and a level trigger connected to said modulator for enabling and disabling said counting gate.

14. In combination in accordance with claim 13 wherein said transmitter comprises in addition three predictor circuits connected respectively between said input terminals and said encoders for adding incremental currents to said input currents to compensate for transmission and equipment delays.

15. In combination in accordance with claim 14 wherein said transmitter comprises in addition parallax correcting means to automatically refer the location of said transmitter to a reference grid common to both said transmitter and said receiver.

16. In combination in accordance with claim 15 wherein said parallax correcting means comprises three parallax key circuits for predetermining the parallax corrections in coded signal form and a parallax shift register for serially arranging the coded signals registered in said parallax key circuits.

17. In combination in accordance with claim 16 wherein said transmitter comprises in addition a coordinate shift register for serially arranging the coded signals registered in said reversible binary circuits in said encoders and a serial adder connected to said parallax and said coordinate shift registers to serially add the registrations therein.

18. A transmitter comprising three input terminals; three encoders connected respectively to said terminals for converting currents through said terminals to coded signals; three predictor circuits connected respectively to said input terminals and to said encoders for adding incremental currents to the currents through said terminals to compensate for equipment delays; parallax correcting means for automatically referring the location of said transmitter to a large reference area comprising three parallax key circuits for predetermining the parallax corrections in coded signal form and a parallax shift register for serially arranging the coded signals registered in said parallax key circuits; a coordinate shift register for serially arranging the coded signals from said three encoders; a serial adder for adding the coded signals from said coordinate shift register and from said parallax shift register; a modulator section for converting the signals from said serial adder to spurts of tone and for providing a ready and synchronizing signal; and a program generator controlling the timing of said encoders, said shift registers, said adder and said modulator section.

19. A transmitter in accordance with claim 18 wherein each of said encoders comprises a relay-operated voltage divider providing a neutralizing current, a summing amplifier connected to said voltage divider, to one of said three input terminals, and to one of said predictor circuits for summing the currents therefrom, means for detecting the magnitude and phase of the sum of the currents to said summing amplifier, a counting gate circuit controlled by said detecting means, and a reversible binary counter connected to and controlled by said detecting means and said counting gate to change the registration therein in accordance with the magnitude and phase of the sum of the currents to said summing amplifier and control said relay-operated voltage divider providing said neutralizing current.

20. A transmitter in accordance with claim 18 wherein said modulator section comprises two modulators, one for converting the signals from said serial adder to spurts of tone and for supplying a synchronizing signal of similar frequency as the frequency of the spurts of tone and the other for supplying a ready signal having a different frequency.

21. A receiver comprising a line amplifier and detector section for accepting spurts of tone of a plurality of frequencies and converting them to direct-current pulses; a program generator controlled by said direct-current pulses corresponding to spurts of tone of one of said plurality of frequencies from said section; a plurality of parallax key sections to refer the location of said receiver to a main reference area; a shift register controlled by said program generator to successively provide a coded representation of the parallax information in said parallax key sections; a serial adder controlled by said program generator for summing the coded parallax information in said shift register and the direct-current pulses corresponding to spurts of tone of another of said plurality of frequencies from said line amplifier and detector section and providing the sum signals to one end of said shift register as said parallax information is emitted from the other end thereof, and means for converting the sum signals in said shift register to analog potentials.

22. A transmission system comprising a transmitter, a receiver and a transmission medium therebetween, said transmitter comprising three input terminals; three encoders connected respectively to said terminals for converting currents through said terminals to coded signals; three predictor circuits connected respectively to said input terminals and to said encoders for adding incremental currents to the currents through said terminals to compensate for equipment delays, each of said encoders comprising a relay-operated voltage divider providing a neutralizing current, a summing amplifier connected to said voltage divider, to one of said three input terminals, and to one of said predictor circuits for summing the currents therefrom, means for detecting the magnitude and phase of the sum of the currents to said summing amplifier, a counting gate circuit controlled by said detecting means, and a reversible binary counter connected to and controlled by said detecting means and said counting gate to change the registration therein in accordance with the magnitude and phase of the sum of the currents to said summing amplifier and control said relay-operated voltage divider providing said neutralizing current; parallax correcting means for automatically referring the location of said transmitter to a large reference area comprising three parallax key circuits for predetermining the parallax corrections in coded signal form and a parallax shift register for serially arranging the coded signals registered in said parallax key circuits; a coordinate shift register for serially arranging the coded signals from said three encoders; a serial adder for adding the coded signals from said coordinate shift register and from said parallax shift register; a modulator section for converting the signals from said serial adder to spurts of tone and for providing a ready and synchronizing signal comprising two modulators, one for converting the signals from said serial adder to spurts of tone and for supplying a synchronizing signal of similar frequency and the other for supplying a ready signal having a different frequency; a program generator controlling the timing of said encoders, said shift registers, said adder and said modulator section; said receiver comprising a line amplifier and detector section for accepting spurts of tone of a plurality of frequencies and converting them to direct-current pulses; a program generator controlled by said direct-current pulses corresponding to spurts of tone of one of said plurality of frequencies from said section; a plurality of parallax key sections to refer the location of said receiver to said large reference area; a shift register controlled by said receiver program generator to successively provide a coded representation of the parallax information in said receiver parallax key sections; a serial adder controlled by said receiver program generator for summing the coded parallax information in said receiver shift register and the direct-current pulses corresponding to spurts of tone of another of said plurality of frequencies from said line amplifier and detector section and providing the sum signals to one end of said receiver shift register as said parallax information is emitted from the other end thereof, and means for converting the sum signals in said receiver shift register to analog potentials.

23. A shift register comprising a plurality of bistable units connected in a chain for registering one of two conditions of a plurality of conditions, means for simultaneously setting said plurality of units in accordance with one of two conditions of one set of conditions, means for successively shifting the registration of each of said units except the first in said chain to the next adjacent units, means for successively shifting the registration in the first of said units in said chain as the output of said register, and means for successively setting the last of said units in said chain in accordance with one of two conditions of a second set of conditions simultaneously with the shifting operation by said first and second-mentioned shifting means.

24. In combination a shift register comprising a plurality of bistable units connected in a chain for registering one of two conditions of a plurality of conditions, means for simultaneously setting each of said plurality of units to one of said two conditions in accordance with the corresponding one of two conditions in one set of conditions, means for successively shifting the setting of each of said units except the first in said chain to the next adjacent of said units, means for successively supplying a signal in accordance with the setting of the first of said units in said chain as the output of said register; a serial adder connected to the first of said units in said chain; means for entering a coded signal to said serial adder in accordance with one of two conditions of a second set of conditions; and means for successively setting the last of said units in said chain in accordance with the sum of said two sets of conditions from said serial adder.

25. In combination in accordance with claim 24 wherein said serial adder comprises a first circuit responsive when the coded signals from the first of said units in said chain and from said entering means are similar and in accordance with the first of the two conditions, a second circuit responsive when the coded signals from the first of said units in said chain and from said entering means are not similar, a first flip-flop connected to and controlled by said first circuit, a second flip-flop connected to said first flip-flop, a first pulsing means for setting said second flip-flop in accordance with the setting of said first flip-flop, a third flip-flop connected to and controlled by said second circuit, a second first circuit and a second second circuit connected to said second and to said third flip-flop, and a second pulsing means operable before said first pulsing means connected to said second and to said third flip-flops, said second first circuit being connected to and controlling said first flip-flop to indicate a carry, said second second circuit providing the coded sum signal from said serial adder.

26. A serial adder for summing two sets of coded signals in binary digital form comprising a first circuit responsive when the coded signals from the first of said units in said chain and from said entering means are similar and in accordance with the first of the two conditions, a second circuit responsive when the coded signals from the first of said units in said chain and from said entering means are not similar, a first flip-flop connected to and controlled by said first circuit, a second flip-flop connected to said first flip-flop, a first pulsing means for setting said second flip-flop in accordance with the setting of said first flip-flop, a third flip-flop connected to and controlled by said second circuit, a second first circuit and a second second circuit connected to said second and to said third flip-flop, and a second pulsing means operable before said first pulsing means connected to said second and to said third flip-flop, said second first circuit being connected to and controlling said first flip-flop to indicate a carry, said second second circuit providing the coded sum signal from said serial adder.

27. A receiver comprising a line amplifier and detector section for accepting spurts of tone of a plurality of frequencies and converting them to direct-current pulses; a program generator controlled by said direct-current pulses corresponding to spurts of tone of one of said plurality of frequencies from said section; a plurality of parallax key sections to refer the location of said receiver to a main reference area and a shift register controlled by said program generator to successively provide a coded representation of the parallax information in said parallax key sections comprising a plurality of bistable units connected in a chain for registering one of two conditions of a plurality of conditions, means for simultaneously setting said plurality of units in accordance with one of two conditions of one set of conditions, means for successively shifting the registration of each of said units except the first in said chain to the next adjacent units, means for successively shifting the registration in the first of said units in said chain as the output of said register, and means for successively setting the last of said units in said chain in accordance with one of two conditions of a second set of conditions simultaneously with the shifting operation by said first and second-mentioned shifting means.

28. A receiver comprising a line amplifier and detector section for accepting spurts of tone of a plurality of frequencies and converting them to direct-current pulses; a program generator controlled by said direct-current pulses corresponding to spurts of tone of one of said plurality of frequencies from said section; a plurality of parallax key sections to refer the location of said receiver to a main reference area; a shift register controlled by said program generator to successively provide a coded representation of the parallax information in said parallax key sections comprising a plurality of bistable units connected in a chain for registering one of two conditions of a plurality of conditions, means for simultaneously setting each of said plurality of units to one of said two conditions in accordance with the corresponding of one of two conditions in one set of conditions, means for successively shifting the setting of each of said units except the first in said chain to the next adjacent of said units, means for successively supplying a signal in accordance with the setting of the first of said units in said chain as the output of said register; a serial adder connected to the first of said units in said chain; means for entering a coded signal to said serial adder in accordance with one of two conditions of a second set of conditions, means for successively setting the last of said units in said chain in accordance with the sum of said two sets of conditions from said serial adder, and means for converting the sum signals in said shift register to analog potentials.

29. A system comprising object observing means at a sending station, means for registering data expressing a plurality of coordinates of said object with respect to said station, means for correcting the registrations in said registering means by discrete quanta representing the nearest quantums of motions of said object along said coordinates, a programmer, means operated by said programmer for successively transmitting groups of signals comprising in succession a receiver enabling signal, a ready signal, and digital data signals representing each of said coordinates in succession, wherein means are provided for giving said ready signal characteristics distinctively different from said ready and data signals; a receiving element, means operated by said ready signal for enabling said element, means controlled thereby to accept said digital data signals, and registers for registering said digital data signals as data expressing a plurality of coordinates of said object.

References Cited in the file of this patent

UNITED STATES PATENTS

| | | |
|---|---|---|
| 2,445,213 | Evans | July 13, 1948 |
| 2,556,200 | Lesti | June 12, 1951 |
| 2,568,724 | Earp | Sept. 25, 1951 |
| 2,591,846 | Mann | Apr. 8, 1952 |
| 2,625,600 | Benaglio | Jan. 13, 1953 |